US010158974B1

(12) United States Patent
Merjanian et al.

(10) Patent No.: US 10,158,974 B1
(45) Date of Patent: Dec. 18, 2018

(54) COMMUNITY SAFETY, SECURITY, HEALTH COMMUNICATION AND EMERGENCY NOTIFICATION SYSTEM WITH COMMON SHORT CODE SMS COMMUNICATION CAPABILITIES

(71) Applicant: Titan Health & Security Technologies, Inc., Newport Beach, CA (US)

(72) Inventors: Vic A. Merjanian, Newport Beach, CA (US); Paul E. Samra, Newport Beach, CA (US); Ryan Khalili, Newport Beach, CA (US); Eduardo Juarez, Newport Beach, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 0 days.

(21) Appl. No.: 15/876,111

(22) Filed: Jan. 20, 2018

(51) Int. Cl.
*H04W 4/02* (2018.01)
*H04W 4/90* (2018.01)
*H04W 4/14* (2009.01)

(52) U.S. Cl.
CPC .............. *H04W 4/023* (2013.01); *H04W 4/14* (2013.01); *H04W 4/90* (2018.02)

(58) Field of Classification Search
None
See application file for complete search history.

(56) References Cited

U.S. PATENT DOCUMENTS

| 2007/0135090 | A1* | 6/2007 | Martin | H04W 60/04 |
| | | | | 455/404.2 |
| 2014/0320282 | A1* | 10/2014 | Zhang | G08B 7/066 |
| | | | | 340/502 |
| 2017/0245130 | A1* | 8/2017 | Mehta | H04W 4/90 |

* cited by examiner

*Primary Examiner* — Wayne H Cai
(74) *Attorney, Agent, or Firm* — Sheppard, Mullin, Richter & Hampton LLP; Daniel Yannuzzi

(57) ABSTRACT

A community safety system (CSS) including a notification management entity (NME) comprising servers, the NME communicatively coupled to multiple user devices and one or more administrator devices (collectively, registered user devices). The CSS includes a plurality of registered users, wherein registered users may be associated with an organization, and a user category of a set of user categories. The NME may maintain a list of the registered users and associated information. The registered users may have user devices including a CSS application operating thereon, or SMS messaging program operating thereon. In some embodiments the CSS enables SMS-to-CSS App communications, and vice versa, enriching the CSS with information from users employing disparate communication platforms on their devices.

29 Claims, 35 Drawing Sheets

1300

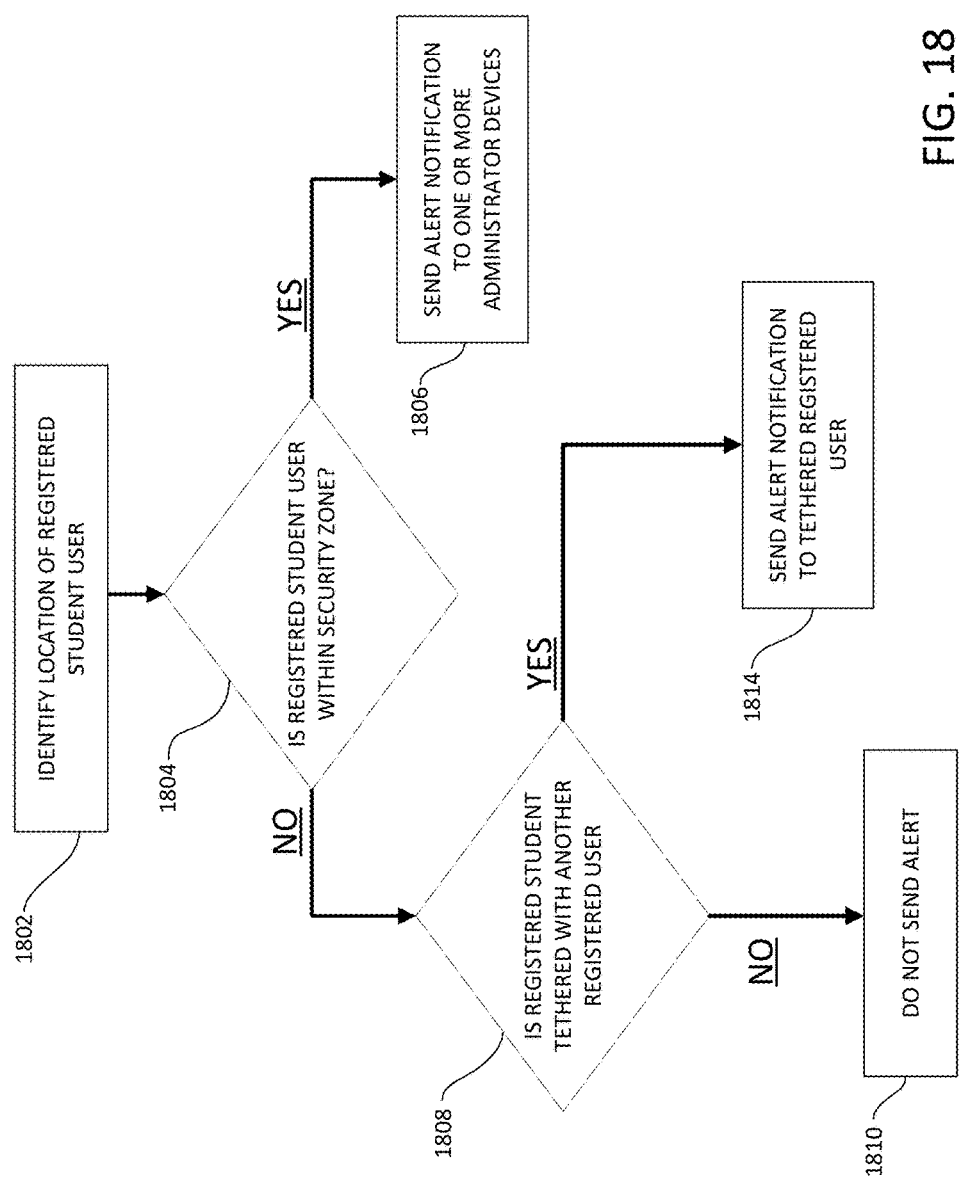

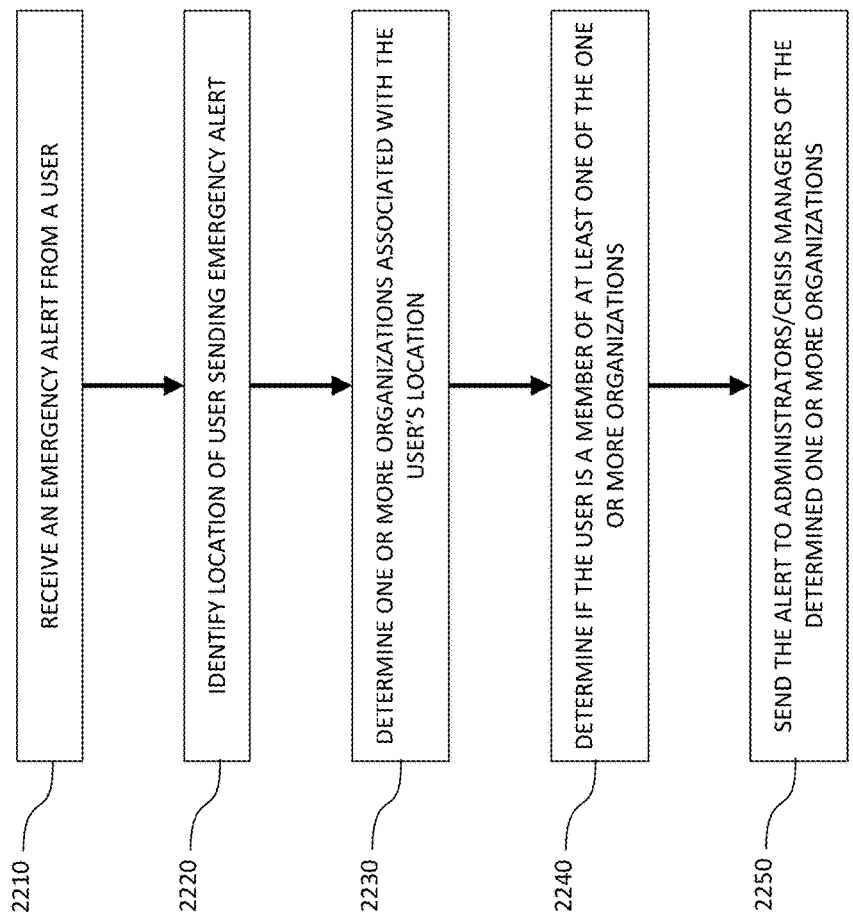

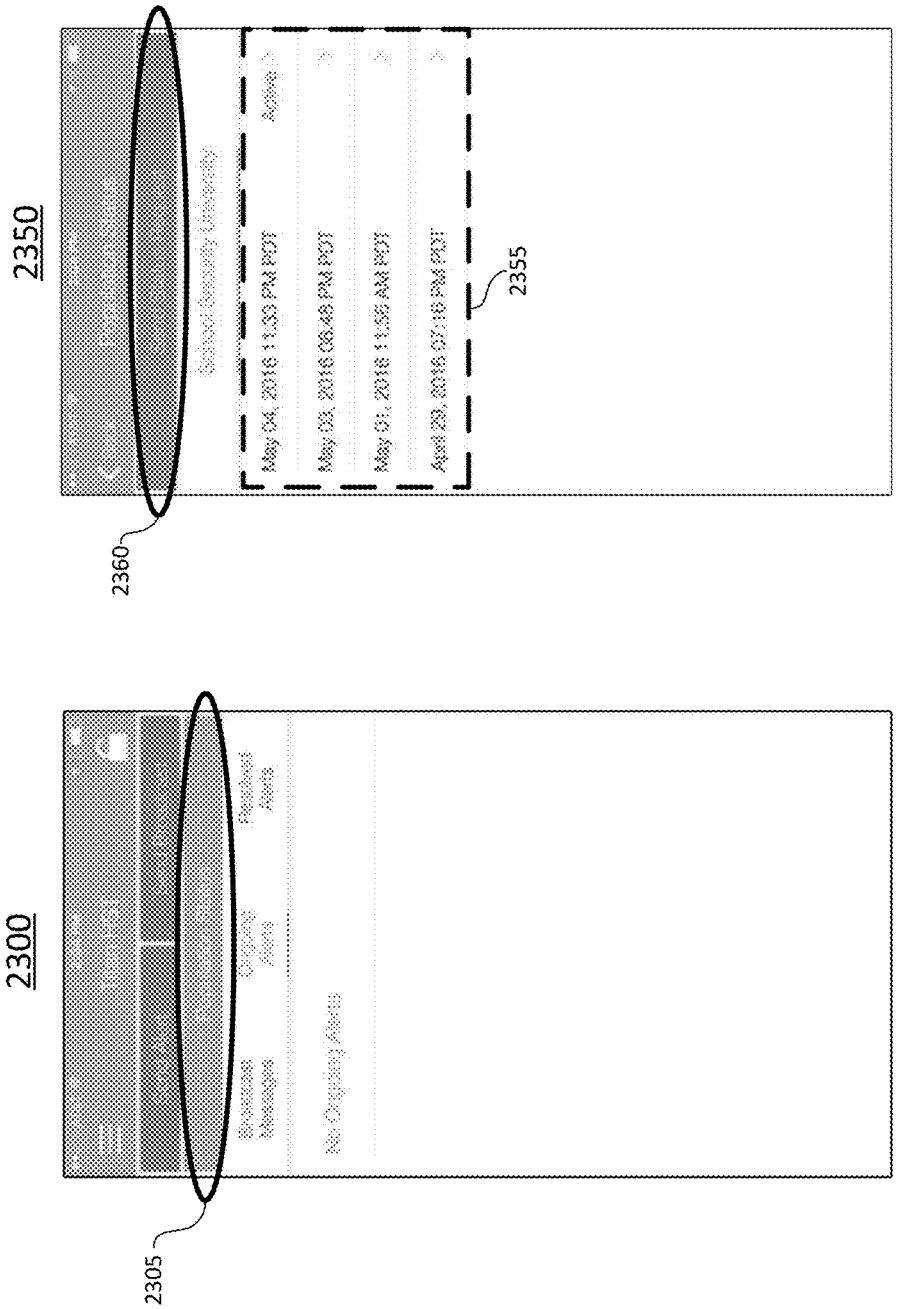

COMMUNITY SAFETY, SECURITY, HEALTH COMMUNICATION AND EMERGENCY NOTIFICATION SYSTEM WITH COMMON SHORT CODE SMS COMMUNICATION CAPABILITIES

TECHNICAL FIELD

The disclosed technology relates generally to community notification systems, and more particularly, some embodiments relate to integrated community communication and notification systems providing enhanced two-way interaction between users (e.g., administrators, security officers, personnel, emergency responders (such as a police department/officer), and/or other categories of registered users), faster response times and orderly information propagation among users, decentralized notification capabilities, direct police-community interaction, inter-organizational interactions, common short code SMS communication integration (e.g., generating broadcast messages for transmission as SMS messages from a common short code operator, processing free-form and preprogrammed SMS messages from user devices—optionally populating other users' mobile emergency apps or SMS messaging feeds with one or more of the netted SMS based transmissions), among other compatibilities to improve and enhance emergency communication.

DESCRIPTION OF THE RELATED ART

When emergencies arise on campuses, such as schools, hospitals, businesses, government buildings, and/or non-governmental organizations, providing information to the community is important in limiting the scope of the emergency. Some current solutions provide text-based notification systems that send a text or SMS broadcast message to all registered users at the same time, informing those registered users of a developing situation and providing relevant information to the user. Most of these systems are strictly one-way, meaning that a SMS broadcast message may be sent to registered users, but registered users cannot contact the administrator regarding a developing emergency, or provide meaningful free-form (i.e., non-preprogrammed) SMS based replies that could potential quicken the resolution of the emergency situation. Even in systems employing some degree of two-way communication, the method of communicating an emergency to system administrators requires either (i) the use of dedicated devices (such as disparately placed call boxes), (ii) the use of preprogrammed responses (i.e., one or two predefined/preselected terms that a system is predesigned to interpret as an understandable response to a common short code SMS based broadcast, e.g., providing a 'YES' response to a broadcast message stating: "Reply 'YES' if you received this message"), (iii) that the information is provided only to a single, central entity (e.g., associated with a single phone number or email address), or (iv) the use of equipment that otherwise limit the efficiency with which communications are processed and distributed, undermining overall effectiveness of such systems. With reference to the use of preprogrammed responses to common short code based SMS broadcast notifications, for example, in current systems responding via SMS to such a common short code sourced SMS broadcast notification is limited in scope as there is no way to derive, or handle in a meaningful way, a non-preprogrammed response to a common short code sourced SMS broadcast notification, thus hindering relevant mass organic bidirectional (i.e., two-way) communication among relevant users. With such a technological hard stop, current systems cannot achieve the level of organic communication between users of disparate technologies (e.g., some app users, some SMS users, some email users, etc.) that is necessary to efficiently address an emergency situation.

Moreover, such conventional systems noted above also generally lack an efficient (e.g., tap to share) or visual (e.g., aerial map) emergency source finding feature (ESFF) to assist emergency responders in pinpointing where the source/cause of an emergency is located, among other information about such area (e.g., where a gunman is on the campus, where such gunman may be headed, what users are located in or near such area, etc.).

BRIEF SUMMARY OF EMBODIMENTS

According to one or more embodiments of the disclosed technology, a community safety system is provided that includes one or more non-transitory computer readable media storing machine readable instructions which, when executed by one or more processing engines, causes the system to: identify a phone number associated with a device from which an incoming free-form SMS message was sent; determine if the phone number identified is associated with a registered user to whom a broadcast notification was caused to be sent, the broadcast notification caused to be sent by an administrator device running a mobile application, a source of the broadcast notification being associated with a common short code; determine, responsive to a determination that the phone number identified is associated with a registered user to whom a broadcast notification was caused to be sent, an amount of time elapsed between the time the last broadcast notification was sent and the incoming free-form SMS message was received; determine, responsive to a determination that the amount of time elapsed was less than a predetermined threshold, an organization the registered user who sent the free-form SMS message is associated with, and contact addresses for one or more other registered users and administrators associated with the organization; and relay the incoming free-form SMS message to the one or more other registered users and administrators associated with the organization; wherein determining an organization the registered user is associated with comprises determining the registered user's location, and identifying an organization within whose security zone boundaries the registered user's location falls.

According to one or more embodiments of the disclosed technology, a community safety system is provided that includes one or more of: a notification management entity comprising one or more servers, the notification management entity communicatively coupled to one or more user devices and one or more administrator devices; a plurality of registered users, wherein each registered user of the plurality of registered users is associated with an organization, and a user category of a set of user categories associated with the organization; wherein the notification management entity maintains a list of the plurality of registered users, the registered user's associated organization, the registered user's user category, and the boundaries of a security zone associated the user's organization, each security zone comprising a continuous geographic area, one or more buildings or other structures, one or more non-continuous geographic areas, or a combination thereof; an SMS messaging application operating on at least one registered user device; a community safety system application operating on at least one administrator device and at least one registered user device; wherein the notification management entity, responsive to receiving an incoming free-form SMS message: identifies a phone number associated with the device from which the incoming free-form SMS message was sent; determines if the phone number identified is associated with a registered user to whom a broadcast notification has been sent, the broadcast notification caused to be sent by an administrator device running the mobile emergency application; determines, responsive to a determination that the phone number identified is associated with a registered user to whom a broadcast notification has been sent, an amount of time elapsed between the time the last notification was sent and the incoming free-form SMS message was received; determines, responsive to a determination that the amount of time elapsed was less than a predetermined threshold, if the incoming free-form SMS message includes a hotkey associated with a subset of users; fetches, responsive to a determination that the incoming free-form SMS message does include a hotkey associated with a subset of users, contact addresses for the subset of users associate with the hotkey; and/or relays the incoming free-form SMS message to the user devices associated with the contact addresses fetched.

In accordance with some embodiments, the notification management entity: determines, responsive to a determination that the phone number identified is not associated with a registered user to whom a broadcast notification has been sent, whether the registered user associated with the phone number has authorization to initiate free-form SMS broadcast notifications; and/or relays, responsive to a determination that the registered user associated with the phone number has authorization to initiate free-form SMS broadcast notifications, the incoming free-form SMS message to the at least one administrator device.

In accordance with some embodiments, the notification management entity: opens a secure communication conference channel between the registered user and the at least one administrator. In some implementations the notification management entity may further monitor communication activity occurring over the secure communication conference channel and/or closes the secure communication conference channel responsive to a determination that the activity occurring over the channel meets a non-utilization criteria. A non-utilization criteria may be met if no communication (or nominal communication) has taken place over the channel for a predefined period of time, or if some other predetermined metric has been satisfied.

In accordance with some embodiments, the notification management entity: notifies one or more additional administrators and one or more additional registered users of the ongoing secure communication conference channel; and/or provides the additional administrators and the additional registered users with an access link and an authentication key to access the ongoing communication conference channel; and/or prompts, upon a recipient administrator's or recipient registered user's selection of the access link for the communication conference channel, the selecting recipient administrator or the selecting recipient registered user to enter the authorization key provided; and/or joins, responsive to a determination that a selecting recipient administrator or selecting recipient registered user has entered the correct authorization key, such selecting recipient administrator or selecting recipient registered user into the secure communication conference channel.

In accordance with some embodiments, the notification management entity: monitors communication activity occurring over the secure communication conference channel; and/or closes the secure communication conference channel responsive to a determination that the activity occurring over the channel meets a non-utilization criteria. A non-utilization criteria may be met if no communication (or nominal communication) has taken place over the channel for a predefined period of time, or if some other predetermined metric has been satisfied.

In accordance with some embodiments, the notification management entity: discards, responsive to a determination that the registered user associated with the phone number does not have authorization to initiate free-form SMS broadcast notifications, the incoming free-form SMS message and terminates further processing of the incoming free-form message. In some instances, discarding the incoming free-form SMS message may involve a deletion operation. In some embodiments, at least one of the at least one administrator devices is associated with an emergency medical services department. And in still further embodiments, the at least one administrator device is outside the boundary of the security zone associated the registered user's organization.

In accordance with some implementations, relaying the incoming free-form SMS message to the registered user devices associated with the contact addresses fetched may include populating a messaging interface of a community safety system application running on one or more of said devices with the text of said incoming free-form SMS message.

According to one or more embodiments of the disclosed technology, a community safety system is provided that includes one or more of: a notification management entity comprising one or more servers, the notification management entity communicatively coupled to one or more user devices and one or more administrator devices; the notification management entity maintaining a list of a plurality of registered users, the registered user's associated organization, the registered user's user category, and the boundaries of a security zone associated the user's organization (each security zone comprising a continuous geographic area, one or more buildings or other structures, one or more non-continuous geographic areas, or a combination thereof). In some embodiments a mobile emergency application may operate on at least one administrator device and at least one registered user device in communication with the notification management entity; and an SMS messaging application may operate on at least one registered user device in communication with the notification management entity.

In some embodiments, the notification management entity, responsive to receiving an incoming free-form SMS message: identifies a phone number associated with the device from which the incoming free-form SMS message was sent; determines if the phone number identified is associated with a registered user to whom a broadcast notification has been sent, the broadcast notification caused to be sent by an administrator device running the mobile emergency application; determines, responsive to a determination that the phone number identified is associated with a registered user to whom a broadcast notification has been sent, an amount of time elapsed between the time the last notification was sent and the incoming free-form SMS message was received; determines, responsive to a determination that the amount of time elapsed was less than a predetermined threshold, an organization the registered user who sent the free-form SMS message is associated with, and the contact addresses for one or more other users and administrators associated with the organization; and/or relays the incoming free-form SMS message to one or more of the other registered users and administrators associated with the organization.

In accordance with some embodiments, the notification management entity: determines, responsive to a determination that the phone number identified is not associated with a registered user to whom a broadcast notification has been sent, whether the registered user associated with the phone number has authorization to initiate free-form SMS broadcast notifications; and/or relays, responsive to a determination that the registered user associated with the phone number has authorization to initiate free-form SMS broadcast notifications, the incoming free-form SMS message to the at least one administrator device.

In accordance with some embodiments, the notification management entity: opens a secure communication conference channel between the registered user and the at least one administrator; and/or monitors communication activity occurring over the secure communication conference channel; and/or closes the secure communication conference channel responsive to a determination that the activity occurring over the channel satisfies a non-utilization criteria. A non-utilization criteria may be met if no communication (or nominal communication) has taken place over the channel for a predefined period of time, or if some other predetermined metric denoting non-utilization has been satisfied.

In accordance with some embodiments, the notification management entity: notifies one or more additional administrators and one or more additional registered users of the ongoing secure communication conference channel; and/or provides the additional administrators and the additional registered users with an access link and an authentication key to access the ongoing communication conference channel; and/or prompts, upon a recipient administrator's or recipient registered user's selection of the access link for the communication conference channel, the selecting recipient administrator or the selecting recipient registered user to enter the authorization key provided; and/or joins, responsive to a determination that a selecting recipient administrator or selecting recipient registered user has entered the correct authorization key, such selecting recipient administrator or selecting recipient registered user into the secure communication conference channel.

In accordance with some embodiments, the notification management entity: monitors communication activity occurring over the secure communication conference channel; and/or closes the secure communication conference channel responsive to a determination that the activity occurring over the channel meets a non-utilization criteria. A non-utilization criteria may be met if no communication (or nominal communication) has taken place over the channel for a predefined period of time, or if some other predetermined metric denoting non-utilization has been satisfied.

In accordance with some embodiments, the notification management entity: discards, responsive to a determination that the registered user associated with the phone number does not have authorization to initiate free-form SMS broadcast notifications, the incoming free-form SMS message and terminates further processing of the incoming free-form message. Discarding the incoming free-form SMS message may include a deletion operation.

In some embodiments, at least one of the at least one administrator devices is associated with an emergency medical services department; and/or the at least one administrator device is outside the boundary of the security zone associated the registered user's organization.

In some embodiments, determining an organization the registered user who sent the free-form SMS message is associated with comprises: determining the registered user's location; and/or identifying an organization within whose security zone boundaries the registered user's location falls.

In some embodiments, determining an organization the registered user who sent the free-form SMS message is associated with comprises: searching a lookup table stored at the notification management entity that includes associated organization information about registered users.

According to one or more embodiments of the disclosed technology, a method is performed including the steps of: identifying a phone number associated with a device from which an incoming free-form SMS message was sent; determining if the phone number identified is associated with a registered user to whom a broadcast notification was caused to be sent, the broadcast notification caused to be sent by an administrator device running the mobile emergency application, the source of the broadcast notification being associated with a common short code; determining, responsive to a determination that the phone number identified is associated with a registered user to whom a broadcast notification was caused to be sent, an amount of time elapsed between the time the last broadcast notification was sent and the incoming free-form SMS message was received; determining, responsive to a determination that the amount of time elapsed was less than a predetermined threshold, an organization the registered user who sent the free-form SMS message is associated with, and the contact addresses for one or more other registered users and administrators associated with the organization; relaying the incoming free-form SMS message to the one or more other registered users and administrators associated with the organization; wherein determining an organization the registered user is associated with comprises determining the registered user's location, and identifying an organization within whose security zone boundaries the registered user's location falls.

According to an embodiment of the disclosed technology, a system and method is provided for bi-directional communication via common short code SMS based notifications, wherein common short code mass SMS notifications, and SMS based responses thereto, may be handled so as to provide organic bi-directional communication among users, or subsets of users. Such systems and methods enable law enforcement, first responders, site administrators and security stake holders to net relevant non-preprogrammed information pertinent to a time sensitive or life-critical situation from numerous (e.g., thousands of users) of common short code notification recipients (and vice versa), increasing information dissemination among users having devices transmitting messages in accordance with disparate communication protocols (e.g., SMS, email, mobile app messaging, etc.), reducing response times, and improving the ability of emergency responders to timely resolve an emergency situation.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 18 is a flow diagram of an example location-based capability determination method including a student-parent association in accordance with embodiments of the technology of the present disclosure.

FIG. 22 illustrates an example process of inter-organizational communication in accordance with embodiments of the technology disclosed herein.

FIG. 23A illustrates an example administrator interface in accordance with embodiments of the technology disclosed herein.

FIG. 23B illustrates an example population status interface in accordance with embodiments of the technology disclosed herein.

Figure 1:
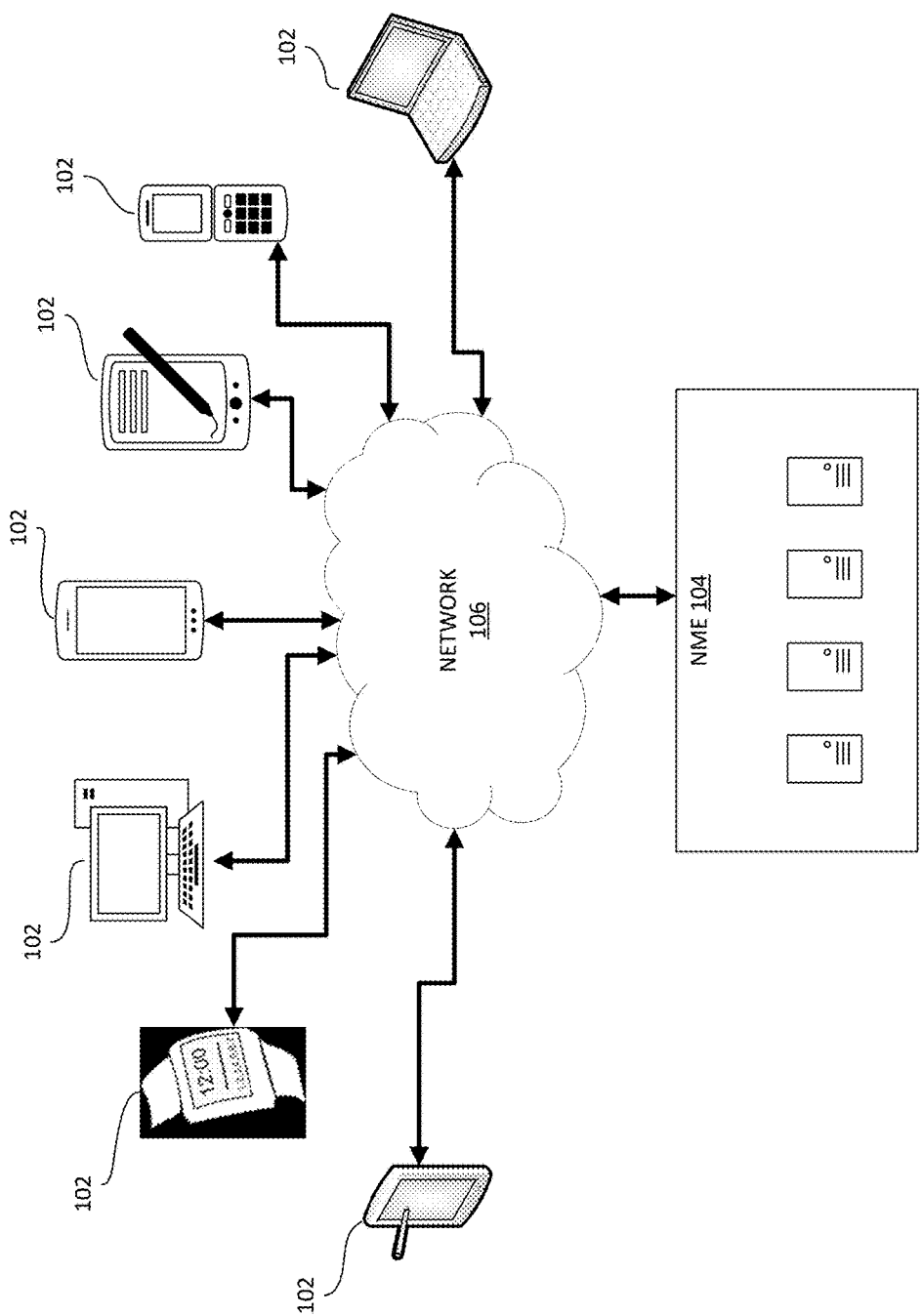
FIG. 1 is an example environment in which embodiments in accordance with the technology of the present disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The technology of the present disclosure addresses many of the drawbacks of current emergency systems for institutions, such as schools, hospitals, large venues, corporations, and other institutions. Embodiments of the technology disclosed herein provide a two-way communication system for initiating and broadcasting alerts of threats and developing emergencies, and receiving and processing replies to such broadcasts, both to and from users of mobile app based messaging, SMS messaging, push notification based messaging, and email based messaging platforms, to achieve an integrated environment where users of many disparate communication protocols/platforms may be in two way communication with one another. In some instances, anyone associated with the system is capable of sending an alert notification to administrators (e.g., those responsible for ensuring the safety of all associated with an institution) of a threat or arising emergency, such as a shooter on an institution's campus, a medical emergency occurring at a particular campus location, or other emergency situations that need addressing. Such alerts may be initiated by use of (i) a community safety system (CSS) application operating on any user device, such as a mobile phone, PDA, smartwatch, laptop, or other mobile device connected to a communication network, such as a cellular network, the Internet, or an intranet, and/or (ii) an SMS based messaging program operating on any user device, such as a mobile phone, PDA, smartwatch, laptop, or other mobile device connected to a communication network, such as a cellular network, the Internet, or an intranet. This alleviates the drawbacks of standard call box technology, and ensures that the most temporally-relevant information is communicated to those in charge from the best source of valuable information—the individual at the scene as it is developing.

Further, embodiments of the technology disclosed herein provide a central management entity for managing communication between members of the institution. When an alert is initiated (whether via a CSS mobile application or SMS messaging program), the central management entity may create a dedicated communication channel between the individual who initiated the alert and one or more of the administrators responsible for protecting those associated with the institution. Individuals may provide additional details to the administrators in real-time directly from the scene, providing invaluable information for addressing and maintaining control of the situation.

The technology of the present disclosure further decentralizes the broadcast notification capability. Administrators are capable of generating broadcast notifications from anywhere via a user device. In some cases, broadcast notifications may be tailored for a specific category of registered users, and transmitted solely to that impacted user category. In this way, more tailored broadcast notifications are possible without the potential to bog down the communication network, alleviating the potential for notification delays due to network congestion. Such issues have arisen in current emergency communication systems, sometimes with notifications not reaching the intended recipients anywhere between two hours after being sent (such as the case with the Virginia Tech campus shooting) to even several days later.

A faster and more effective "lockdown" procedure may be achieved through implementation of embodiments of the present disclosure. A lockdown is a specialized broadcast message intended to notify all those of a serious situation occurring on campus. Generally, to initiate a lockdown procedure, most current systems require that an individual locate a hard wired telephone and enter a code, or trigger the lockdown via a device located in a central location, such as the main office of a school. However, if the emergency itself compromises the central location or renders an individual's ability to reach a telephone improbable, the lockdown is not triggered, meaning that others in the institution will remain ignorant to the dangerous situation. In live shooter drills conducted by police departments, one of the main drawbacks of current systems was the delay in triggering the lockdown procedure and in some instances the inability to trigger the lockdown procedure altogether.

Embodiments of the technology disclosed herein addresses this drawback through a one-touch lockdown initiator (for CSS app users) or a code based SMS message lockdown initiator (for SMS users) that registered users may trigger via any user device. This enables individuals to trigger the lockdown without the need to go to a specific location and use a designated device, allowing the lockdown to be initiated from anywhere. This reduces the potential for the lockdown initiation process to be compromised.

Embodiments of the present disclosure further provide direct police-community interaction, unlike traditional emergency systems. Most current systems are self-contained, meaning that the police are not tied directly into the system. Instead, contact must be made with the police in addition to sending the notification out to members of the community or institution. Embodiments of the technology disclosed herein include a user category for the police, enabling valuable information regarding an emergency directly to the police, instead of needing to be relayed separately. Broadcast notifications may be sent to the police in addition to the rest of the community. Moreover, some embodiments include a special police notification capability. If the central management entity receives two alerts from different individuals within a certain amount of time of each other, the central management entity may send a specialized notification directly to the police indicating a potentially dangerous situation developing. Multiple threats may indicate one large emergency is developing that may require police intervention, or that there are multiple emergencies at one time that the administrators may not be capable of addressing simultaneously.

In addition, by including the police within the emergency communication system, the police are capable of directly interacting with members of the institution. Police may initiate alerts and generate broadcast messages via a user device in the same way as any other member of the institution. This incorporation of the police within the system helps build a greater relationship between the police and members of the institution, while allowing the police to directly communicate important information to individuals in an efficient and effective manner.

Unlike many current systems, the embodiments of the technology disclosed herein address many of the privacy concerns arising in the new digital age. In cases where members interact with the system via SMS messaging or an application downloaded onto a user device (e.g., a CSS App of the instant disclosure), such as a mobile phone or tablet computer, the need to ensure privacy is important. This is especially true where embodiments are implemented at schools, where the privacy of the student is a major concern, as well as other organizations where maintaining the privacy of occupants, personnel, patrons, or other constituents is critically important (e.g., hospitals, government entities). Although the central management entity (e.g., a notification management entity) is capable of obtaining location data regarding each user, such location information-obtained via a GPS receiver or other location service of the user device—may not be obtained or logged until the user attempts to initiate an alert. Even then, in some embodiments the central management entity may be configured such that it does not track an individual's location once the initiated alert is ended. Moreover, in some embodiments the information is only obtained by the central management entity; no location data for a user is stored or obtained directly by an administrator, the police, emergency medical services (EMS) (e.g., police, fire departments, ambulances), or any organization utilizing the system. To further increase privacy and security, no information regarding individuals are stored at the user device, only at the central management entity. In this way, information is made available only when it is necessary to address an ongoing emergency.

Before describing in detail the technology of the present disclosure, it may be helpful to describe an example environment in which embodiments of the technology may be implemented. FIG. 1 shows an example Community Safety System (CSS) 100 in which embodiments of the technology disclosed herein may be implemented. A plurality of user devices 102 are connected with a notification management entity (NME) 104 through a network 106. The type of communication network represented by network 106 may vary, depending on the communication protocol available to the user devices 102 at a given time. Some non-limiting examples of communication protocols over which the user devices 102 may connect to the network 106 include: cellular telecommunications protocols, such as GSM, UMTS, CDMA2000, LTE, or WiMAX; wired communication methods, such as cable, DSL, dial-up, or fiber-optic; or wireless communication methods, such as satellite communications, Wi-Fi, Bluetooth, or near-field communication (NFC). The user devices 102 may be able to utilize more than one type of communication protocol to connect with the network 106 in some embodiments.

User devices 102 may be any number of computing devices, having a memory and processor. Non-limiting examples of user devices 102 are: desktop computers; laptops; tablets; cell phones; smart phones; wearable technology, such as smart watches; PDAs; or other communication devices. In some embodiments, an alert system application (sometimes referred to herein as a CSS App) running on the user devices 102 provides a user interface that enables users to communicate with the NME 104 through the network 106. The alert system application may be an application downloaded to the user devices 102 and stored in memory. In some embodiments, an SMS messaging program running on the user devices 102 provides a messaging interface that enables users to communicate with the NME 104 through the network 106 via SMS messaging protocols. In some embodiments, the alert system application and/or the SMS messaging program may be operating within another program running on a user device 102, such as a web browser.

The user devices 102 communicate with the NME 104 through the network 106. The NME 104 comprises one or more servers. In various embodiments, the NME 104 may be a data center where all the one or more servers are physically co-located. Other embodiments may have the one or more servers being located in different physical locations, with each of the servers being connected in a distributed computing network. In some embodiments, at least one of the one or more servers may be a virtual server. The NME 104 may comprise a cloud server. In various embodiments, the NME 104 may comprise a combination of these different server types.

Having thus described an example environment in which the disclosed technology can be implemented, various features and embodiments of the disclosed technology are now described in further detail. After reading the description herein, it will become apparent to one of ordinary skill in the art that the disclosed technology can be implemented in any of a number of different environments operating with any of a number of different user devices 102.

Figure 2:
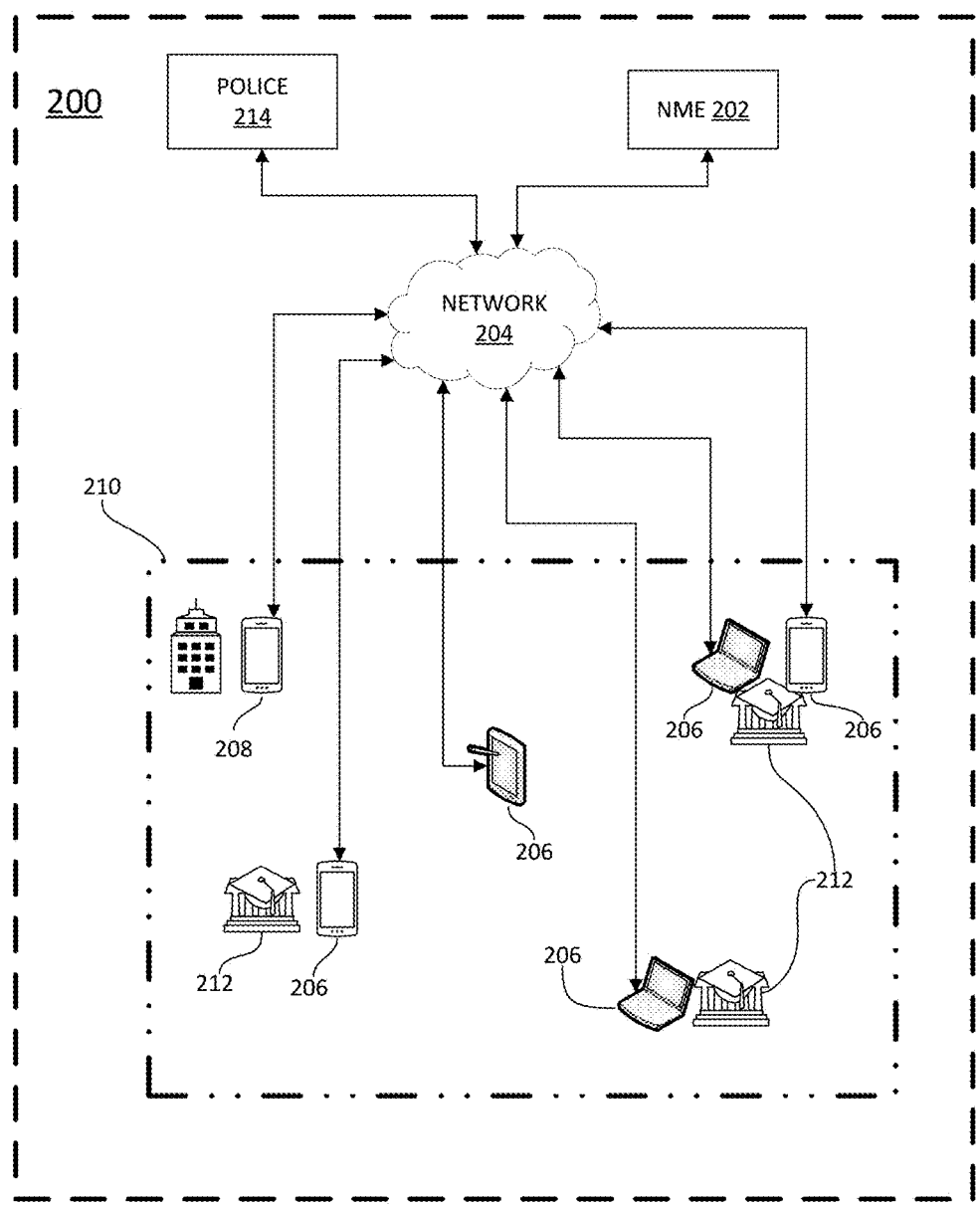
FIG. 2 is an example community safety system in accordance with embodiments of the technology of the present disclosure.

Embodiments of the technology disclosed herein provide an emergency notification system, the CSS including an NME (or other central management entity), for use by communities and different entities such as schools, hospitals, and malls. The CSS notifies communities members of ongoing emergencies and dangerous situations relevant to the community members. In addition, the CSS provides a secure, two-way communication system to enable community members to notify administrators, police, EMS and/or other responders of dangerous situations and emergencies occurring at the time. FIG. 2 illustrates an example implementation of the CSS 200 on a school campus in accordance with the technology disclosed herein. For ease of discussion, the various features of the CSS 200 will be described herein in reference to an example implementation on a school campus. The use of a school campus as the example environment in no way should be read to limit the application of the technology described herein to only that environment. After reading the description herein, it will become apparent to one of ordinary skill in the art that the disclosed technology can be implemented in any of a number of different communities, including hospitals, malls, airports, exhibition halls, and other large areas where many people may be present.

The CSS 200 includes an NME 202, a plurality of user devices 206, at least one administrator device 208, and a connection to the police 214. It should be appreciated that the police is used as just one example of the type of EMS entity that may be connected within the CSS 200. Any EMS organization, public or private, or any other type of organization may be tied into the system and capable of receiving or sending any one or more of the notifications and alerts discussed herein. In various embodiments, the NME 202 may be similar to the NME 104 described with respect to FIG. 1. A plurality of NMEs may be deployed in some embodiments, each NME 202 servicing a particular security zone 210 (sometimes referred to herein as a zone of interest). The security zone 210 may be a single building 212 (i.e., a school building) or multiple buildings 212 comprising a campus. In various embodiments, the security zone 210 may encompass a continuous geographic area (e.g., defining a campus or other zone of interest), or it may encompass one or more geographically separate areas (e.g., the separate areas together defining a campus (or other zone of interest), such as satellite buildings located a few blocks away from a main campus). The security zone 210 may also encompass a buffer area around the zone of interest (e.g., a buffer area around the campus). For example, the security zone 210 may encompass all the buildings 212 within the campus, as well as a buffer zone comprising all the surrounding area within 100 feet of the campus.

Each of the plurality of user devices 206 and the administrator device 208 can communicate with the NME 202 over a network 204. The network 204 may be similar to the network 106 described with respect to FIG. 1. The network 204 may provide the channel through which alerts and other notifications may be sent via the NME 202 to and from user devices 206 and/or at least one administrator device 208.

Although identified as user devices 206 and administrator device 208, both categories of devices may be similar to the user devices 102 discussed above with respect to FIG. 1. For example, the administrator device 208 may also be one or more of: desktop computers; laptops; tablets; cell phones; smart phones; wearable technology, such as smart watches; PDAs; or other communication devices. The differentiation between user devices 206 and administrator devices 208 is related to the user category associated with the particular device at the time of operation, based on the method of registration with the NME 202. Registration shall be discussed in detail below.

The NME 202 is responsible for ensuring a secure and private connection between the user devices 206 and the at least one administrator device 208. As will be described in more detail below with respect to FIGS. 3-16, when the NME 202 receives an alert from one of the user devices 206, the NME 202 may create a secure communication channel between the user device 206 that sent the alert and at least one of the administrator devices 208 registered with the system. The NME may optionally allow select additional users (who the alert may be relevant to, or who have generated similar alerts, or alerts from similar locations, for instance) to join the secure communication channel (e.g., to dial-in to a secure conference call). The secure communication channel provides at least two-way communication between the user who initiated the alert via the user device 206 and an administrator using the administrator device 208; and optionally multi-way communication between multiple users and/or multiple administrators via their respective devices. In this way, users may provide valuable additional information regarding the extent of the emergency. For example, if a medical emergency is occurring, the user can inform the administrator of the type of medical emergency is ongoing, such as an allergic reaction. With this additional information, the administrator using the administrator device 208 can identify the best course of action to address the situation.

In addition to creating secure communication channels, the NME 202 may also maintain a listing of all registered users on the CSS 200, and the user category to which they belong. For example, an CSS 200 implemented for a school environment may have the following types of user categories: students; teachers; and administrators. In other embodiments, greater or fewer categories may be included, depending on the granularity desired by the implementing institution. Each user category may have different capabilities. For example, a student may be able to initiate an alert and view broadcasted messages, while a teacher may be able to initiate an alert, view broadcasted messages, and initiate lockdown procedures via a lockdown button. In some embodiments, a "parents" user category may be included, which may be associated with a registered student to provide additional functionality to the student user. A more detailed discussion of the different capabilities available to each example user category will be discussed with respect to FIGS. 3-16.

The CSS 200 may include a connection to the police 214 (or other EMS). In various embodiments, other emergency management entities may be included in lieu of, or in addition to, the EMS. Some non-limiting examples of other emergency management entities may include hospitals, fire departments, or authoritative entities (e.g., private health and emergency organizations). In some embodiments, governmental agencies (e.g., FEMA, DHS, etc.) may also be connected within the CSS 200. A person of ordinary skill in the art would appreciate that the discussion herein, whether explained with respect to EMS interconnection generally or a single EMS entity such as the police, is applicable other emergency management entities, governmental agencies, or any organization desired for a given implementation of the presently disclosed technology.

Referring to FIG. 2 by way of example, the police 214 may interact with the CSS 200 in a variety of ways. In some embodiments, the police 214 may have a central terminal installed at one or more police departments within a certain distance of the security zone 210, such as, for example, a desktop computer. Police officers on duty and responsible for the area within which the security zone 210 is located may have administrator devices 208 in various embodiments that are connected to the NME 202 over the network 204.

By including the police 214 (or other EMS, for example) within the CSS 200, greater community-police interaction (or other community-EMS interaction, for example) is possible, thereby enabling the exchange of information between the two entities. In addition, by looping the police 214 (or other EMS, for example) into the CSS 200, response time to emergencies may be reduced, and the information communicated to the EMS entities may result in an improved response (as more information as to the situation is conveyed faster). In some embodiments, the CSS 200 may include a police (or other EMS) notification trigger, which in some embodiments may be a threshold related to the number of alerts received by the NME 202 within a given period that sends a special notification to the police 214 (or other EMS) of one or more emergencies ongoing in the security zone 210.

For example, if the NME 202 receives two or more alerts within a five-minute period, the NME 202 immediately transmits the alert (or other notification) to the police 214. In this way, no one individual need contact the police such that, if the main office is compromised for some reason, the police will still be notified without requiring a person to physically pick up the phone and dial 911.

Figure 16:
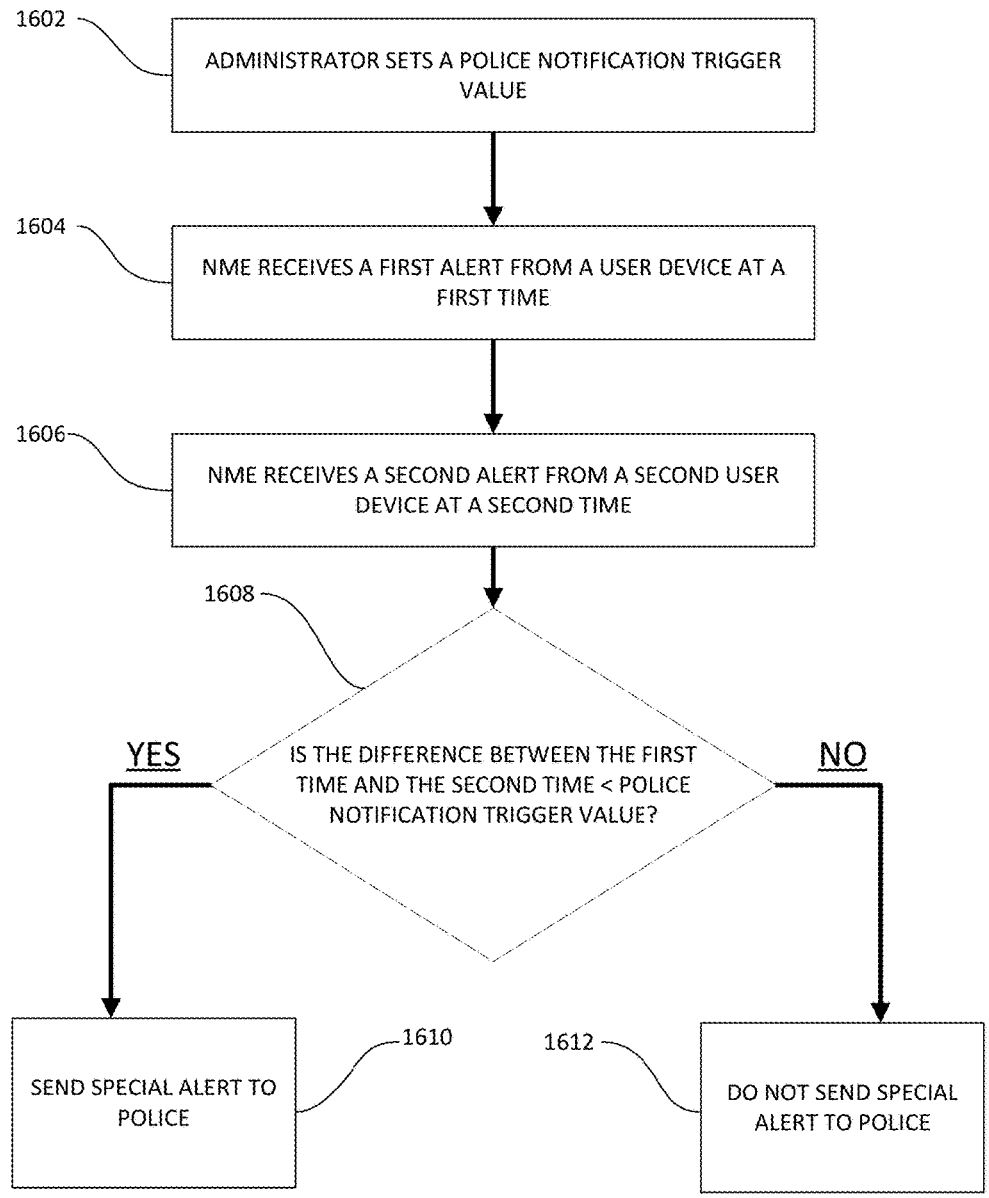
FIG. 16 is a flow diagram of an example threshold-based automatic police notification method in accordance with embodiments of the technology of the present disclosure.

FIG. 16 illustrates an example threshold-based automatic notification method in accordance with embodiments of the technology of the present disclosure. Utilizing embodiments of the threshold-based automatic police notification method enable a NME 202 to alert police without the need for an administrator to initiate an alert be sent to the police 214. At 1602, an administrator sets a police notification trigger value. The police notification trigger value may be a set period between alert notifications received from multiple users in some embodiments, such that the NME 202 will send a broadcast notification to the police 214 (in the illustrated example) if the time between two consecutive alert notifications received by the NME 202 from two registered users is less than the set period. In various embodiments, the police notification trigger value may be a set number of notifications received by the NME 202 during a set period, such that if the NME 202 receives four or more alert notifications within five minutes, the NME 202 immediately notifies the police 214. If the police notification trigger value is not exceeded in such embodiments prior to expiration of the period, the process starts over again.

At 1604, the NME 202 receives a first alert from a user device at a first time. The NME 202 records the time of the first alert. In some embodiments, the user device of 1604 may be an administrator device, i.e. a device utilized by a registered user associated with an administrator user category who is logged into a CSS application operating on the device. At 1606, the NME 202 receives a second alert from a second user device at a second time. Again, the NME 202 records the time of the second alert.

At 1608, the NME 202 identifies the period between the first time of the first alert and the second time of the second alert, and determines whether that period falls within the police notification trigger value set by the administrator at 1602. If YES, at 1610 the NME 202 transmits a special alert to the police 214. In some embodiments, the special alert may comprise a broadcast message to one or more administrator devices associated with the police 214 indicating that multiple events are developing on campus. The NME 202 may attach a detailed listing of the types of emergencies ongoing to the special alert in various embodiments, to provide the police 214 with additional relevant information.

If the period between the first time of the first alert and the second time of the second alert is greater than the police notification trigger value set by the administrator at 1602, the NME 202 does not take any action outside its normal operation, illustrated at 1612. Though the foregoing threshold-based automatic notification technology has been discussed with reference to a connection with the police, it should be appreciated that this is merely presented as one useful but nonlimiting example of the presented technology. Indeed, it should be appreciated that the technology disclosed herein may extend to implementations having connections to one or more other EMS entities or other organizations, depending on the desired objectives.

The users, administrators, and police may interact with the CSS 200 through: (i) a CSS application (sometimes referred to herein as a CSS App or CSS mobile app) operating on the user devices 206 or administrator devices 208; (ii) an SMS messaging program operating on the user devices 206 or administrator devices 208 (discussed in further detail with reference to FIGS. 25-32B); or (iii) another portal accessible via the user devices 206 or administrator devices (e.g., a web browser, etc.). The CSS application and/or SMS messaging programs and/or other portals may provide a user interface through which a user, administrator, or the police may send and receive alerts and communications through the NME 202 of the CSS 200. As discussed above, the CSS 200 may provide different user categories that may be associated with different registered users, providing different capabilities based on the associated user category (e.g., different categories of users having different permissions/authorizations to perform one or more actions in connection with CSS 200).

Accordingly, in some embodiments each user is registered with the NME 202 prior to being included within the CSS 200. In some embodiments, the registration may be based on the particular user device 206 or administrator device 208 on which the CSS application is operating. In some embodiments, the registration may be based on a predefined SMS subscription keyword sent to the NME when an initially unregistered user sends a message containing the keyword to a common short code associated with the NME. Non-limiting examples of information indicative of the specific device that may be utilized for registration include: Internet protocol (IP) address of the device; media access control (MAC) address of the device; serial number of the device; phone number associated with the specific device; and other unique identifiers associated with user devices 206 and administrator devices 208. In other embodiments, registration may be based on unique identifiers related to a particular user logged into the CSS application operating on a user device 206 or administrator device 208, or based on unique identifiers related to a particular user associated with the number that sent an SMS message to the NME of a CSS. Non-limiting examples of unique identifiers related to a particular user include: an email address; a phone number a username; or the last four digits of the user's social security number; or any other unique identifier.

Privacy is a key concern in developing an emergency alert system similar to embodiments in accordance with the technology discussed herein. Although it is important to know who is generating alerts and their associated with an institution, it is important to make sure that not too much information is obtained that a person's privacy is thought to be violated. This is enhanced when dealing with minors, such as primary school-aged students, or when dealing with personnel or other occupants of information sensitive organizations, such as government agencies, the military, hospitals, or non-governmental agencies (NGOs), to name a few. In some cases, the registration process may only require the user's first and last name, and an associated email address. In this way, the person is identified by their given name, and the email address may be used for verification purposes.

Through registration, the NME 202 is capable of monitoring what users are capable of generating alert notifications. In addition, registration enables the NME 202 to include identifying information of the user, such as the user's name, to curtail the possibility of false alert generation by anonymous users. In some embodiments, the NME 202 may require that an administrator or supervisor of the institution implementing the CSS 200 must verify any user attempting to register with the CSS 200 before the user is permitted to access the NME 202. The addition of users may need to be conducted by the implementing institution in some embodiments, instead of allowing individual users to attempt to register themselves. User information may be inherited from one or more databases or management information systems associated with an institution or organization in various embodiments. For example, where the CSS 200 is implemented within a school environment, user information could be inherited from school or school district databases, such as a student information system managed by the school district. When the student graduates or leaves a particular school, the CSS 200 can update based on information from the student information system indicating that the student is no longer associated with that particular school or CSS 200, and may remove them from the system.

Although described with respect to a single institution, the CSS 200 may include multiple physical institutions, e.g., the CSS 200 covers an entire school district with multiple individual schools. In such embodiments, the CSS 200 may be managed by a school district. The NME 202 may be configured to dedicate one or more servers to each school, creating multiple sub-CSS domains within the CSS 200. The multiple sub-CSS domains may be serviced by all the servers of the NME 104 in some embodiments, and the NME 104 may be configured to provide additional processing power to a particular sub-CSS domain based on the bandwidth necessary at a particular time, i.e., if an emergency is ongoing and messages need be sent to a large number of registered users. In this way, the CSS 200 enables robust response and can ensure that messages are delivered in a timely fashion.

As discussed above, each user category may be provided different capabilities within the CSS 200. In the present example implementation on a school campus, there are five different user categories: student; parent; teacher; administrator; and police. Although the present example has five categories, other example implementations may have greater or fewer user categories, depending on the different types of users that may be present in the security zone 210, or the number of differences in capabilities that the implementing institution wants to provide.

Each user, administrator, and police department/officer may interact with the CSS 200 through: (i) a CSS application operating on the user devices 206 or the administrator device 208; (ii) an SMS messaging program operating on the user devices 206 or administrator devices 208 (discussed in further detail with reference to FIGS. 25-32B); or (iii) another portal accessible via the user devices 206 or administrator devices (e.g., a web browser, etc.). The capabilities available to each user are dependent on the user category associated with the user. When a registered user logs into the CSS application on a device the NME 202 identifies the user category to which the logged-in user is associated and provides a user interface enabled with the capabilities available for that user category. Similarly, when a registered user sends an SMS message to the common short code associated with the NME 202, the NME 202 identifies the user category to which the sending user is associated and may further transmit communication to the user through the SMS messaging interface the user is already using on their device. FIGS. 3-16 are example user interfaces provided via an example CSS application in accordance with the technology of the present disclosure. Although FIG. 3-16 depict an interface of an example CSS app running on a device connected to the CSS, it should be note that similar functionality may be implemented with respect to users having devices that are not running the CSS (i.e., the same or similar functionality may be extended to users communicating with SMS based messaging not conducted through the CSS App—discussed in more detail with reference to FIGS. 25-32B. Example embodiments identifying different capabilities for the example user categories identified above will be described within reference to FIGS. 3-16.

Figure 3:
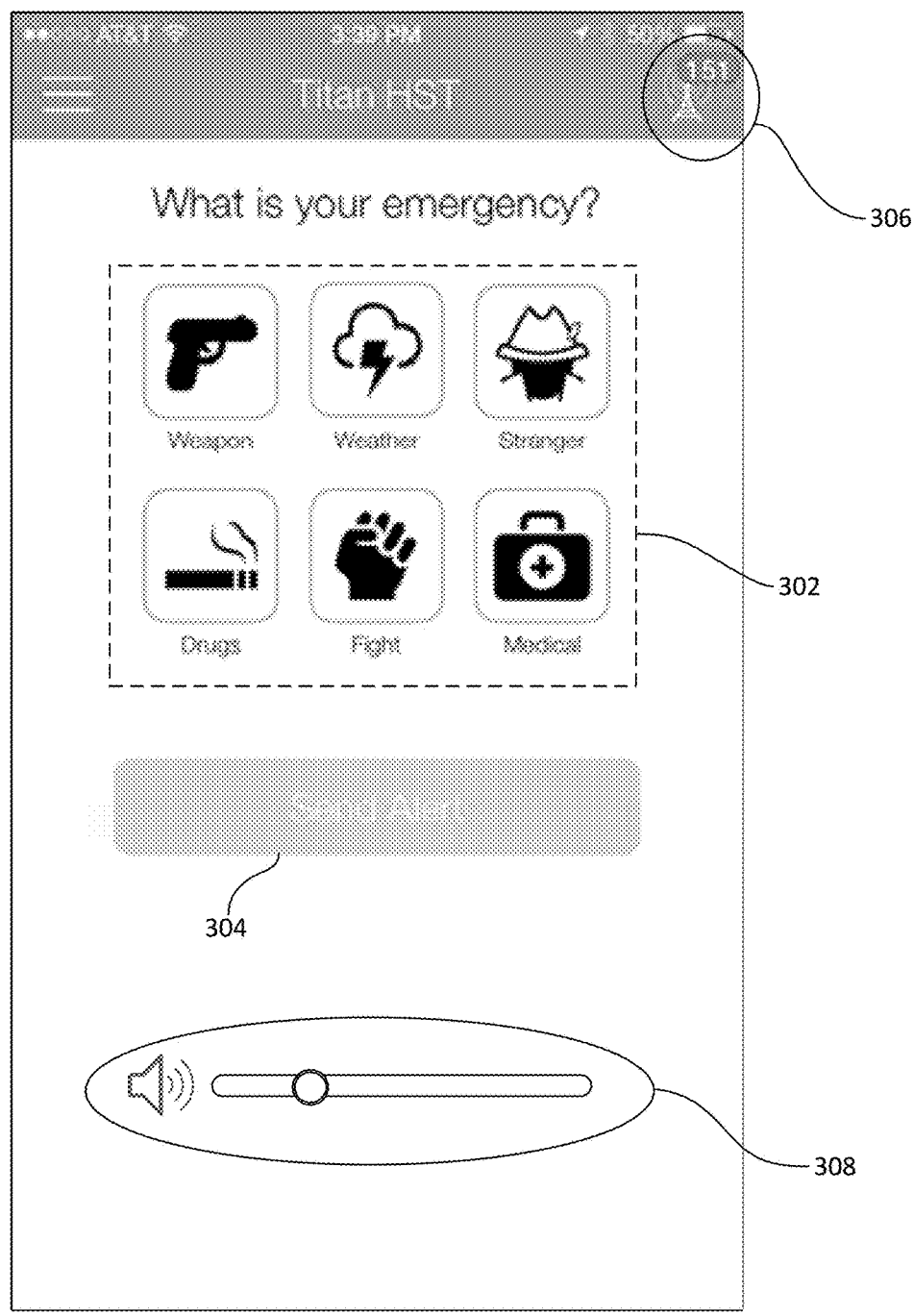
FIG. 3 is an example student interface of an example community safety system interface operating on a user device accordance with embodiments of the technology of the present disclosure, implemented in an example school environment.

FIG. 3 is an example student user interface 300 in accordance with various embodiments of the technology disclosed herein. Throughout the instant disclosure certain categories of users, such as students, may be referred to as non-administrators when, depending on the implementation, they are not associated with an administrator category and do not have administrator capabilities. For instance, in the example school campus implementation, the student user interface 300 may be thought of simply a non-administrator user interface associated with a student user category. Through student user interface 300, a student may be allowed to generate an alert and view broadcast messages. As illustrated in FIG. 3, the student user interface 300 includes an alert type area 302. A student may use the alert type area 302 to select a type of alert to generate. In various embodiments, the alert type area 302 may include a set of pre-defined alert types represented by selectable icons. In the illustrated student user interface 300, the alert type area 302 includes several pre-defined alert types: an alert for a weapon on campus; an alert for weather-related emergencies; an alert for an unknown or suspicious person being on or near campus; an alert for drug use or sales occurring on campus; an alert for a fight about to start or ongoing; and an alert for a medical emergency. Additional categories may be included in other embodiments, such as a type for maintenance-related emergencies (i.e., water pipe burst on campus). A user-definable type may be included in some embodiments to enable the student to provide their own defined type of emergency, in the event the emergency does not fall within the pre-defined types in the alert type area 302.

Once the student has selected the type of alert from the alert type area 302, the student can send the alert by clicking the "Send Alert" button 304. By hitting the "Send Alert" button 304, an alert notification is sent to the NME 202 illustrated in FIG. 2. In some embodiments, the alert may be sent after a certain amount of time passes after the student selects the alert type in the alert type area 302, without the need to hit a "Send Alert" button 304. In some situations, it may be better and safer to enable a one-touch alert, instead of requiring the student to hit the "Send Alert" button 304. Various embodiments may include a quick-alert shortcut, wherein the user may bypass the need to hit the "Send Alert" button 304. Where the CSS application is running on a device having a traditional input system (e.g., a mouse), the student may simply double-click the selectable icon within the alert type area 302, immediately sending the alert. Where the CSS application is running on a device having a touchscreen or other pressure sensitive input, the CSS application may immediately send the alert based on the pressure applied in selecting the selectable icon. Light pressure may select the selectable icon, but heavy pressure may select the type of alert and initiate the alert in one motion.

After receiving the alert from the student, the NME 202 identifies the registered individuals associated with the administrator user category, and sends the alert to one or more of those identified administrators. By alerting those associated with the administrator user category, those with the authority to initiate a lockdown procedure can determine whether such a procedure is necessary, based on the nature of the received alert. In some embodiments, the NME 202 may send the alert to all the administrators associated with the administrator user category. In various embodiments, the NME 202 may send the alert to a subset of those associated with the administrator user category.

Figure 4:
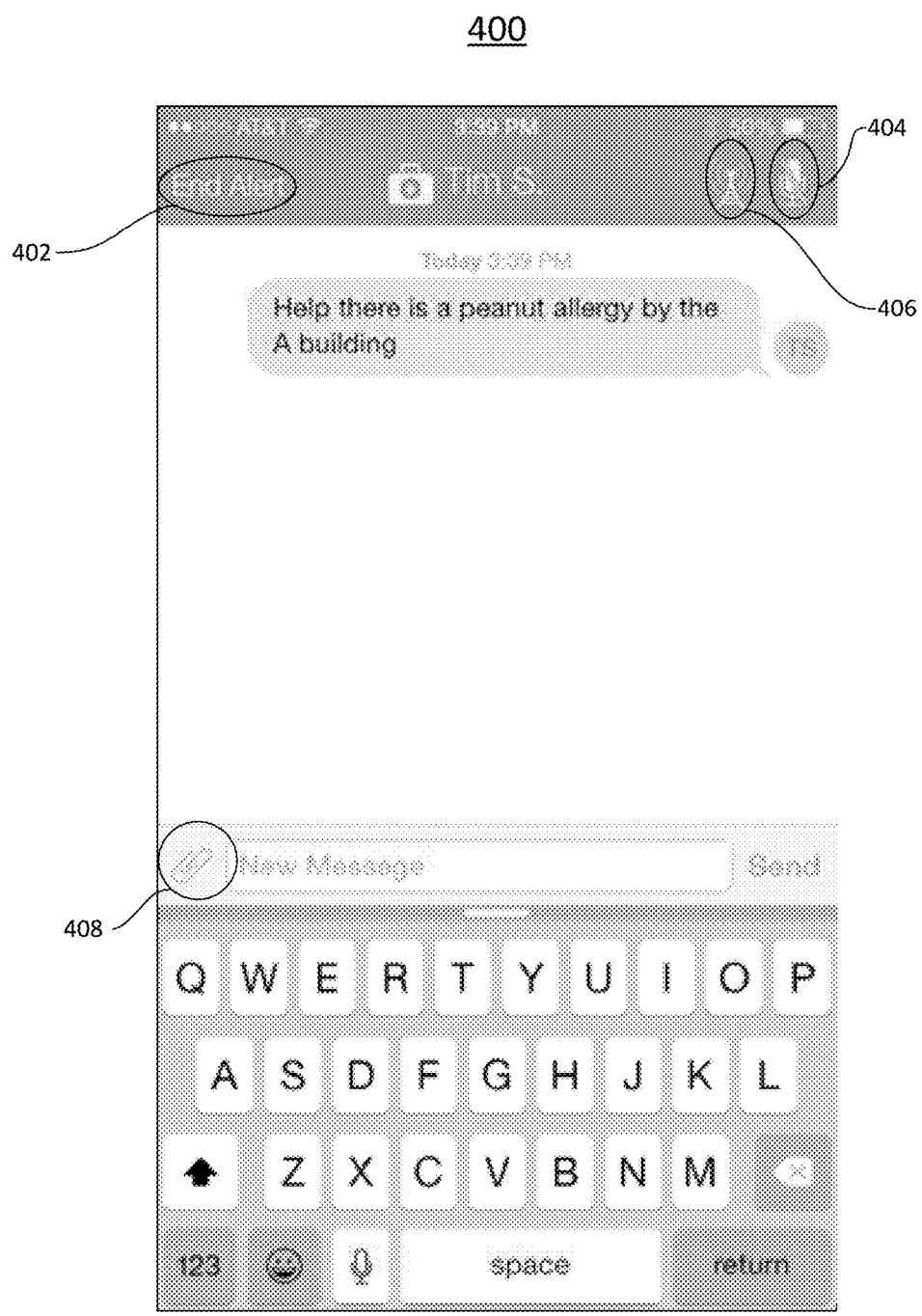
FIG. 4 is an example communication channel interface of an example community safety system application operating on a user device in accordance with embodiments of the technology of the present disclosure.

In addition to routing the alert to one or more of the registered administrators, the NME 202 also opens a dedicated communication channel between the student's user device 206 and one or more of the administrator's administrator devices 208. FIG. 4 illustrates an example communication channel interface 400 opened in the CSS application operating on the student's user device in accordance with embodiments of the technology of the present disclosure. By providing the communication channel, administrators are capable of obtaining additional information regarding the ongoing emergency from the student who initiated the alert. The NME 202 opens the communication channel interface 400 in the CSS application operating on the student user device 206 immediately after the student sends the alert in some embodiments. In other embodiments, the NME 202 may delay in opening the communication channel interface 400 on the student user device 206 until at least one of the administrator devices 208 acknowledges the alert and is ready to speak with the student. A similar communication channel interface 400 is also opened on at least one of the administrator devices 208 that acknowledge the alert. In some embodiments, more than one administrator device 208 may acknowledge the alert, and the NME 202 will open a similar communication channel interface 400 on each acknowledged administrator device 208. In such embodiments, a group communication is established between the student user device 206 and each acknowledging administrator device 208, allowing all participants to see the ongoing communication.

The ability for two-way communication between the student who initiated the alert and the one or more administrators enabled by the communication channel interface 400 opened by the NME 202 improves on the traditional one-way notification systems currently employed on institutional campuses. Allowing students to initiate alerts via a user device 206 from anywhere on campus reduces the time necessary to provide valuable information to administrators or the authorities, alleviating the issues related to stationary call boxes. Further, information may be gathered in real-time, removing the delay between the identification of an emergency and administrators and authorities arriving at the scene.

In some embodiments, students and administrators may transmit more than just text-based messages to each other, further improving upon the current systems. As illustrated in FIG. 4, the communication channel interface 400 may include the ability to send voice recordings by toggling a microphone button 404. When engaged, the microphone button 404 activates the microphone of the user device 206 to enable the student to record a message to send to the one or more administrator devices 208. In some embodiments, the microphone button 404 may open an audio stream through the NME 202 in the event that the student is unable to type a text-based message or wants to allow the administrators to listen to everything that is ongoing. Where the user device is equipped with a camera, the microphone button 404 (or other button) may open a video and/or audio stream through the NME 202, such that images and/or audio of the scene may be streamed to the requisite administrators, EMS personal, organizations, or other crisis managers, in various embodiments.

Students may also attach files to send to the one or more administrator devices through the communication channel interface 400 by selecting an attachment button 408. The files attached by the student may be files stored in the memory of the user device 206 in some embodiments. The files may include documents, photos, video, or other data item that the student wants to send to the administrator devices. In some embodiments, students may also be able to send stored video clips or streaming video through the communication channel interface 400 to the administrator devices 208.

Although described in relation to the capabilities of the student within the communication channel interface 400, each administrator may be able to send text, audio, video, or other types of data to the student via the similar communication channel interface operating on the administrator devices 208.

In various embodiments, once the student has initiated an alert through the student user interface 300 of FIG. 3, the student may only communicate with administrators until the alert is ended. The communication channel interface 400 of FIG. 4 may include an "End Alert" button 402 in some embodiments, which a student may use to end an alert that that student initiated through an CSS application operating on the student's user device 206. In some embodiments, students may only end alerts that the particular student initiated; those associated with the student user category do not have the capability to end alerts initiated by another person.

Referring back to FIG. 3, the example student user interface 300 may further include an audible alert trigger 308 in various embodiments. Some emergency situations may require an audible and visible alert at the scene. For example, if a student is being stalked or followed by a stranger, or is being assaulted, alerting those within the vicinity as to the emergency may help cease or prevent further harm. In various embodiments, a student may trigger an audible alarm by sliding the audible alert trigger 308. Where the student's user device includes a touch screen, the student may trigger the audible alarm by swiping the audible alert trigger 308 to one side. The direction of the swipe may be configured based on the dominant hand of the student: in some embodiments, the swipe may be to the left, in other embodiments, the swipe may be to the right. In some embodiments, the student may be able to swipe in the left or right direction. When used, the audible alert trigger 308 of the CSS application may initiate a loud alarm sound utilizing speaker included within the user device, alerting those nearby of an emergency and potentially scaring off the suspicious character or attacker. In various embodiments, the audible alert trigger 308 may also trigger a visible indicator, such as flashing a light included within the user device.

To ensure that students do not accidently initiate the audible alert trigger 308, the CSS application may identify whether a swipe was intended or not in various embodiments. The CSS application may only initiate the audible alert if the student swipes the audible alert trigger fully across the screen, indicating that the student truly intended to initiate the alert. If the student does not fully swipe across the screen, the audible alert trigger 308 may return to its original position and the CSS application would not initiate the audible alert.

Both the example student user interface 300 and the communication channel interface 400 allow a student to view broadcast notifications by clicking on a broadcast message button 306, 406. Broadcast messages are notifications broadcast by one or more administrators to all registered users of the CSS 200 of FIG. 2, providing information regarding emergencies occurring within the security zone 210. In this way, the broadcast messages keep everyone informed of ongoing situations, and can be used to provide relevant information, such as locations of protection, open exits, and to warn those not within the security zone 210 to stay away until the emergency is resolved. The broadcast message button 306, 406 may be represented by an icon, like the radio tower icon in the illustrated examples of FIGS. 3 and 4. In other embodiments, the broadcast message button 306, 406 may be a text button, similar to the illustrated example "End Alert" button 402. Other buttons, sliders, or selectable display object may be utilized to trigger the transmission of broadcast messages, or alternatively to end an alert originally sent as a broadcast message.

Figure 5:
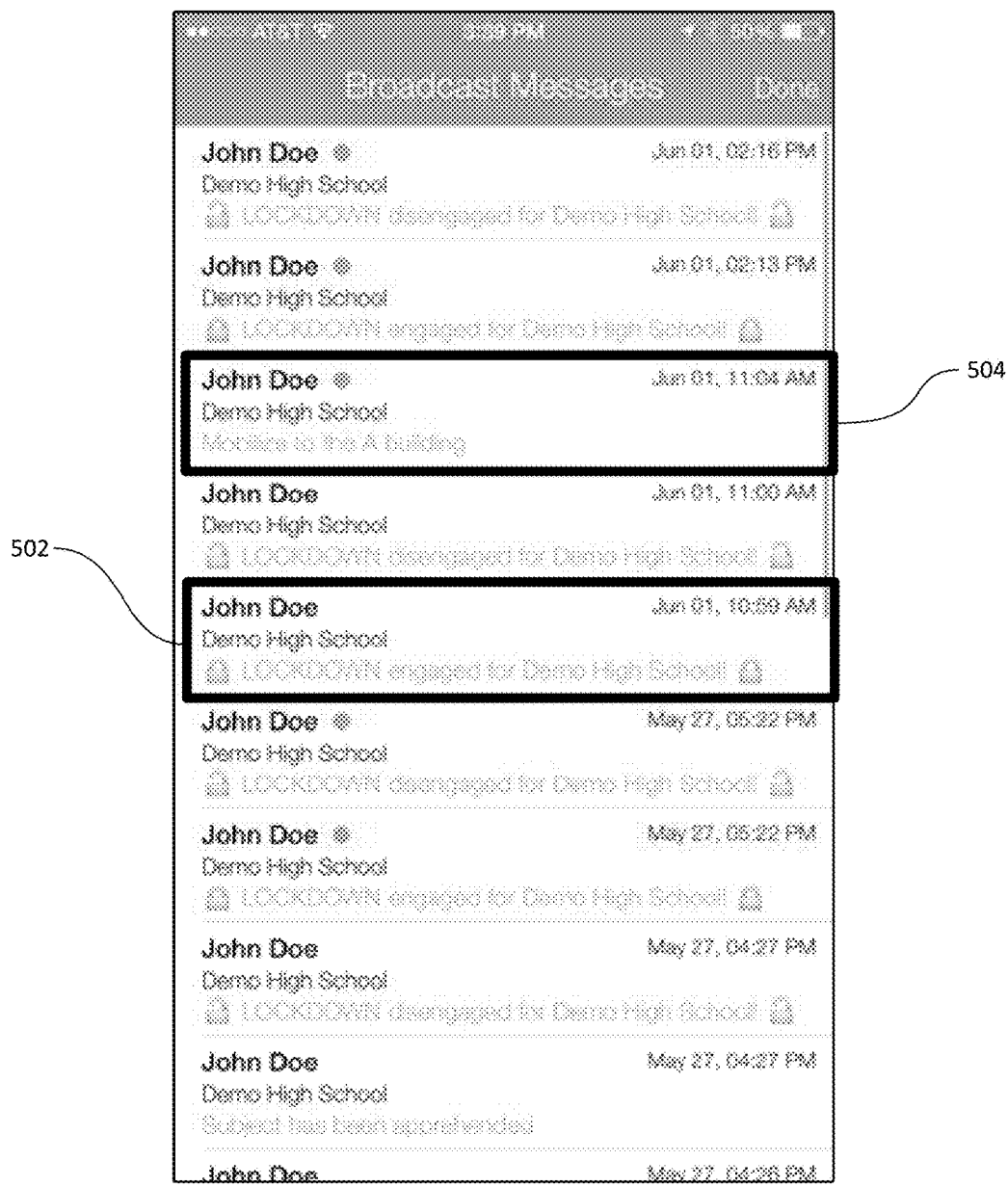
FIG. 5 is an example broadcast message interface of an example community safety system application operating on a user device in accordance with embodiments of the technology of the present disclosure.

An example broadcast message interface 500 in accordance with the technology disclosed herein is illustrated in FIG. 5. As illustrated, the broadcast message interface 500 includes a listing of the broadcast messages sent by administrators and/or the police (or other EMS entity) to all registered users of the CSS 200 of FIG. 2. An example broadcast message 502 shows a broadcast message related to an initiated lockdown procedure. Another example broadcast message 504 shows a broadcast message containing evacuation or relocation information related to an emergency occurring at Demo High School. The broadcast message interface 500 may store a listing of all the broadcast messages sent by administrators and/or police to the registered users of the CSS 200 in some embodiments. In other embodiments, the broadcast message interface 500 may list only the last x number of broadcast messages, such as the last 10, 20, or 35 broadcast messages. Each broadcast message shown in the broadcast message interface 500 may have an expiration value in various embodiments, wherein the broadcast message is no longer shown in the broadcast message interface 500 after a certain amount of time, or other measurement variable (i.e., only the last four broadcast messages are shown). The broadcast message notifications visible in the broadcast message interface 500 may be stored locally on a user device or an administrator device, or the notifications may be stored at the NME and pushed or pulled to the user device or administrator device when the broadcast message button 306, 406 is activated.

Figure 19C:
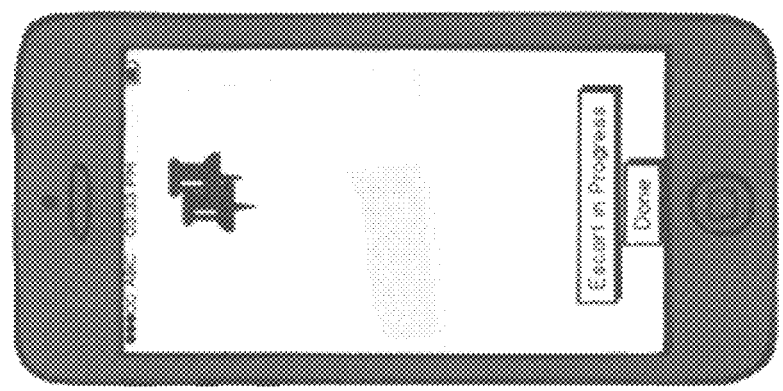
FIGS. 19A, 19B, and 19C illustrate an example escort request interface in accordance with embodiments of the technology of the present disclosure.
Figure 19B:
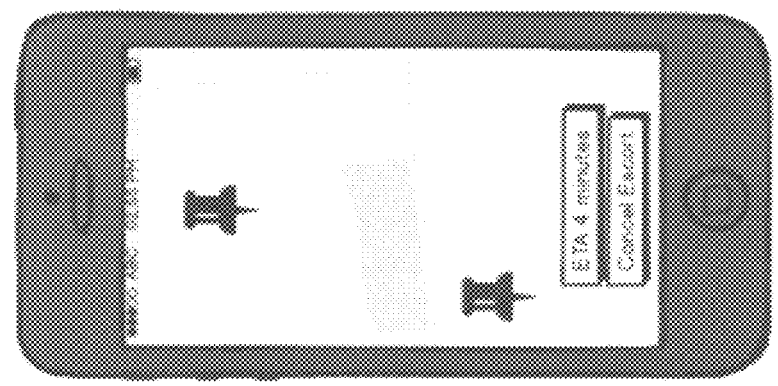
Figure 19A:
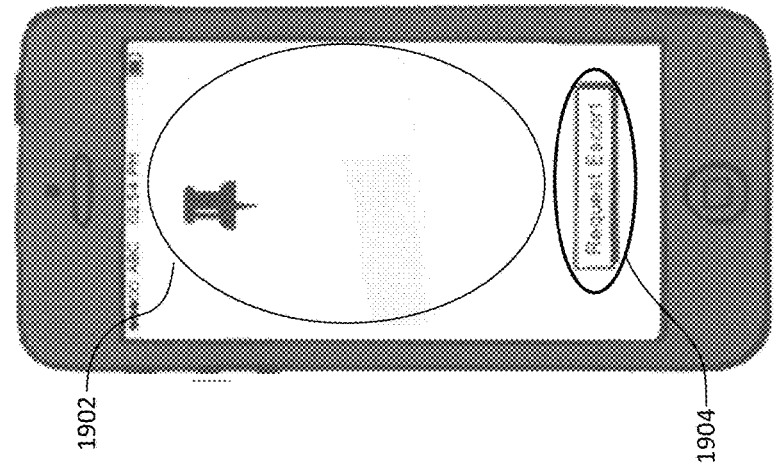

In some embodiments, the CSS 200 may further enable students to request escorts in the event the student does not feel safe traveling alone or needs assistance for some reason. FIGS. 19A, 19B, and 19C illustrates an example escort request interface 1900 in accordance with embodiments of the technology of the present disclosure. A student may enter the escort request interface 1900 by selecting an escort request button in an options menu of the example student user interface 300 of FIG. 3. In some embodiments, the options menu may be a drop down menu available on the student user interface 300 or it may be accessible by clicking or swiping to the side of the student used interface 300.

As shown in FIG. 19A, the escort request interface 1900 may include a map marker area 1902. The student may use the map marker area 1902 to indicate where on the map a student. In some embodiments, the CSS 200 may obtain location data from the user device and use the location information in identifying where the student is on the map in the map marker area 1902. The student may, in some embodiments, move the marker identifying where the student is to another location, if the student wants to meet the requested escort at another location. In some embodiments, the student may also enter a destination address.

After the student has identified where the student is located or wants to be picked up, the student may request an escort by selecting the "Request Escort" button 1904. In some embodiments, the request may be sent automatically once the student presses the "Request Escort" button 1904. In other embodiments, a confirmation screen may be displayed by the CSS application to ensure that the student wants to request the escort. In such embodiments, where the CSS application is running on a device having a traditional input system (e.g., a mouse), the student may simply double-click the "Request Escort" button 1904, immediately sending the request. Where the CSS application is running on a device having a touchscreen or other pressure sensitive input, the CSS application may immediately send the request based on the pressure applied in selecting the "Request Escort" button 1904. Light pressure may register as a normal press of the "Request Escort" button 1904, but heavy pressure may bypass any delay or confirmation screen and immediately send the request.

Once the request has been sent and accepted, the escort request interface 1900 may indicate to the student that the request has been accepted and provide an estimated time of arrival for the escort. FIG. 19B illustrates an example escort request interface 1900 for such an embodiment. In some embodiments, the escort request interface 1900 may include additional information. Some non-limiting examples of additional information that may be provided to the student via the escort user interface 1900 of FIG. 19B include: the name of the escort; a picture of the escort to enable the student to identify the escort; the phone number of the escort; or estimated routes that may be taken once the escort arrives to reach the intended destination, if the student is able to enter a destination address. As the escort moves closer to the student, the escort request interface 1900 of FIG. 19B may display to the student the actual location of the escort.

FIG. 19C illustrates an example escort request interface 1900 once the escort has begun in accordance with embodiments of the technology disclosed herein. As shown in FIG. 19C, the escort request interface 1900 indicates that the escort is in progress. In some embodiments, the CSS 200 may be capable of determining that the escort has begun based on the relative locations of the student and the escort, as identified based on location information obtained from each respective user device. Various embodiments may require that the escort indicate that the escort has begun using a CSS application running on the escort's user device.

Although described with respect to a registered user associated with a student user category, some embodiments may enable any registered user to request an escort. For example, in some embodiments a registered user associated with a teacher user category may need an escort to help assist in moving from one place to another.

Figure 6:
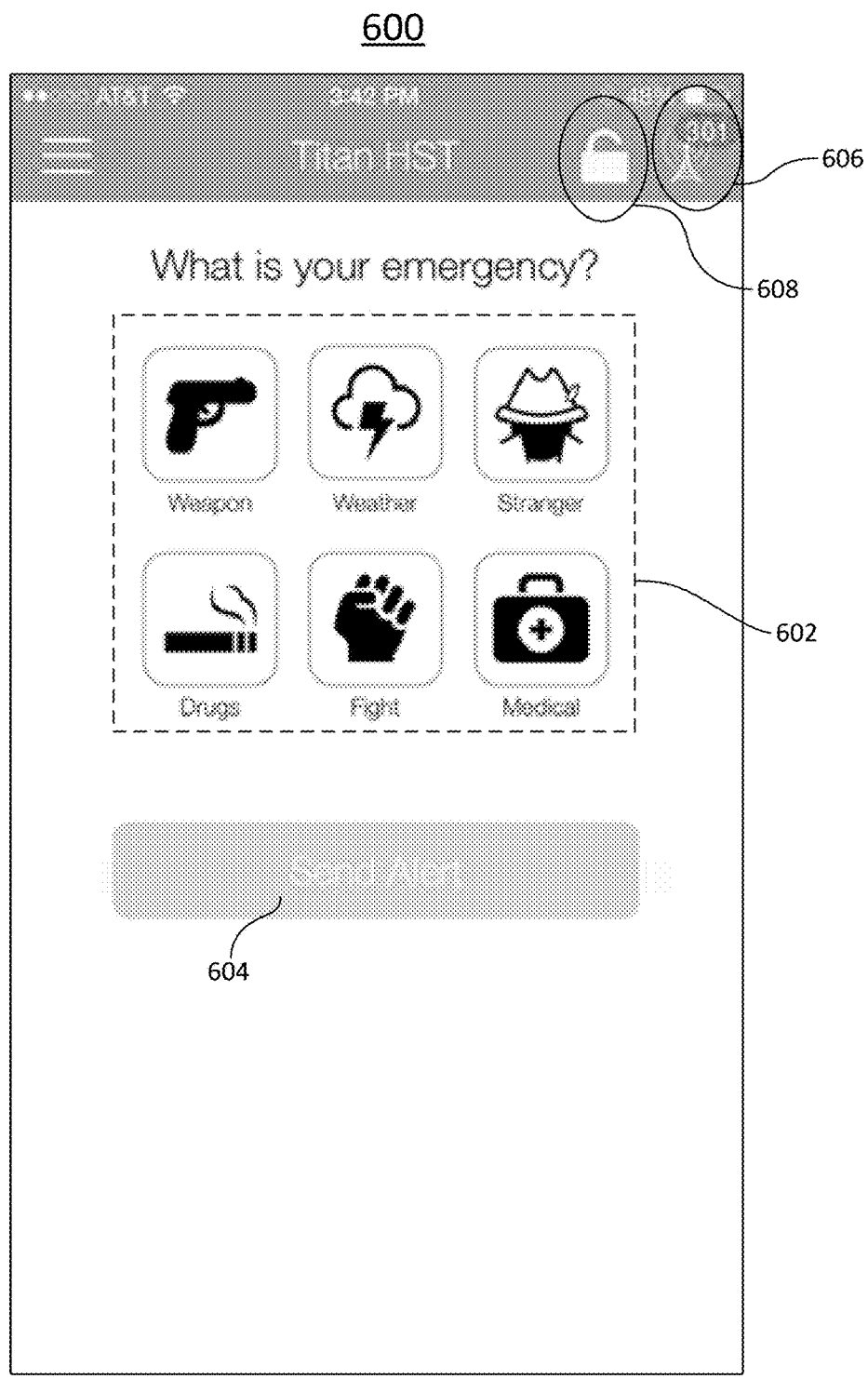
FIG. 6 is an example teacher interface of an example community safety system interface operating on a user device accordance with embodiments of the technology of the present disclosure, implemented in an example school environment.

FIG. 6 illustrates an example teacher user interface 600 where (in continuing with the school example environment) the user is associated with the teacher user category in accordance with embodiments of the technology of the present disclosure. In the illustrated embodiment, the teacher user interface 600 is similar to the example student user interface 300 of FIG. 3. In various embodiments, the teacher user category has the same capabilities to create an alert (602, 604), communicate with administrator devices 208 (i.e., a similar communication channel interface 400 as illustrated in FIG. 4), and view broadcast messages (i.e., broadcast message button 606). These functions of the teacher user interface 600 function in a similar way as those described above with regards to FIGS. 3 and 4. Although not shown in FIG. 6, the example teacher user interface 600 may include an audible alert trigger similar to the audible alert trigger 308 illustrated in FIG. 3.

As discussed above, a key to resolving emergencies is the ability to control the campus, which is usually achieved by initiating a "lockdown" of the campus. In various embodiments, a lockdown includes sending a broadcast message to all registered users and administrators indicating that the school is on lockdown. Many active shooter drills, performed by police departments to check the lockdown procedures of schools, have identified, however, that lockdown procedures were too slow. This means that it took too long for the lockdown to be initiated, enabling the live shooter to injury and/or kill one or more persons on campus. One of the reasons for the slowness of the lockdown procedure was that a lockdown generally needed to be initiated from the front office. If an emergency compromised the front office, a lockdown procedure may never actually be initiated.

Figure 7:
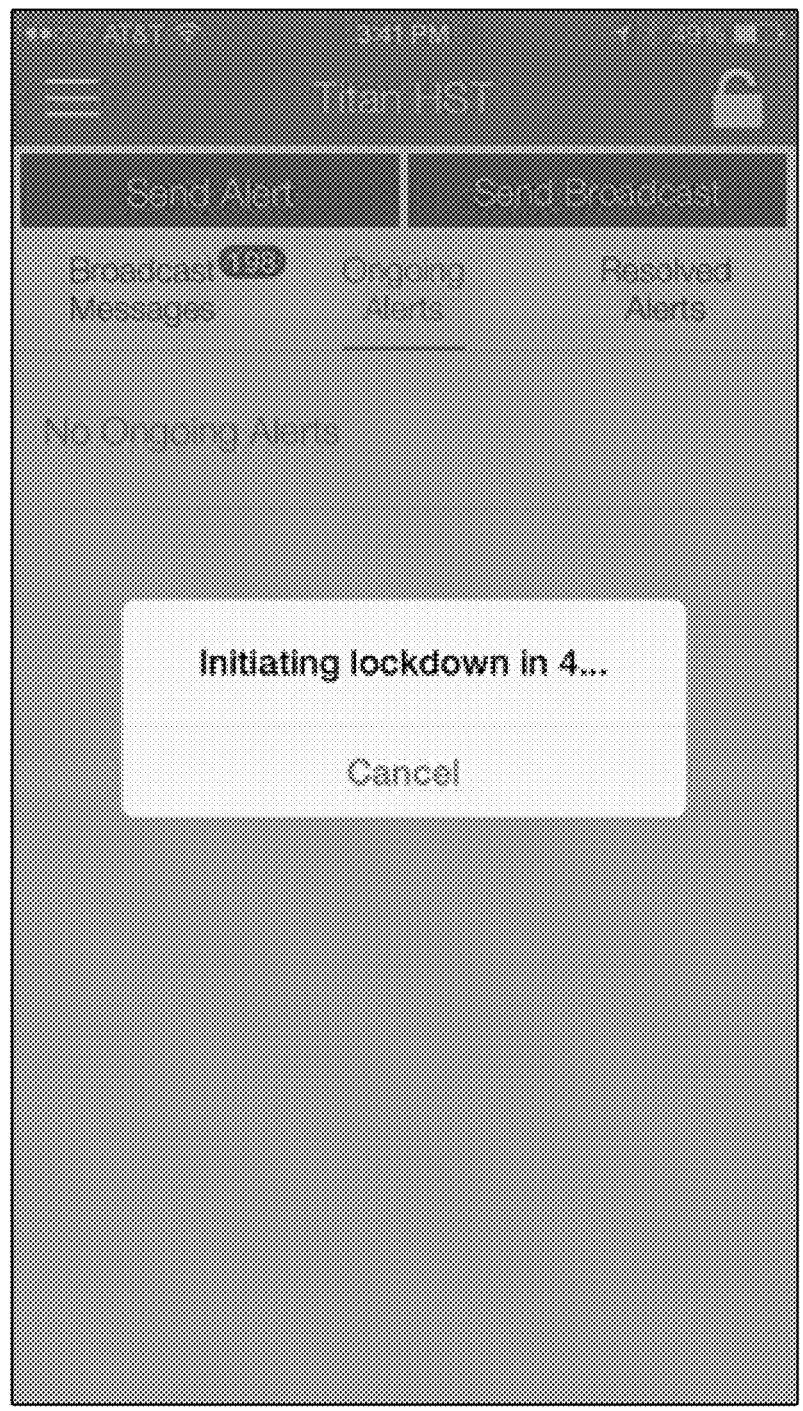
FIG. 7 is an example lockdown initiation interface of an example community safety system application operating on a user device in accordance with embodiments of the technology of the present disclosure.

To address these issues related to initiation of a lockdown, embodiments of the CSS 200 in accordance with the present disclosure provides a one-touch lockdown capability. Because teachers themselves may be the closest school officials/employees with sufficient information to determine whether the situation calls for a lockdown to be initiated, some embodiments of the teacher user interface 600 includes a lockdown initiator 608. If necessary, a teacher may use his or her user device 206 to initiate a download by pressing the lockdown initiated 608. In some embodiments, the lockdown procedure may begin immediately after the teacher presses the lockdown initiator 608. To provide for potential unintended initiations, a timed delay may begin once the lockdown initiator 608 is pressed, providing a period during which the lockdown may be cancelled, in some embodiments. In such embodiments, the CSS application may enable immediate initiation of a lockdown in similar fashion as the immediate alert generation described above with respect to FIG. 3 and the double-click/heavy pressure functionality. For example, a double-click on the lockdown initiator 608, or heavy pressure on the lockdown initiator 608, may result in an immediate initiation of the lockdown procedure, bypassing any delay. An example lockdown initiation interface 700 in accordance with the present disclosure is illustrated in FIG. 7.

Figure 20B:
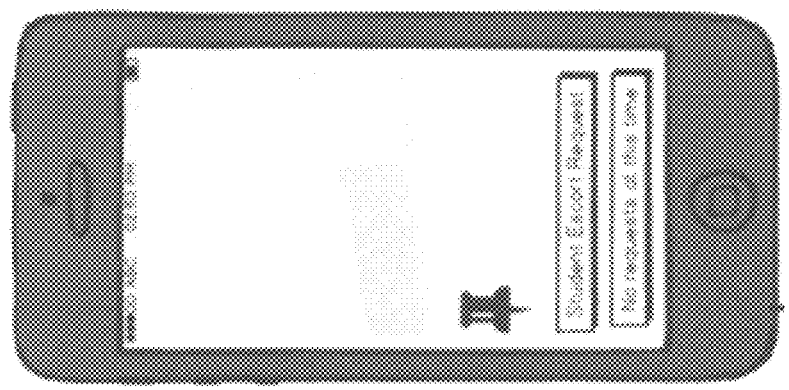
FIGS. 20A and 20B illustrate an example escort user interface in accordance with embodiments of the technology of the present disclosure.
Figure 20A:
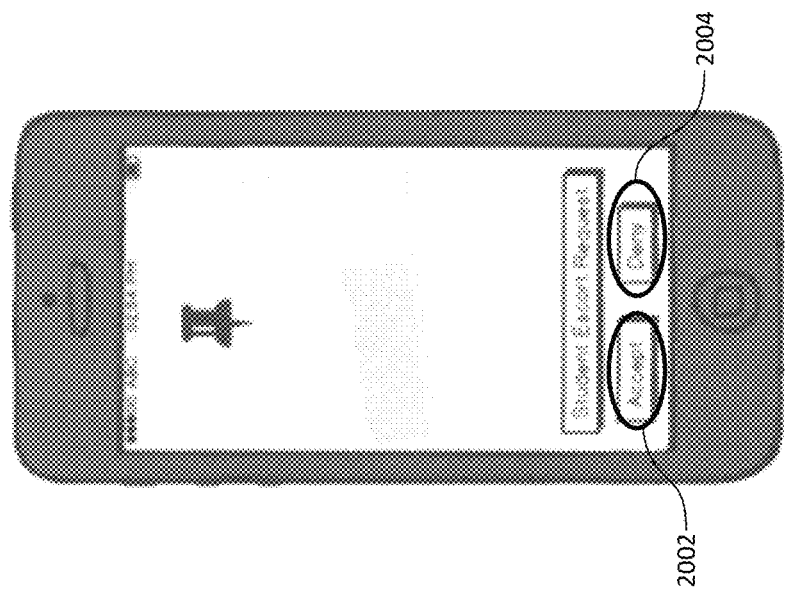

A teacher user category may also be capable of serving as an escort, as described above with respect to FIGS. 19A, 19B, and 19C. Escorts could also be registered users associated with other categories, such as administrators, supervisors, police, or even other students. When acting as an escort, a registered user may accept a request for an escort and assist another registered user. FIGS. 20A and 20B illustrate an example escort user interface 2000 in accordance with embodiments of the present disclosure. As illustrated in FIG. 20A, the escort user interface 2000 may display to the registered user acting as the escort information indicating that a student or other registered user as requested an escort. The escort user interface 2000 may also display additional information, such as but not limited to the name of the requester, phone number of the requester, a photo of the requester, the intended destination, or other information relevant to deciding whether to assist with the escort.

The registered user acting as the escort may press an "Accept" button 2002 to indicate that he or she is willing to assist in escorting the requester. In some embodiments, pressing the "Accept" button 2002 may result in the escort user interface 20A changing to indicate that the request has been accepted and the time until arrival. In some embodiments, this escort user interface 2000 may be similar to the escort request interface 1900 described above with respect to FIG. 19B. Various embodiments may include a button to open a communication channel with the requester, similar to the communication channel described above with respect to FIG. 4.

If the registered user acting as the escort does not want to accept the request for some reason, the user could press the "Deny" button 2004. By pressing the "Deny" button 2004, the escort user interface 1900 may change and look like the escort user interface 1900 illustrated in FIG. 20B. The request that was denied may be removed from the escort user interface 2000 of FIG. 20B. Where there are no more currently pending escort requests, the escort user interface 2000 of FIG. 20B may indicate that there are no additional requests.

Figure 8:
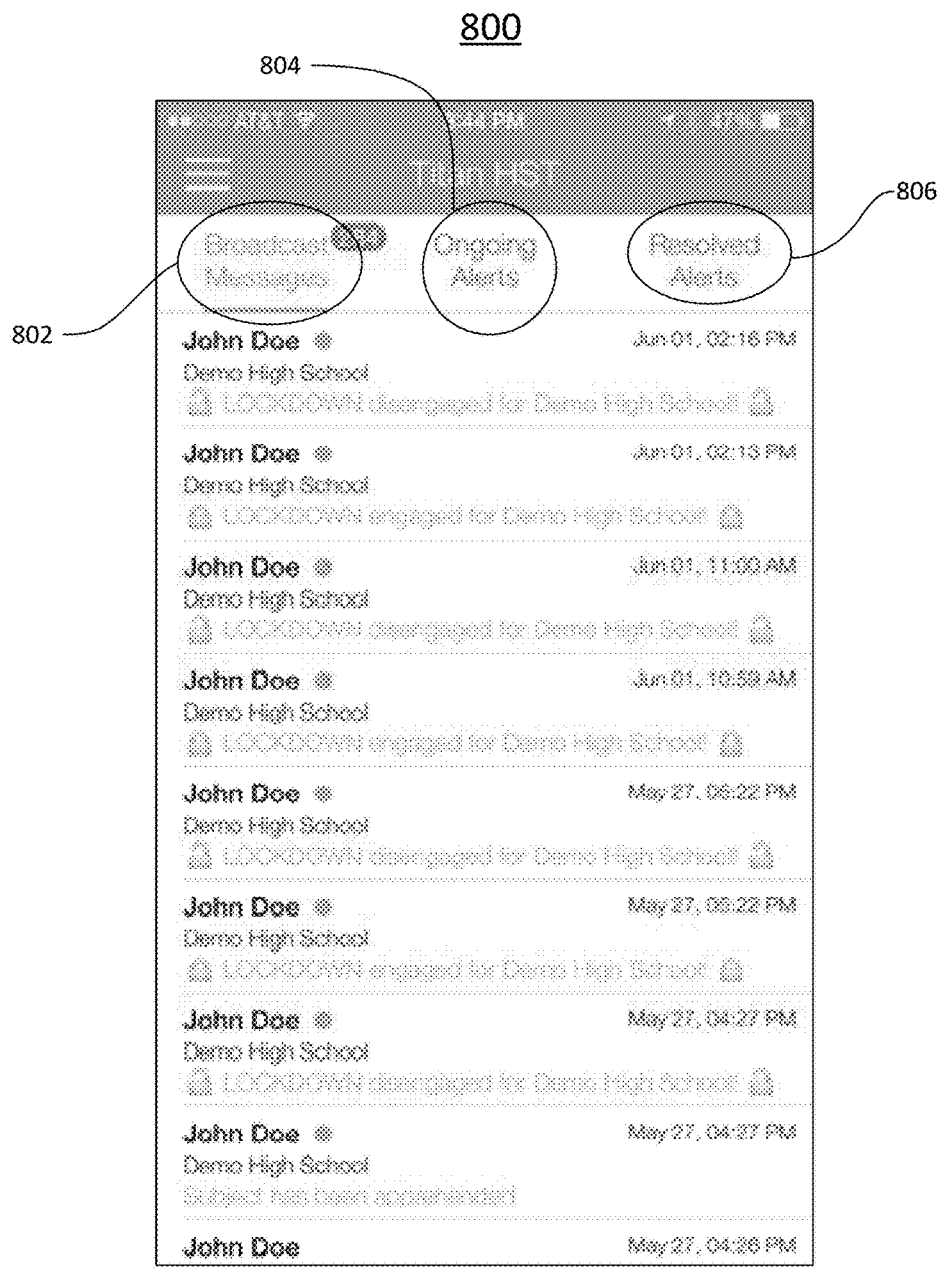
FIG. 8 is an example parent interface of an example community safety system interface operating on a user device accordance with embodiments of the technology of the present disclosure, implemented in an example school environment.

In some embodiments in accordance with the technology of the present disclosure, the CSS may include a user category for individuals who, all though not directly associated with an institution, may still have an interest in emergencies that may arise. In the example school implementation, such a user category may consist of parents or legal guardians of students attending the school. FIG. 8 is an example parent user interface 800 in accordance with the technology of the present disclosure. As illustrated, the capabilities of the parent user category is more limited than the student or teacher user category discussed above with respect to FIGS. 3-7. In the illustrated example, the parent user interface 800 provides a broadcast message button 802 to enable registered users associated with the parent user category to receive and view broadcast messages, similar to the broadcast message capability discussed above with respect to the student user interface 300 and teacher user interface 600.

In some embodiments, the parent user interface 800 may also include an ongoing alerts button 804, which displays information related to alerts that have been generated but have yet to be resolved. The ongoing alerts button 804 may provide an interface showing any ongoing alerts triggered by a student associated with the parent in some embodiments. Alerts triggered by teachers for students associated with the parent may also be visible by pressing the ongoing alerts button 804 in various embodiments. In this way, parents can stay informed about alerts generated by those school employees, namely teachers, whom are in contact with the parent's child.

Various embodiments of the parent user interface 800 may include a resolved alerts button 806, which provides a listing of alerts that have been resolved, meaning the emergency has been addressed and is no longer ongoing. Users associated with the parent user category may view all resolved alerts that have been triggered within the CSS by pressing the resolved alerts button 806. By providing a listing of all resolved alerts, parents may keep abreast of the goings on at the school, to provide an idea of the level of safety provided by the institution. In other embodiments, the resolved alerts button 806 may provide an interface displaying only those resolved alerts which the student or students associated with the parent initiated.

Although the parent user category has been shown to have only passive, monitoring capabilities in the example parent user interface of FIG. 8, other embodiments and implementations of the present disclosure may provide active capabilities for the parent user category. For example, some embodiments may enable the parent user category to initiate an alert. The extent of the capabilities provided to the parent user category depends on the particular implementation and the intentions of the implementing institution.

In addition to enabling parents to be kept abreast of emergencies affecting an associated student, the CSS 200 may allow for each parent-student grouping to identify multiple security zones of interest in various embodiments. For example, in addition to the security zone associated with the school, the student may also be associated with a second security zone—or home zone-encompassing the student's home. The CSS 200 may be configured to alert the associated parent when the student leaves or enters either the main security zone or the home zone. In this way, the associated parent would be capable of determining whether something has gone on between the student leaving school for the day and coming home, or vice versa. The CSS 200 may be configured to identify when a student user as entered or left a zone, and generate a notification that is sent to the associated parent user.

Another user category of the example school implementation is the administrator user category. As discussed above with respect to FIG. 2, an administrator device 208 is a device where the registered user associated with the device is part of an administrator user category. In the example school implementation, an administrator may be the school principal, vice principal, administrative staff, campus security, or other school officials granted the responsibility of addressing emergencies that arise on campus. In some cases, all teachers may also be associated with the administrator user category, and no separate teacher user category need be utilized.

Figure 9:
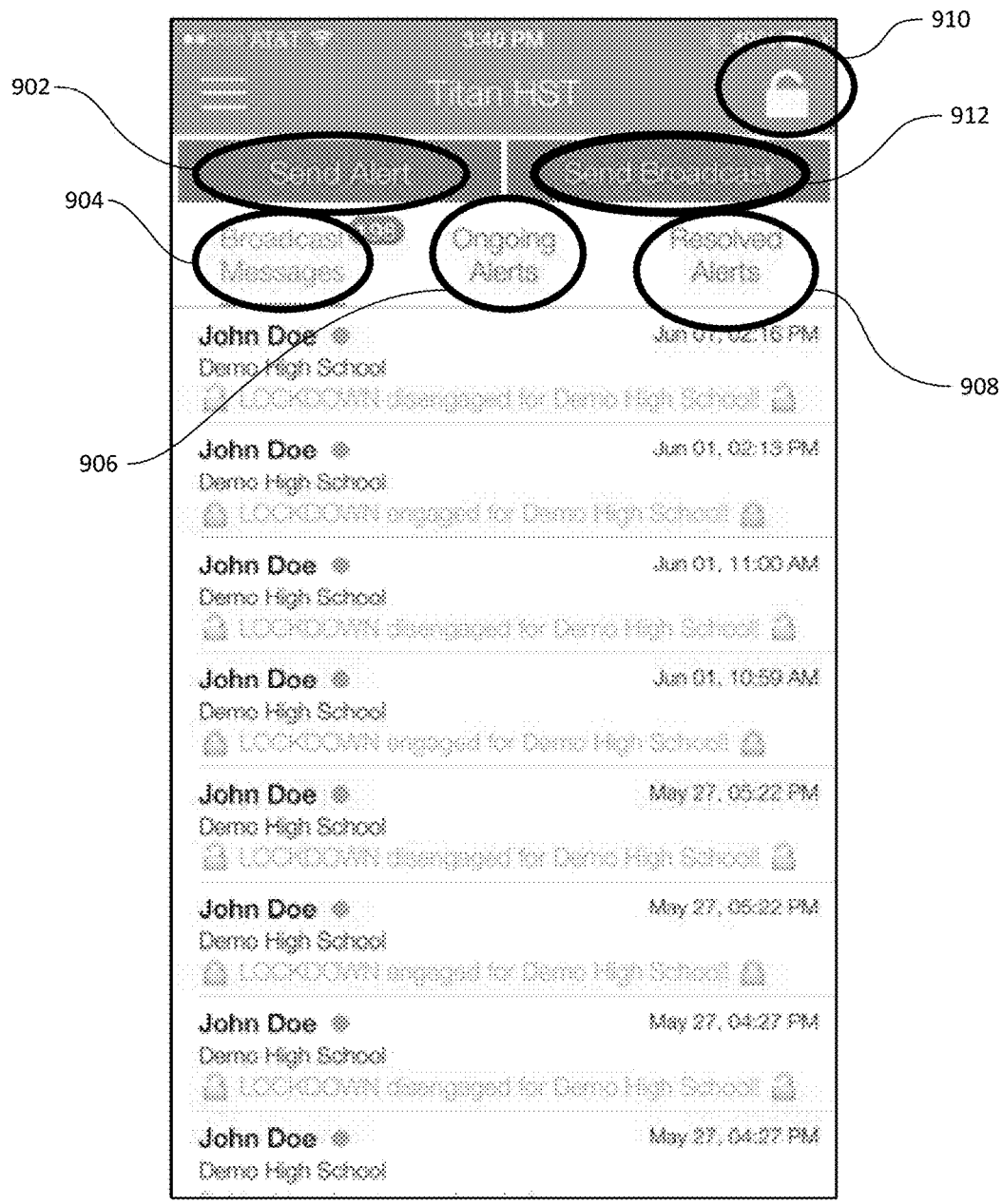
FIG. 9 is an example administrator/police interface of an example community safety system interface operating on a user device accordance with embodiments of the technology of the present disclosure, implemented in an example school environment.

FIG. 9 is an example administrator user interface 900 in accordance with the technology of the present disclosure. As illustrated in FIG. 9, the administrator user interface 900 provides the greatest amount of capabilities compared with the student user interface 300, teacher user interface 600, or parent user interface 800.

The example administrator user interface 900 provides many of the same capabilities that have been described above. Various embodiments provide administrators with the ability to initiate alerts by pressing a Send Alert button 902, which brings up an alert type area and interface similar to the student user interface 300 and the teacher user interface 600. A broadcast messages button 904, ongoing alerts button 906, and resolved alerts button 908 may be provided in various embodiments. These buttons may function in a similar way as those described above with respect to the parent user interface 800, without the restrictions based on association with a student or other user category. As an administrator, it would be important to allow the administrator to view all alerts and broadcasts initiated within the CSS in order to stay abreast of all occurrences on campus. The administrator user interface 900 may also include a lockdown initiator 910, similar to the one described above with respect to the teacher user interface 600.

In addition to similar functionality shared with one or more of the student, teacher, and parent user categories, the administrator user interface 900 may also include the capability to generate and send out broadcast messages to some or all of the registered users of the CSS. By pressing the Send Broadcast button 912, an administrator may create a broadcast message, similar to the example broadcast message 504 described above with respect to FIG. 5.

Figure 10B:
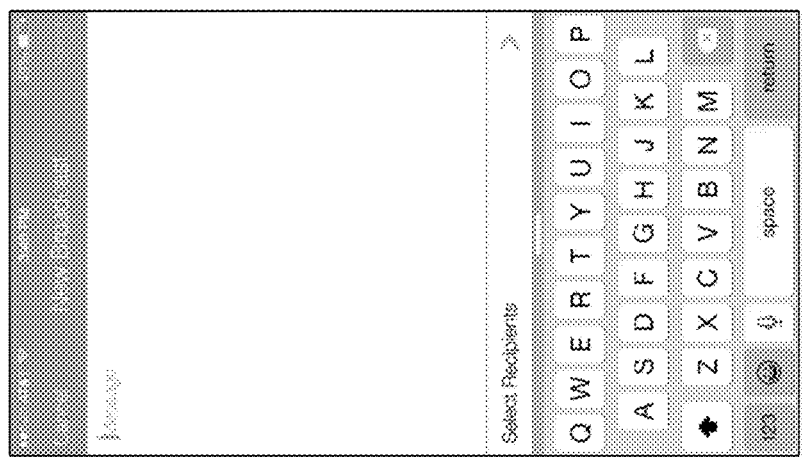
FIGS. 10A and 10B are example broadcast generation interfaces interface of an example community safety system interface operating on an administrator device accordance with embodiments of the technology of the present disclosure, implemented in an example school environment.
Figure 10A:
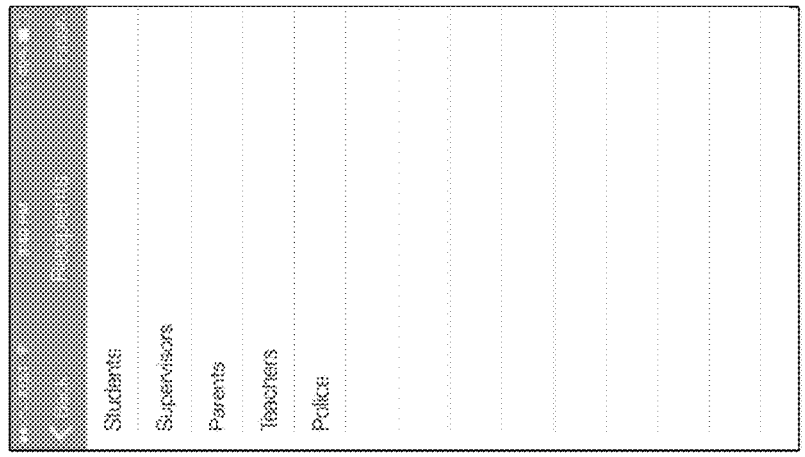

FIG. 10A illustrates an example broadcast generation interface 1000 in accordance with the technology of the present disclosure. The broadcast generation interface 1000 is displayed on the administrator device when the Send Broadcast button 912 is pressed. An administrator may create a broadcast message, providing information relevant to the registered users of the CSS. As illustrated in FIG. 10B, the administrator may select one or more of the user categories as recipients of the broadcast message generated through the broadcast generation interface 1000. For example, using the user category list 1005, the administrator may choose to send a broadcast message only to the teacher user category.

To ensure that broadcast messages or multiple alert notifications are sent and received in a timely manner, the NME 202 may be configured to handle 100% load at a given time. For example, in some embodiments the NME 202 may include additional servers and/or load capacity than is required during quiet periods. When a large transmittal of information is required, such as if a large emergency occurs and a broadcast message need be sent to all registered users, the NME 202 may identify the need for additional capacity and utilize its entire capacity. This dedication of resources ensures that all messages are timely sent and received, thus avoiding the delays that have occurred with current systems. Various embodiments may have one or more servers or areas of capacity within the NME 202 dedicated to servicing only broadcast messages, thereby ensuring sufficient capacity for such situations.

As discussed above with respect to FIG. 2, the police 214 may also be one of the user categories for the CSS 200. By including the police 214 within the CSS 200, the police 214 are capable of staying abreast of emergencies occurring within the security zone 210 of the CSS 200. In some embodiments, the police 214 may have similar capabilities as those of the administrator user category described above with respect to FIG. 9. The police 214 may have the ability to generate broadcast messages, like the administrator user category. By including the police 214 within the CSS 200 and providing the ability to generate broadcast messages like administrators, embodiments of the technology disclosed herein provide an informational advantage to registered users of the CSS 200 over other emergency notification systems.

Under current systems, the police are capable, at the most, of receiving information about an emergency from those at the scene, generally only after arriving at the scene themselves. The two-way communication capable with embodiments of the present disclosure enable the police to receive timely information from those at the scene in a timely manner, and also to present relevant information to the community at large in an effective manner. This leads to a more robust response and a better informed community. In addition, the police may also utilize a system in accordance with embodiments of the technology of the present disclosure to provide information to the registered users of other emergencies or situations that may not be directly related to the campus, but which the police believe the registered users should be aware or could help resolve.

Although the example school implementation discusses including the police 214 within the CSS 200, other public authorities may also be registered with the CSS 200. For example, the fire department may be registered with the CSS 200. In some embodiments, the police department and the fire department may be separated into distinct user categories, or the departments could be lumped into a civil service user category. As another example, the local hospital may be registered with the CSS 200, to enable faster dispatch of ambulances to the school or other institution.

Having just described the basic capabilities of each of the different example user categories, the interactions between the different components of the system for different notification events will now be described in detail.

Figure 11:
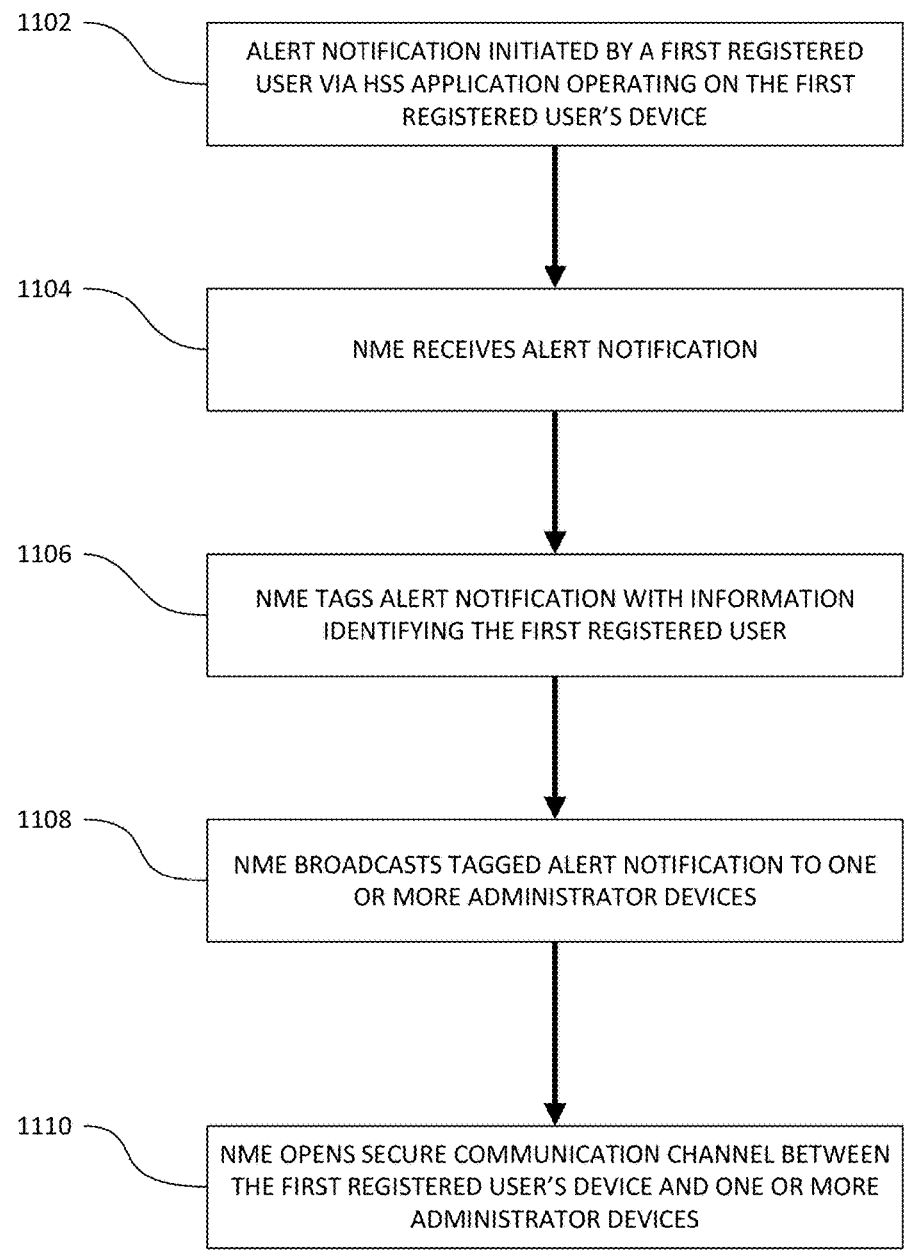
FIG. 11 is a flow diagram of an example alert notification process in accordance with embodiments of the technology of the present disclosure.

As discussed above, many of the user categories are capable of initiating alerts, whereby one or more administrators are notified of an emergency within the security zone of the CSS. FIG. 11 is an example process flow of the alert notification process in accordance with the technology of the present disclosure. At 1102, an alert notification is initiated by a first registered user (e.g., via an CSS application operating on the first registered user's device). In the example school implementation, the first registered user may be a student, teacher, administrator, or the police. In other embodiments, the user categories may differ.

At 1104, the NME receives the alert notification initiated by the first registered user. The NME is communicatively coupled to the CSS application of the first user's device via a network. The network may be one of: cellular telecommunications protocols, such as GSM, UMTS, CDMA2000, LTE, or WiMAX; wired communication methods, such as cable, DSL, dial-up, or fiber-optic; or wireless communication methods, such as satellite communications or Wi-Fi.

At 1106, upon receiving the alert notification, the NME tags the alert notification with information identifying the first registered user. By tagging the alert notification with information identifying the user who initiated the alert, the system injects accountability into the process to curtail prank alerts from being set off. In some embodiments, the NME may tag the alert notification with information identifying the location of the first registered user. The location data may come from a GPS module operating within the first registered user's device. Various embodiments may include the location data with the alert notification. In other embodiments, the NME may pull the information from the first registered user's device once the NME receives the alert notification.

Although location information may be included, privacy concerns may encourage that the NME does not constantly monitor any registered user's location while connected to the CSS. For example, the NME may not retrieve location data until an alert is received. In other embodiments, the NME may obtain the location data once the CSS application is activated on the user's device (such as opening the application), or once a short link previously sent to the user's device has been pressed. In such embodiments, the idea is that a registered user may be seeking to generate an alert notification. In some embodiments, the location data may be retrieved from the first registered user's device only if requested by one or more of the administrator devices.

At 1108, the NME broadcasts the tagged alert notification to one or more administrator devices. By broadcasting the message to a plurality of administrators, the NME ensures that at least one administrator will notice the alert and address the situation. In various embodiments, more than one administrator may acknowledge the alert via their administrator device. In such cases, a group message may be created.

Figure 12:
FIG. 12 is an example communication channel interface of an example community safety system application operating on an administrator device in accordance with embodiments of the technology of the present disclosure.

At 1110, for each administrator that acknowledges the alert, the NME may open a secure communication channel between the first registered user's device and one or more administrator devices. The communication channel interface 400 of FIG. 4 was discussed earlier with respect to the student user interface 300 of FIG. 2. FIG. 12 illustrates an example communication channel interface 1200 from the perspective of an administrator in accordance with the technology of the present disclosure. As seen in FIG. 12, the communication channel interface 1200 is not much different from the student's communication channel interface 400 described above.

As illustrated in FIG. 12, the communication channel interface 1200 of the administrators and/or police includes an identification area 1202, containing information identifying the first registered user and the alert type selected for initiation. In some embodiments, greater or lesser detail may be included within the identification area 1202, or available through an information button 1204.

Figure 13:
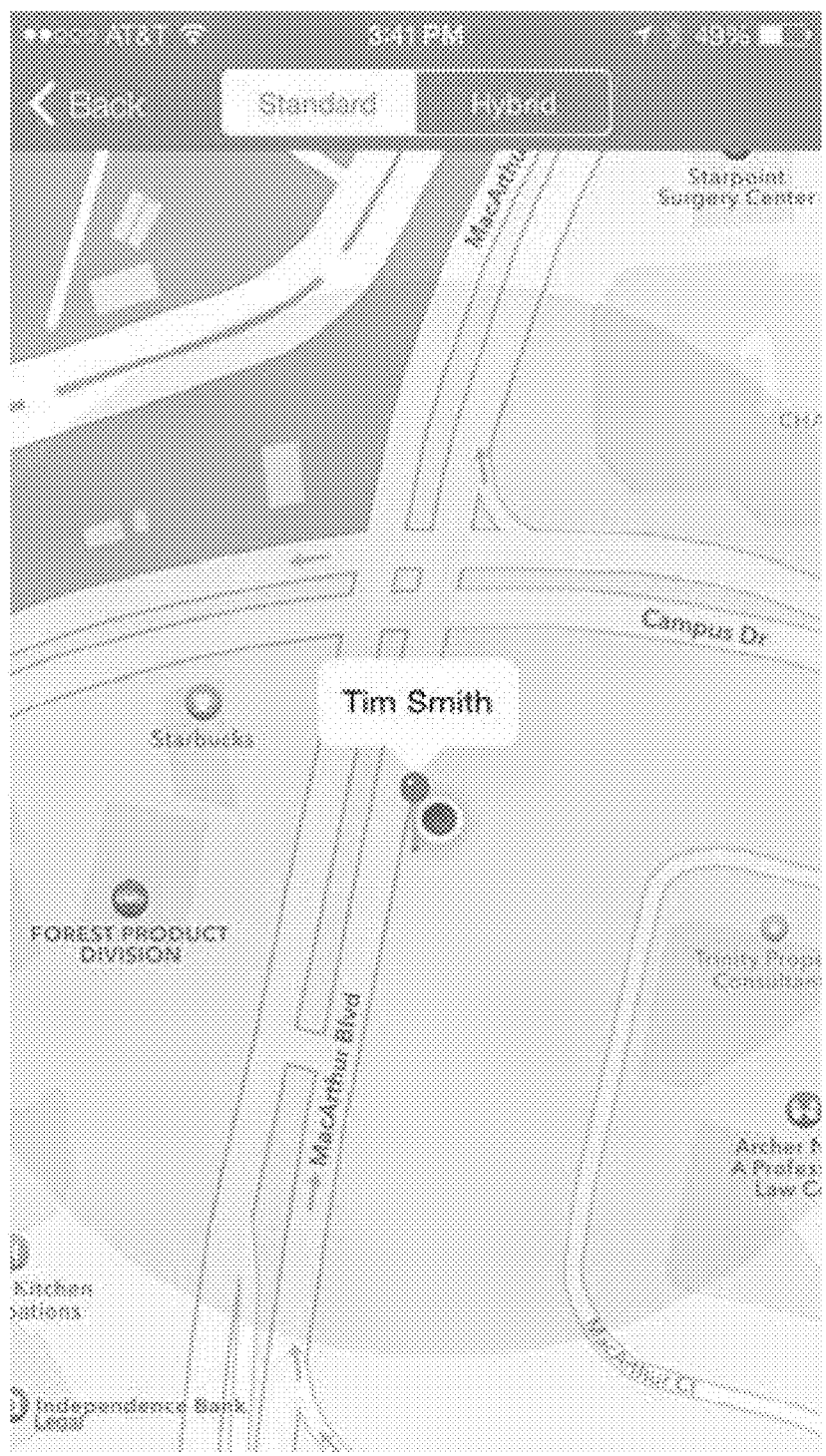
FIG. 13 is an example location visualization interface of an example community safety system application operating on an administrator device in accordance with embodiments of the technology of the present disclosure.

As discussed above, location information may be included with the alert notification. In some embodiments, the communication channel interface 1200 may include a map button 1206. By pressing the map button 1206, an administrator or the police may view where the first registered user is located within the security zone. The map button 1206 may textually display the first registered user's location, such as an insert displaying an address, building name, or other location identification. A visual representation of the first registered user's location may be displayed in various embodiments. FIG. 13 is an illustration of a location visualization interface 1300 in accordance with one or more such embodiments of the present disclosure.

In addition to utilizing location information to provide more context to an emergency, the NME 202 may utilize location information to determine whether a user should be permitted to initiate an alert. In some implementations, it may be beneficial to limit the ability of registered users, such as students, to generate an emergency alert while not physically located on campus. In addition to tagging emergency alerts with identifying information, limiting the ability to send alerts from outside the security zone helps curtail potential abuse of the two-way communication to generate false emergency alerts for purposes of pranks. To combat this, the NME 202 includes a "geo-fence" capability, used to determine whether an emergency alert should be permitted to be sent to administrative users.

Figure 14:
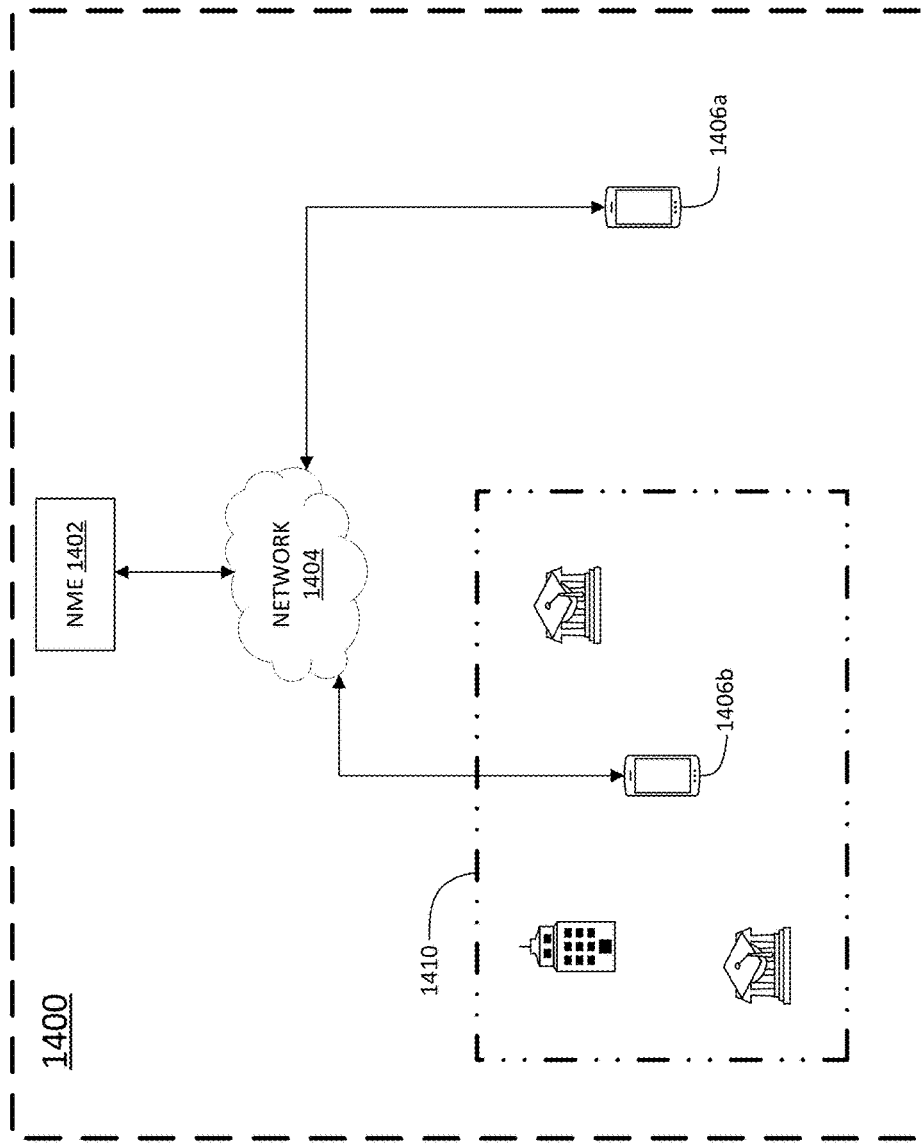
FIG. 14 is an example environment where a student attempts to generate an alert notification while outside an example security zone, in accordance with embodiments of the technology of the present disclosure.

FIG. 14 illustrates an example CSS 1400 with which a "geo-fence" capability of the NME 1402 in accordance with the technology of the present disclosure is described. In addition to utilizing location information to provide more context to an emergency, the NME 202 may utilize location information to determine whether a user should be permitted to initiate an alert. In some implementations, it may be beneficial to limit the ability of registered users, such as students, to generate an emergency alert while not physically located on campus. In addition to tagging emergency alerts with identifying information, limiting the ability to send alerts from outside the security zone helps curtail potential abuse of the two-way communication to generate false emergency alerts for purposes of pranks. To combat this, the NME 202 includes a "geo-fence" capability, used to determine whether an emergency alert should be permitted to be sent to administrative users.

As illustrated in FIG. 14, the CSS 1400 is similar to the CSS 200 described with respect to FIG. 2. Unlike FIG. 2, however, the CSS 1400 shows user device 1406a, which is outside the security zone 1410, and user device 1406b, which is inside the security zone. When an NME 1402 receives an emergency alert from 1406a and 1406b, the NME 1402 can utilize location data from the user device of the registered users to determine whether the user is within the security zone and, accordingly, should be permitted to notify one or more administrators of a potential emergency.

Figure 15:
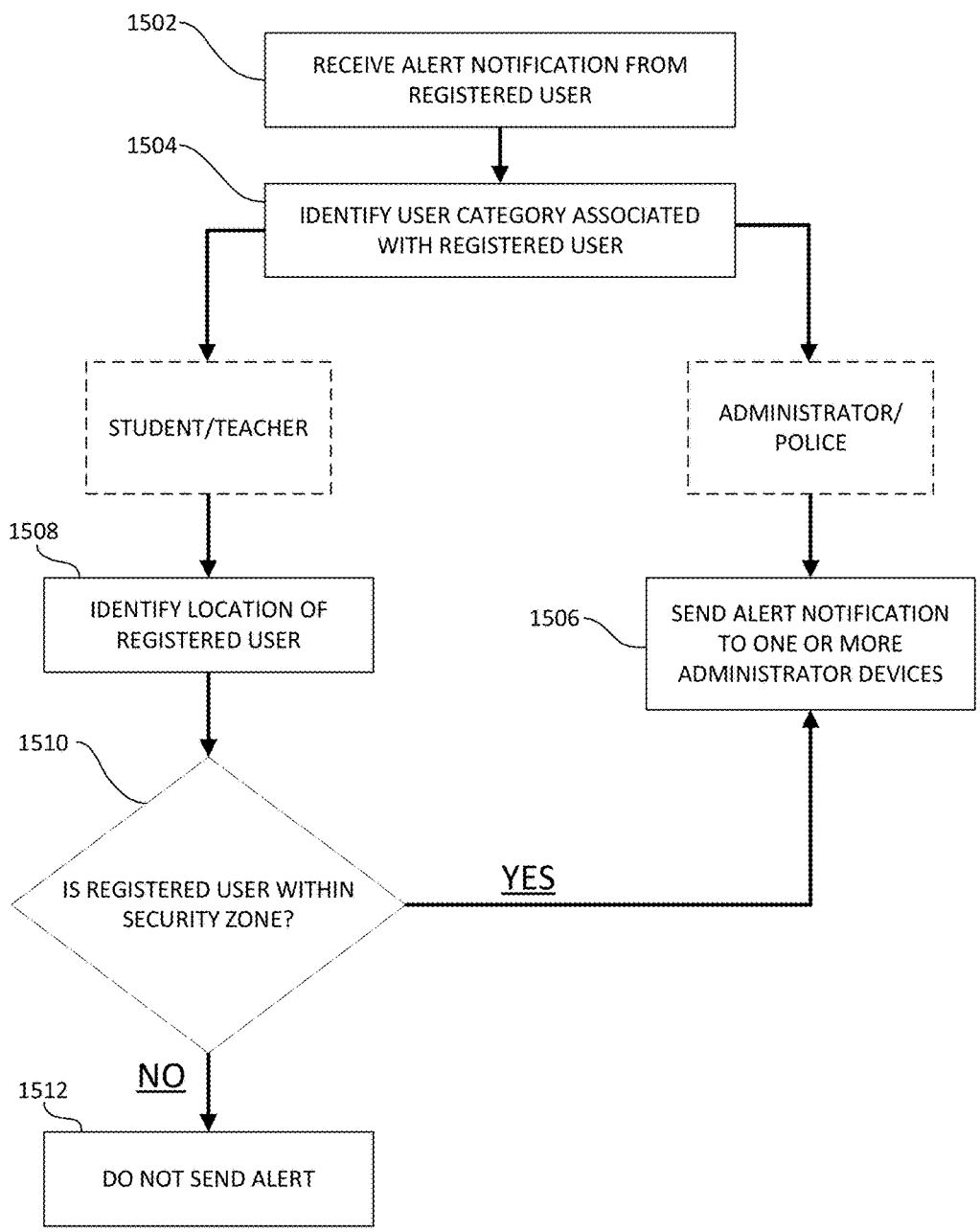
FIG. 15 is a flow diagram of an example location-based capability determination method in accordance with embodiments of the technology of the present disclosure.

FIG. 15 is a flow diagram of an example location-based capability determination method of the NME 1402 in accordance with embodiments of the technology herein disclosed. At 1502, the NME 1402 receives an alert notification from a registered user (either via a CSS application, an SMS messaging program, email notification, or otherwise). At 1504, the NME 1402 identifies the user category associated with the registered user who sent the alert notification. As discussed above, the registered user may have been a student, teacher, administrator, or police in various embodiments. The NME 1402 determines which user category applies to the registered user who sent the alert notification. In the example school implementation, only registered users associated with the administrator user category of the police user category are allowed to initiate an alert notification from outside the security zone, while students and teachers are only capable of generating an emergency alert while within the security zone. Not only does this help curtail pranks and make it easier to maintain accountability, such limitation helps to ensure that the students' and teachers' privacies are protected.

If the NME 1402 identifies the registered user as being associated with the administrator user category or the police user category, the NME 1402 proceeds normally, broadcasting the alert notification to one or more administrator devices at 1506.

If the NME 1402 identified the registered user as being associated with the student user category of the teacher user category, the NME 1402 identifies the location of the registered user. In many embodiments, identifying the location of the registered user may involve retrieving location data from the user device of the registered user. Such information may be obtained by the NME 1402 by retrieving the information from a GPS receiver of the user device, in some embodiments. In other embodiments, the location information may be included in the original alert notification.

Once the NME 1402 identifies the registered user's location, the NME 1402 determines whether the registered user's location is within the security zone at 1510. As stated above, in some embodiments the student user category and teacher user category are limited to only sending alert notifications to one or more administrators when on campus (i.e., within the security zone). If the NME 1402 determines that the student or teacher is within the security zone, the NME 1402 at 1506 proceeds normally. If the NME 1402 determines that the student or teacher is outside of the security zone, the NME 1402 at 1512 does not send the alert notification to one or more administrator devices. In some embodiments, the NME 1402 may display an error message to the student or teacher (via the user interface of the CSS application operating on the user device, or via an SMS message sent to the user device, or otherwise).

As discussed above with respect to FIG. 8, a student user category may be associated with, or tethered to, a parent user category. With reference to FIG. 14, the CSS 1400 may enable a student user to send an alert from outside the security zone 1410 to the tethered parent in some embodiments. FIG. 18 is a flow diagram illustrating another example location-based capability determination method involving tethered user categories in accordance with embodiments of the technology disclosed herein.

At 1802, the NME 1402 identifies the location of the registered student user. Although not shown, the identification of the registered student user's location is determined after the NME 1402 identifies a received alert as coming from a student user, similar to 1502 and 1504 described with respect to FIG. 15. In many embodiments, identifying the location of the registered user may involve retrieving location data from the user device of the registered user. Such information may be obtained by the NME 1402 by retrieving the information from a GPS receiver of the user device, in some embodiments. In other embodiments, the location information may be included in the original alert notification.

The NME 1402 then determines whether the registered student user is within the security zone at 1804. If the NME 1402 determines that the student is within the security zone, the NME 1402 at 1806 proceeds normally and transmits the alert to one or more administrator devices.

If the NME 1402 determines that the student is outside of the security zone, the NME 1402 at 1808 determines whether the registered student user is tethered with another registered user. If the NME 1402 determines that the student is not tethered with any other registered users, no alert is sent at 1810. If the NME does determine that the student is tethered with another registered user, the NME 1402 at 1814 sends the alert to the tethered registered user.

In some embodiments, administrators, police, or other individuals or organizations with emergency management responsibilities (e.g., crisis managers) may want to seek information regarding the status of one or more groups of registered members. FIGS. 23A and 23B illustrate an example administrator interface 2300 and population status interface 2350 in accordance with embodiments of the technology of the present disclosure. The administrator interface 2300 is a modification of the example administrator interface discussed with respect to FIG. 9. As illustrated in FIG. 23A, the administrator interface 2300 includes the same elements as FIG. 9, with the addition of a population status button 2305. A population status is a special type of broadcast communication. Instead of, or in addition to, broadcasting information out to the registered members of an organization, the population status check allows for administrators or other parties with emergency management responsibilities to obtain information on the status of all or some of its members.

As discussed in greater detail below with respect to FIGS. 24A and 24B, a population status check broadcast sends a request to members of the organization to respond with an update on their current condition and/or location. In the event a member is unable to respond, the lack of response may be indicative of a situation developing for which someone should investigate. Moreover, based on the responses that are received, the administrators may be able to identify that an emergency is developing or ongoing in a particular area, despite the lack of an alert being received. Clicking the population status button 2305 accesses the population status interface 2350, illustrated in FIG. 23B.

As illustrated in FIG. 23B, the population status interface 2350 includes a sent request window 2355. The sent request window 2355 identifies past population status check requests that an administrator or other party with emergency management responsibilities sent. In some embodiments, the sent request window 2355 may maintain a listing of all prior requests, a specific number of prior requests (e.g. up to four requests), or a listing of all requests sent within a predetermined period of time (e.g., all requests sent within the past 30 days). An "Active" indicator may be appended to any request that is still ongoing. In various embodiments, a request may remain "Active" for a particular time period (e.g., for an hour), until all registered members have responded, or until the party that initiated the request ends it.

To initiate a population status check, the administrator can tap the send status request button 2360 of the population status interface 2350, for example. In some embodiments, the send status request button may be represented by a graphical icon in the top bar of the population status interface 2350, similar to the lockdown icon discussed above with respect to FIG. 9. In other embodiments, to initiate a population status check, the administrator can cause an SMS message to be sent from a common short code to request a status update from one or more users (shown by way of example in FIG. 29B). A population status check may also include a location share request. When sending a population status check, the administrator may choose to send out a request to all registered members of the organization in some embodiments. In other embodiments, the administrator may decide to send the request only to certain categories of users, such as students, teachers, or parents.

When a population status request is sent, each member of the organization may be alerted to the request. FIGS. 24A and 24B illustrate an example student interface 2400 and population status response interface 2450, in accordance with embodiments of the technology discussed herein. The student interface 2400 is similar to the student interface discussed with respect to FIG. 3, with the addition of a population status request indicator 2410. A similar population status request indicator 2410 may also be included with the teacher interface discussed with respect to FIG. 6, and/or the administrator interface discussed with respect to FIG. 9. In various embodiments, the population status request indicator 2410 may only be present when a population status request has been sent. The population status indicator 2410, in other embodiments, may also be present in the student interface 2400, and a new request indicator (e.g., a red exclamation point as illustrated in FIG. 24A) may appear to indicate that a new request has been received.

Figure 24B:
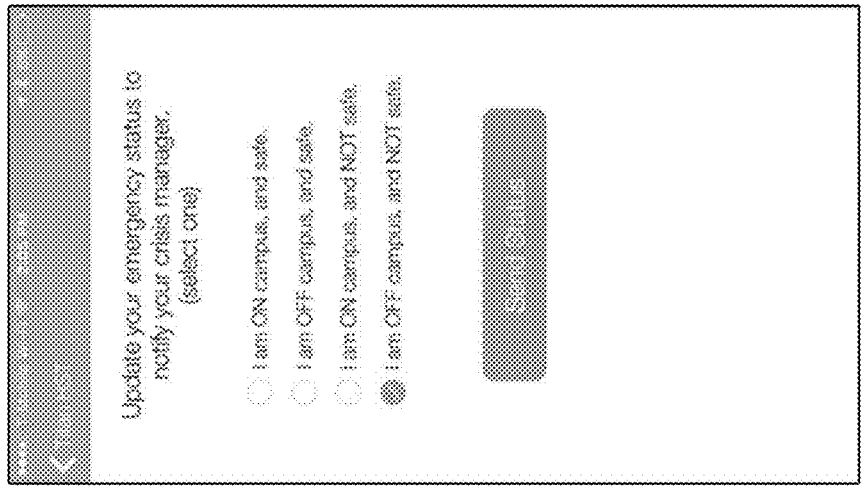
FIG. 24B illustrates an example population status response interface in accordance with embodiments of the technology disclosed herein.
Figure 24A:
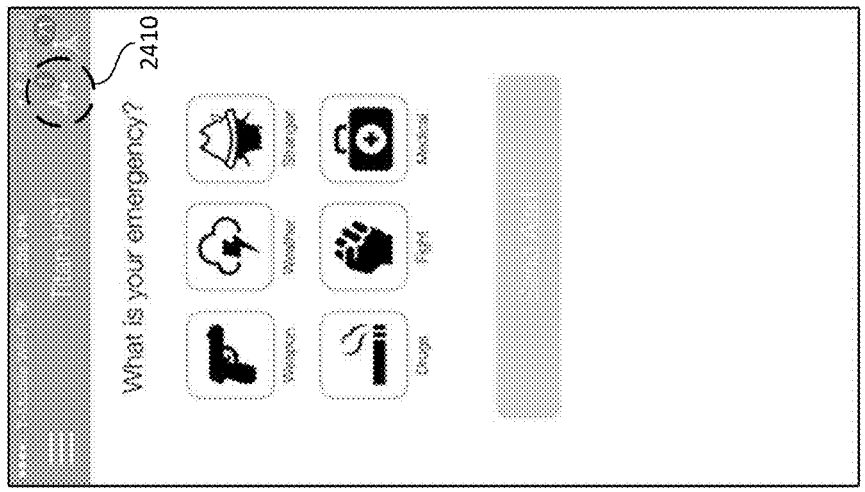
FIG. 24A illustrates an example student interface in accordance with embodiments of the technology disclosed herein.

When a student presses the population status request indicator 2410, a status response interface 2450 is accessed, as illustrated in FIG. 24B. The example status response interface 2450 may, in some embodiments, include a listing of several pre-identified responses from which each student may select. In some embodiments, an additional "other" option may be include (not pictured), in which the student may provide a different response from the pre-identified ones, or provide more elaboration on the situation. In some embodiments, the student may be able to update the response while the status request is still active, enabling for the most up to date information to be provided.

Using the responses received from the different members of the organization, several analytical measures may be determined. In some embodiments, the NME may store the responses from all members of the organization. The NME may analyze the responses to identify any patterns with respect to the location of users and the types of responses they provided. For example, if a significant number of users indicated that they were on campus, but not safe, the NME could determine whether those users were all in the same area. In such cases, it may be indicative of a particular emergency developing or occurring in that area. The NME could provide this information to the administrator that sent the population status request.

In various embodiments, the NME may analyze the responses and determine that several users are updating their status while the population status request remains active. In addition, the NME may retrieve location information on the responding and/or all of the users. Based on the updates and the location information, the NME may analyze the changes to determine whether there is a pattern present indicating that there is a moving danger, such as an armed assailant. The NME may then indicate to the administrator that requested the population status check to further request of the state of the danger.

Various embodiments discussed above view the operation from the perspective of a single organization maintaining a CSS. When a member of an organization sends an alert, that alert is received by the administrators or crisis managers of that particular organization. Multiple organizations, however, may implement their own notification system, maintain their own list of registered users and defining its own security zone. In such situations, NME(s) may manage the security zones associated with each of the organizations, such that members of each organization are isolated from each other. This separation allows for each organization to push out notifications and manage only those users within its own organization, who are generally the ones most interested in notifications within the organization. Moreover, this isolation ensure security of the information of registered users of each organization.

Although beneficial, this separation and lack of communication between the CSS employed by each organization may cause unintended results where multiple organizations are located within the same vicinity as the other. If a member of one organization notices an emergency occurring while within the security zone of another organization (e.g., if a student from a local university is at a shopping mall that employs a CSS), any alert that member attempts to send may only be sent to the administrators of the member's organization, or not sent at all (if alerts cannot be generated while outside the geo-fence of the member's organization). This raises the chance that an emergency alert to the shopping mall's CSS administrators may be delayed, or not be acknowledged at all.

Figure 21:
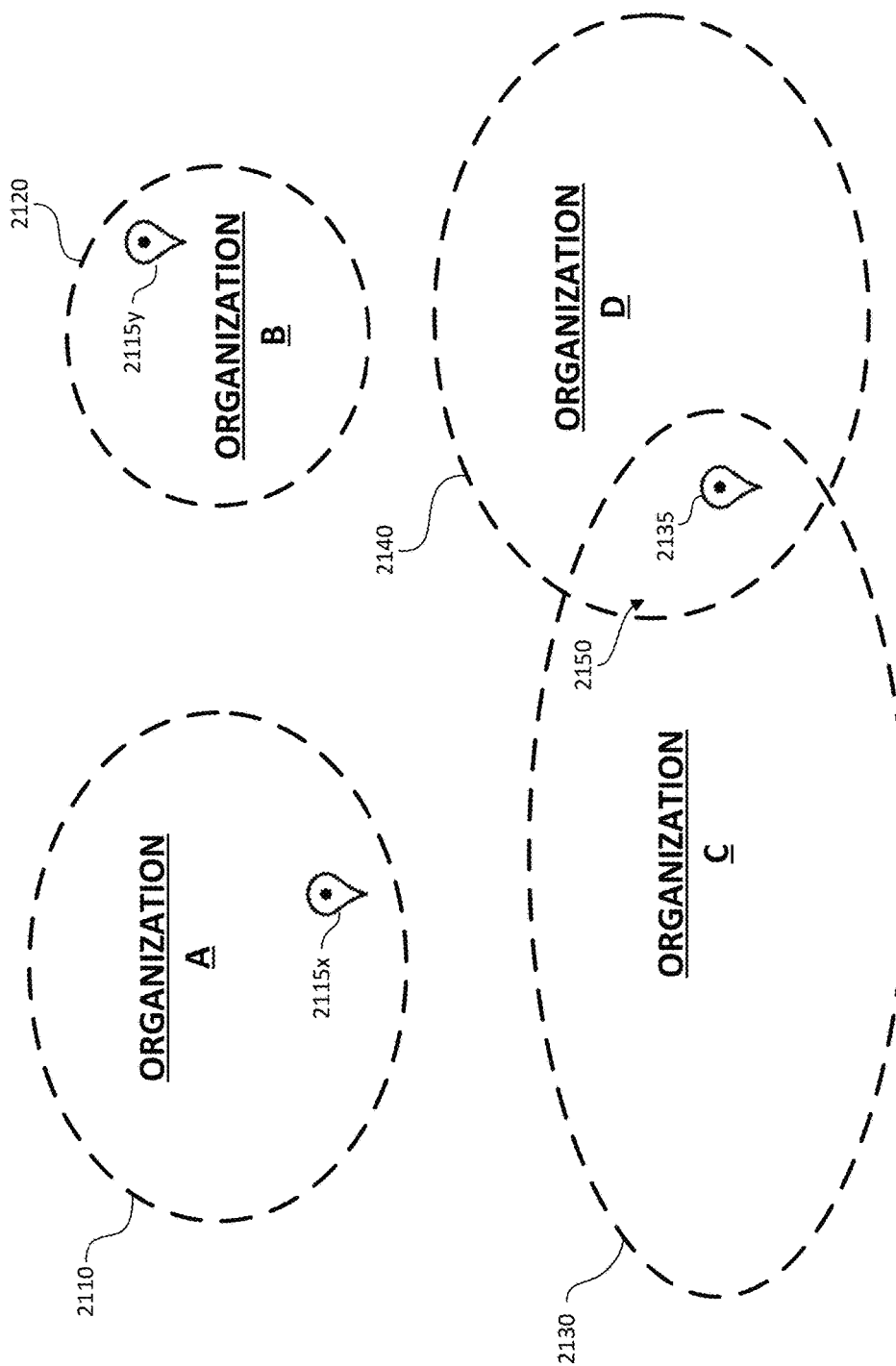
FIG. 21 illustrates an example situation of multiple organizations having individual security zones (with geo-fencing) in accordance with embodiments of the technology of the present disclosure.

FIG. 21 illustrates an example situation of multiple organizations having individual security zones (with geo-fencing) in accordance with embodiments of the technology disclosed herein. As illustrated, Organization A has set up a security zone 2110, Organization B has set up a security zone 2120, Organization C has set up a security zone 2130, and Organization D has set up a security zone 2140. In the illustrated embodiment, each organization (A, B, C, and D) have each implemented a CSS similar to the CSS discussed above. Although not pictured, in the illustrated embodiment the CSS of each organization may be managed through a common NME (as discussed with respect to FIGS. 1 and 2).

As illustrated in FIG. 21, when a member of Organization A is presented at spot $2115x$, he is within the security zone of Organization A. In such cases, the member is capable of sending an alert to the administrators of Organization A, similar to the embodiments discussed above. When the member of Organization A moves to spot $2115y$, he is no longer within the security zone of Organization A 2110, but is within the security zone of Organization B 2120. In some embodiments, the member is unable to generate an alert for an emergency because he is outside of the security zone for Organization A 2110. In other embodiments, the member may still generate an alert while he is within the security zone 2120 at spot $2115y$, but the alert would only be received by the administrators of Organization A, as the member at spot $2115y$ is only a member of Organization A. However, as the emergency is occurring within security zone 2120 associated with Organization B, this could lead to a delay in response to the emergency.

In various embodiments, a member of one organization (e.g., Organization A) may be capable of generating an alert that is receivable by a second organization (e.g., Organization B) while that member is located within the security zone of the second organization. When the member of Organization A sends an alert while positioned at spot $2115y$, the NME can identify that the member is within the security zone 2120 associated with Organization B. Accordingly, the NME may route the alert generated by the user to the administrators of Organization B as if the user was a member of Organization B the whole time. In some embodiments, the NME may also create a secure communication channel between the member of Organization A and the administrators of Organization B, similar to the secure communication channel and features discussed above with respect to FIGS. 11-13. The member of Organization A may be treated by the NME as if he was a member of Organization B. In various embodiments, the NME may limit the amount of information on the member that is available to Organization B, such as limiting the information only to the location of the member. In some embodiments, the NME may tag the alert with anonymity information, which masks the identity of the user but still enables Organization B to interact and respond to the emergency. The anonymity data may comprise a numerical or alphanumerical term that provides a way for Organization B to refer to the user, but without knowing anything personal about the user. In this way, the member may be able to avail himself of the secure communication features of the CSS of Organization B, but the integrity of the separate organization's information may be maintained by the NME.

As illustrated in FIG. 21, in some embodiments the security zones of different organizations may overlap, creating a shared notification zone 2150. In various embodiments, when a member of Organization D is located at spot 2135, she is within the shared notification zone 2150 comprising a portion of both security zone 2140 associated with Organization A and security zone 2130 associated with Organization C. Both organizations share a responsibility over the safety of its members within the shared notification zone 2150. When the member of Organization D sends an alert from spot 2135, the NME receives the alert and identifies that the member is located within the shared notification zone 2150. In addition to forwarding the alert to administrators of Organization D, the NME may also forward the alert to the administrators of Organization C, which also shares a responsibility and interest over the shared notification zone 2150. The NME may further provide the member of Organization D with additional features of the CSS of Organization C (e.g., secure communication with administrators) in a similar manner as discussed above with respect to the example involving Organizations A and B in FIG. 21.

FIG. 22 illustrates an example process of inter-organizational communication in accordance with embodiments of the technology disclosed herein. At 2210, the NME receives an emergency alert from a user. At 2220, the NME identifies the location of the user sending the emergency alert. In some embodiments, the location of the user may be tagged to and/or included in the alert received by the NME, and identification would entail retrieving the location information. In other embodiments, the NME may request location data from the user's device, such as for example from a GPS module of the user's device.

At 2230, the NME determines one or more organizations associated with the user's location. In some embodiments, the NME may compare the identified location against a listing of the boundaries of security zones associated with the organizations managed by the NME. At 2240, the NME determines if the user is a member of any of the organizations. By identifying whether the user is a registered member of any of the organizations associated with the user's location, the NME may provide additional information and capabilities, similar to those discussed with respect to FIGS. 11, 15, 16, and 18.

At 2250, the NME sends the alert to the administrators and/or crisis managers associated with each of the identified organizations. Where the security zones of two separate organizations overlap, the NME may send the alert to both organizations. If the user is a member of one of the organizations determined to be associated with the user's location, the NME may proceed to operate in a manner similar to that discussed with respect to FIGS. 11, 15, 16, and 18. If the user is not a member of one or the organizations, the NME may send the alert to the administrators and/or crisis managers of that organization and provide a modified version of the services discussed with respect to FIGS. 11, 15, 16, and 18, in some embodiments. In this way, the NME can ensure that the interested administrators are notified of emergencies occurring within their security zones, regardless of whether the user reporting the emergency is registered with the affected organization.

As noted above, the various improvements of the present disclosure can be extended to users employing SMS based messaging instead of employing a CSS application. In particular embodiments, the NME (or other element of the CSS) may implement, in whole or in part, one or more methods that enable the CSS to capture and handle non-preprogrammed SMS messages from users in a meaningful way, propagating such communications to other users as desired or prescribed. Such capabilities enable two-way communication between an increasing number of users—not just those that are running the CSS App. That is, in accordance with one or more embodiments of the present disclosure, systems and methods disclosed herein provide two-way communication between users by applying specialized handling operations with reference to common short code notifications, and non-preprogrammed responses thereto, such that even users with phones not running the CSS application—but which are still capable of SMS messaging—may participate in bi-directional communication with other registered and/or unregistered users in the event of an emergency. Such systems and methods enable law enforcement, first responders, site administrators, security stake holders and/or others to net relevant non-preprogrammed information from common short code notification recipients not running the CSS application, but who nevertheless have pertinent information to share to aid in the resolution of a time sensitive or life-critical situation. Such systems and methods increase information dissemination and reduce emergency response time by integrating CSS App-to-CSS App with SMS-to-CMS App interactions, and vice versa, and further with SMS-to-SMS interactions occurring in accordance with propagation methodologies implemented via the CSS (e.g., at the NME).

Figure 25:
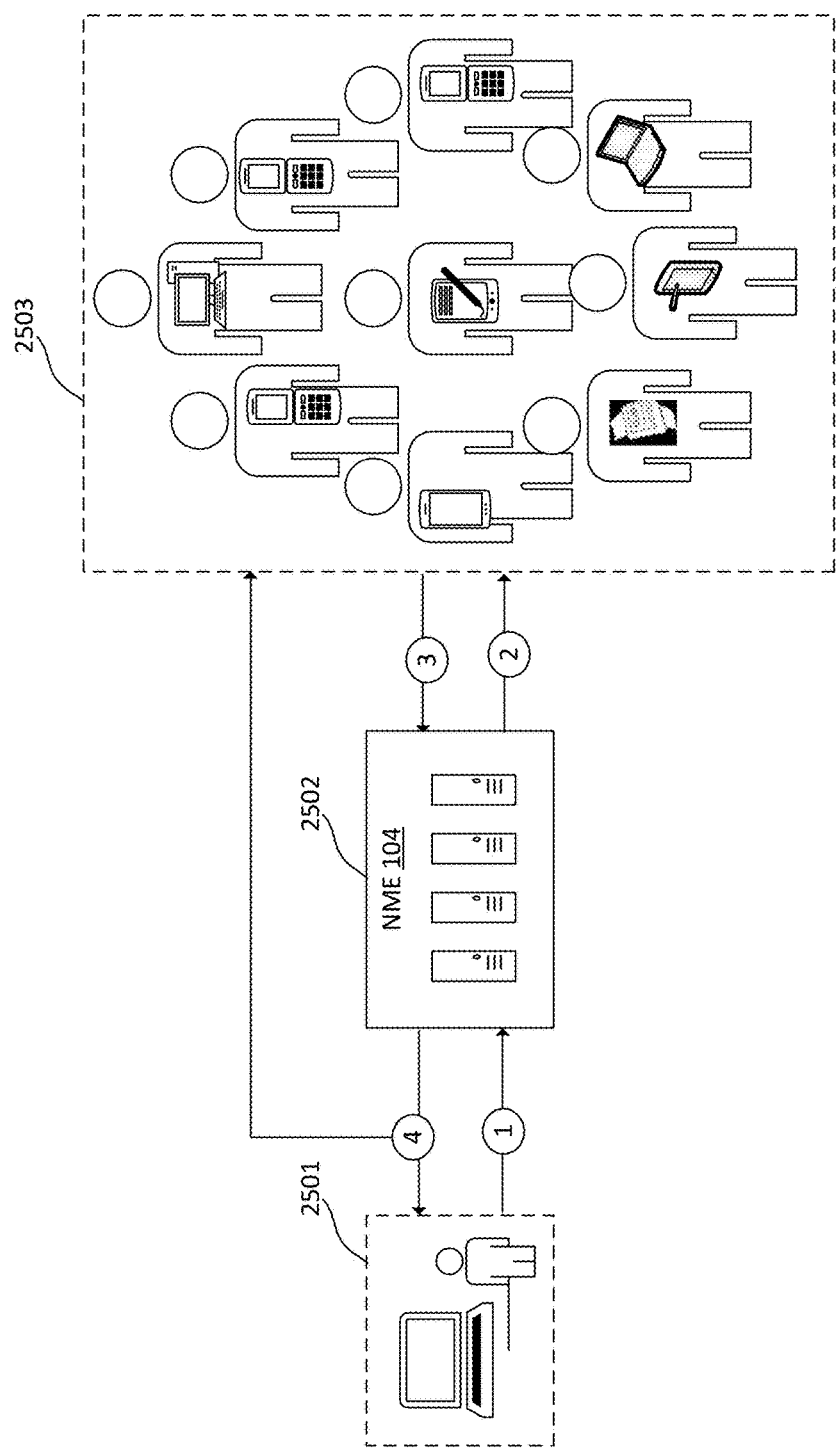
FIG. 25 illustrates an example environment in which systems and methods of the present disclosure may be implemented, here depicting that common short code SMS based messages may be transmitted to (and/or free-form SMS messages received from) users having devices not running the CSS mobile application but instead communicating in accordance with SMS functionality of their devices, in accordance with one or more embodiments of the present disclosure.

In accordance with some embodiments of the present disclosure, a registered user (or in some embodiments, even an unregistered user) may receive a common short code sourced SMS broadcast notification on their user device, then reply back to the sender (often an administrator, or other entity associated with the common short code) with either a preprogrammed response or a non-preprogrammed response (e.g., a free-form or otherwise custom message), whereupon the NME of the CSS processes the message and selectively propagates that message to other users (e.g., depending on their category, location, permissions, etc.) thus enabling two-way communication and other functionality. FIG. 25 illustrates an environment including an example communication flow of the present disclosure, discussed in more detail with reference to FIGS. 26-32B. Referring to FIG. 25, an administrator 2501 may wish to transmit a message to a plurality of users 2503. Some or all of the users 2503 may be operating devices that either do not have CSS application downloaded and running, or may have devices that are not even capable of running the CSS application, but still may be able to receive SMS messages on their devices (such devices are sometimes referred to herein, collectively, as SMS based devices, or simply, SMS devices). Administrator 2501 may prepare a message that can be sent as an SMS message to the plurality of users 2503 with SMS devices via common short code transmission by NME 2502. Administrator 2501's message is provided to NME 2502 either via a CSS App, an SMS program, an email, or otherwise (shown at operation 1), NME 2502 can then propagate the message as an SMS message from a common short code address to the plurality of users 2503 with SMS devices for whom the administrator 2501 and/or NME 2502 has contact information, e.g., a contact address such as a phone number, an email address, or any other unique identifier (shown at operation 2). The users 2503 in receipt of the common short code SMS message broadcast may respond with an SMS based reply using their computing device's SMS functionality; the SMS reply may include a preprogrammed response, a non-preprogrammed response, or both. NME 104 may receive such messages (shown at operation 3) in accordance with one or more operations (examples of such described with reference to FIGS. 26-32B), and may further propagate such messages to the sender of the original message (or one or more other people associated with the sender or the sender's organization), a subset of members of a predefined group, and/or one or more of the other users 2503 (shown at operation 4).

It should be appreciated that although FIG. 25 is illustrated with a single symbolic individual as the administrator 2501, the present disclosure is not limited to implementations where there is only a single administrator is sending broadcast notifications. The administrator 2501 may include a team of individuals, and even include one or more entire categories of individuals with the same or different permissions. For example, just as discussed with respect to FIGS. 1-24, an entire team of individuals may be associated with the administrator category (or other supervisory category)—such as campus teachers, deans, directors, professors, security staff, or other third party emergency responders responsible for the zone of interest (e.g., a campus). Furthermore, although FIG. 25 illustrates a communication flow that originates with an administrator sending out an SMS based broadcast notification, then netting user SMS replies to such broadcast, it should be understood that the systems and methods of the present disclosure may also be configured to receive and handle SMS based messages that originate from one or more users 2503 instead of an administrator 2501.

Figure 26:
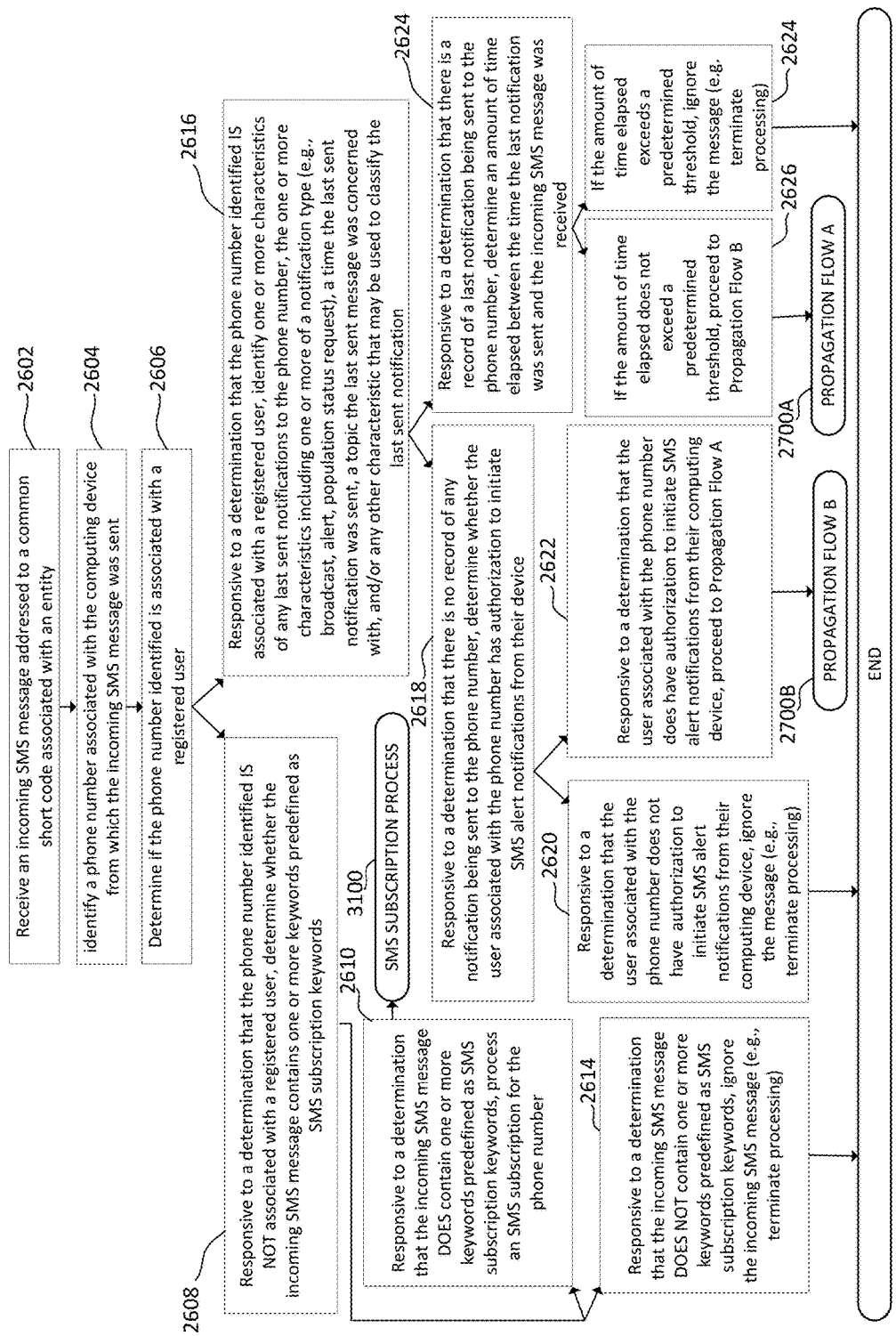
FIG. 26 illustrates an example method that may be implemented in connection with the SMS integrated environment shown in FIG. 25, in accordance with one or more embodiments of the present disclosure.

To fully integrate communications to and from SMS device users (as distinct from users messaging using a CSS application) with systems of the present disclosure, one or more operations may be implemented at an NME of the CSS (and/or another element of the CSS) in accordance with embodiments of the present disclosure. FIG. 26 illustrates a method that may be implemented in one or more such embodiments of the present disclosure. As shown, at operation 2602 method 2600 may include receiving an incoming SMS message addressed to a common short code associated with an entity. The incoming SMS message may have been sent in response to a broadcast notification (from an administrator of the entity, for example), in response to a population status request (from an administrator of the entity, for example, in connection with an ongoing emergency); or may be a user-initiated alert notification (from another user of the system, sent spontaneously or in response to a broadcast, for example, providing insight about the emergency situation), and/or the incoming message may have been accidently sent or not associated with a registered user. It is up to the NME (or other component of the CSS) to determine how to classify the incoming message and propagate it to relevant other users of the CSS in a an acceptable platform through which they may be interfacing with the CSS (e.g., SMS, email, App message, etc.). To accomplish this, once an incoming message has been received method 2600 may, at operation 2604, include identifying a phone number associated with the computing device from which the incoming SMS message was sent; and, at operation 2606, method 2600 may include determining if the phone number (or other contact information) identified is associated with a registered user.

Responsive to a determination that the phone number identified is not associated with a registered user, method 2600 at operation 2608 may determine whether the incoming SMS message contains one or more keywords predefined as SMS subscription keywords. Responsive to a determination that the incoming SMS message does contain one or more keywords predefined as SMS subscription keywords, method 2600, at operation 2610, may process an SMS subscription for the phone number. Additional details regarding processing an SMS subscription for the phone number are disclosed with reference to FIG. 31. And responsive to a determination that the incoming SMS message does not contain one or more keywords predefined as SMS subscription keywords, method 2600 at operation 2614 may simply discard/ignore the incoming SMS message (e.g., terminates processing the incoming SMS message).

On the other hand, responsive to a determination that the phone number identified is associated with a registered user, method 2600 at operation 2616 may identify one or more characteristics of the last sent notification to the phone number, if any, the one or more characteristics including one or more of a notification type (e.g., broadcast, population status request, etc.), and/or a time the last sent notification was sent, and/or a topic the last sent message was concerned with, and/or any other characteristic that may be used to classify the last sent notification.

Responsive to a determination that there is no record of any relevant last notification being sent to the phone number, method 2600 at operation 2618 determines whether the user associated with the phone number has authorization to initiate SMS alert notifications from their computing device. Responsive to a determination that the user associated with the phone number does not have authorization to initiate SMS alert notifications from their computing device, method 2600 at operation 2620 may simply discard/ignore the incoming SMS message (e.g., terminate processing the incoming SMS message). And responsive to a determination that the user associated with the phone number does have authorization to initiate SMS alert notifications from their computing device, method 2600 at operation 2620 may proceed to additional propagation operations (see Propagation Flow B illustrated in FIG. 27).

On the other hand, responsive to a determination that there is a record of a last notification being sent to the phone number, method 2600 at operation 2624 may determine an amount of time elapsed between the time the last notification was sent and the incoming message was received. If the amount of time elapsed exceeds a predetermined threshold, method 2600 at operation 2624 may simply discard/ignore the incoming SMS message (e.g., terminates processing the incoming SMS message). If the amount of time elapsed does not exceed a predetermined threshold, method 2600 at operation 2626 may proceed to additional propagation operations (see Propagation Flow A 2700 A illustrated in FIG. 27).

Figure 27:
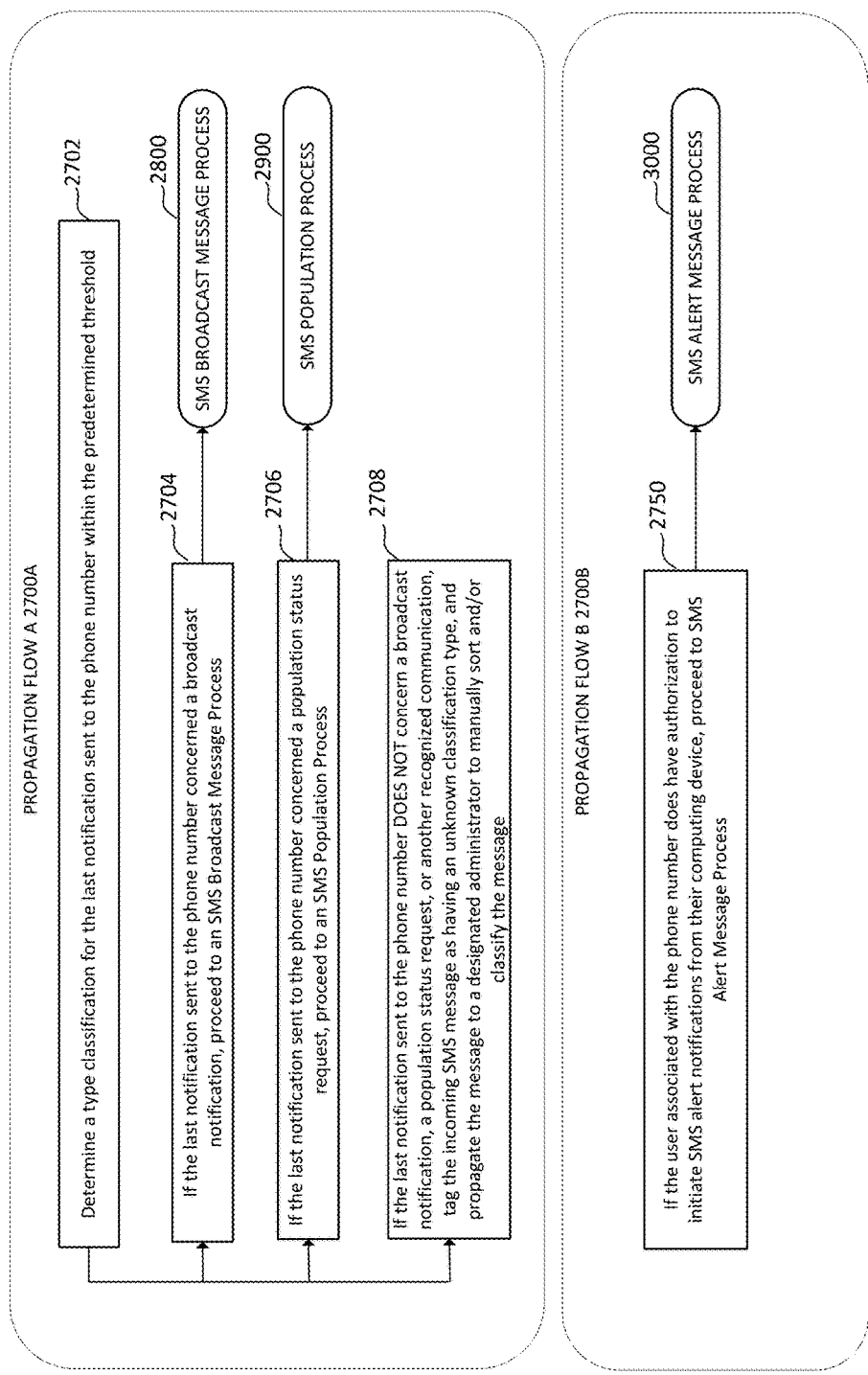
FIG. 27 illustrates an example method that may be implemented in connection with the SMS integrated environment shown in FIG. 25, in accordance with one or more embodiments of the present disclosure.

FIG. 27 illustrates methods that may be implemented in accordance with one or more embodiments of the technology disclosed herein. As shown in FIG. 27, propagation operations associated with Propagation Flow B 2700B may include, at operation 2750, proceeding to an SMS Alert Message Process 3100 if it is determined that the user associated with the phone number does have authorization to initiate SMS alert notifications from their computing device.

Figure 28A:
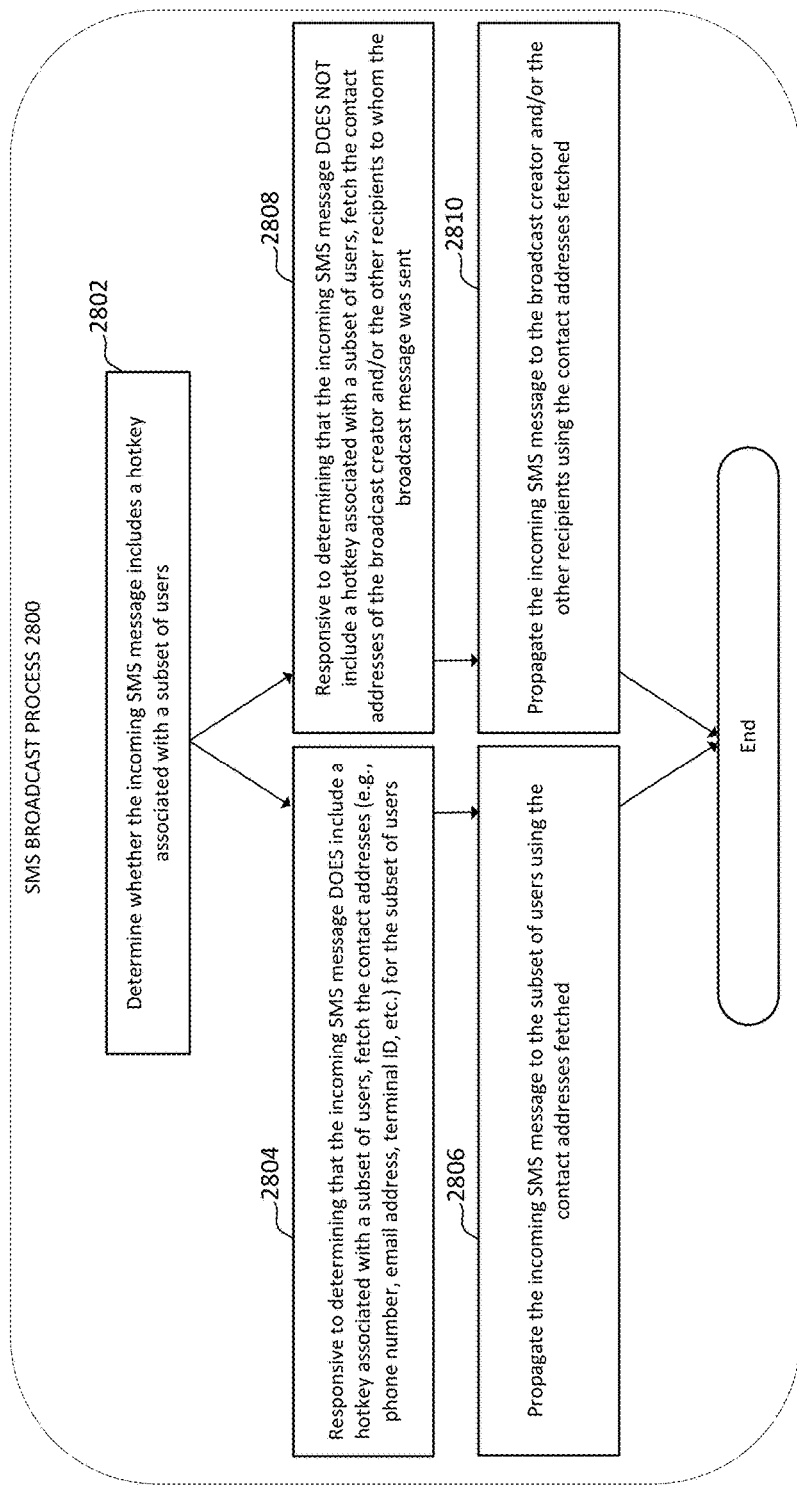
FIG. 28A illustrates an example method that may be implemented in connection with the SMS integrated environment shown in FIG. 25, in accordance with one or more embodiments of the present disclosure.

As further shown in FIG. 27, propagation operations associated with Propagation Flow A 2700A may include, at operation 2702, determining a type classification for the last notification sent to the phone number within the predetermined threshold. If the last notification sent to the phone number concerned a broadcast notification, Propagation Flow A 2700A may include, at operation 2704, proceeding to an SMS Broadcast Message Process 2800. If the last notification sent to the phone number concerned a population status request, Propagation Flow A 2700A may include, at operation 2706, proceeding to an SMS Population Process 2900. If the last notification sent to the phone number does not concern a broadcast notification, a population status request, or another recognized communication, Propagation Flow A 2700A may include, at operation 2708, tagging the incoming SMS message with an identifier associated with an unknown classification type, and optionally propagate the message to a designated administrator to manually sort and/or classify the incoming SMS message (e.g., associate the incoming SMS message with an identifier associated with a known classification type, then pass the properly classified message to a subsequent step for incoming SMS messages of that type). FIG. 28A illustrates a method that may be implemented in accordance with one or more embodiments of the technology disclosed herein.

As shown in FIG. 28A, SMS Broadcast Process 2800 may, at operation 2802, determine whether the incoming SMS message includes a hotkey associated with a subset of users. Responsive to determining that the incoming SMS message does include a hotkey associated with a subset of users, SMS Broadcast Process 2800 may, at operation 2804, fetch the contact addresses (e.g., phone number, email address, terminal ID, etc.) for the subset of users. Thereafter, SMS Broadcast Process 2800 may, at operation 2806, propagate the incoming SMS message to the subset of users, using the contact addresses fetched, before ending the process. In this way, some embodiments of the present disclosure enable a user to selectively send their reply to a broadcast to only a subset of the registered users (less than all the registered users) connected with the system by using a hotkey. With the hotkeys of the present disclosure, a user may send, receive and view comments among a subset of the total body of users. For example, if someone in the organization, say a security officer, wants to let the management team know additional information, he or she can respond to the broadcast with a specific hotkey thus, notifying the entire management team, and not just the sender. For instance, in this example the hotkey might be denoted by the term "management" followed by a colon, then followed by the message that the user wants to send. Thus, the security officer, if wanting to limit his response to just the management team, might respond with the following SMS message: "Management: 'Hey team I just saw the perpetrator going into the Chemistry building'." The system may recognize the "management" hotkey, fetch the subset of users associated with that hotkey, and propagate the message to that subset of users (e.g., via App messaging, SMS messaging, or both).

Alternatively, responsive to determining that the incoming SMS message does not include a hotkey associated with a subset of users, SMS Broadcast Process 2800 may, at operation 2808, fetch the contact addresses of the broadcast creator and/or the other recipients to whom the broadcast message was sent. Thereafter, SMS Broadcast Process 2800 may, at operation 2810, propagate the incoming SMS message to the broadcast creator and/or the other recipients using the contact addresses fetched, before ending the process. Propagating the message may include populating either or both of a CSS App broadcast comment feed/interface or SMS comment feed/interface.

Figure 28B:
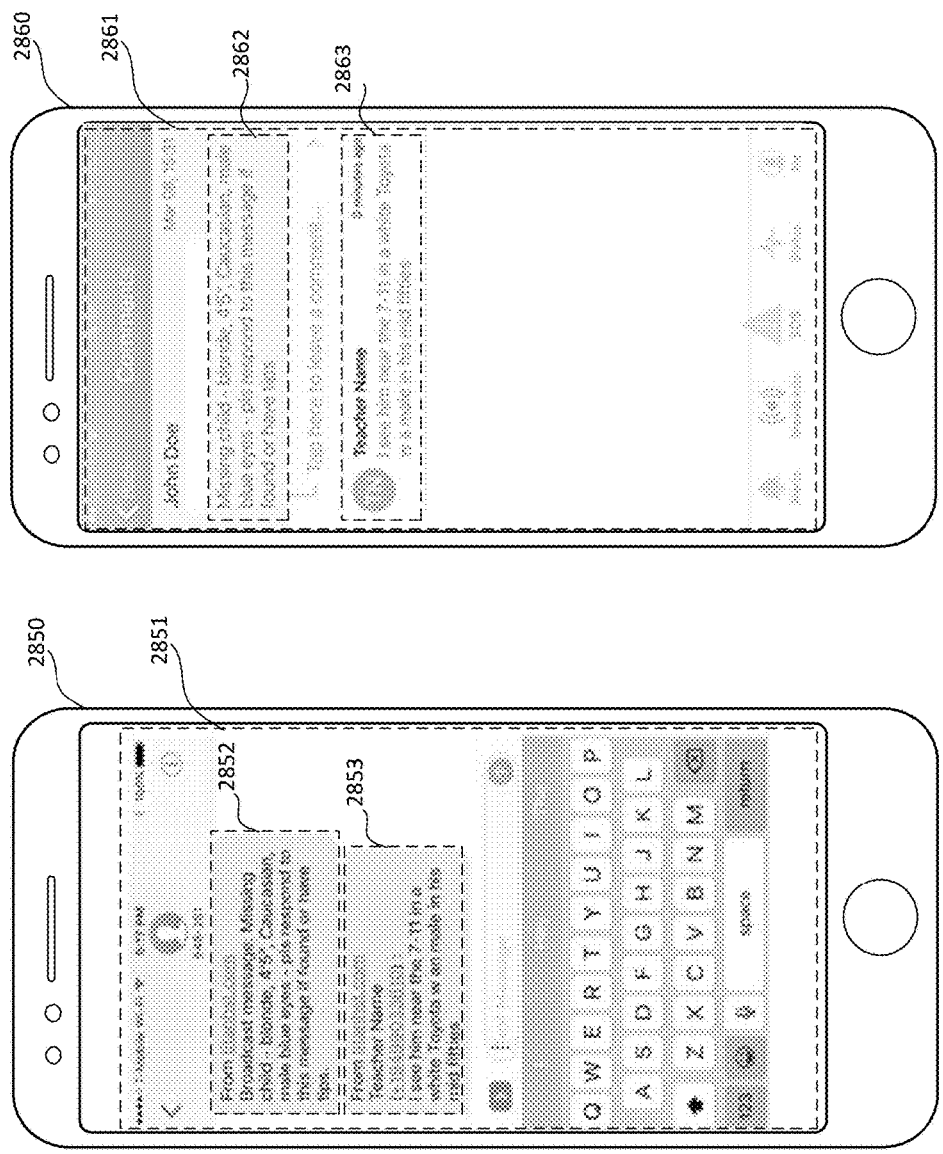
FIG. 28B illustrates an example SMS messaging interface and an example CSS mobile app messaging interface depicting features that may be achieved by implementing one or more methods and systems of the present disclosure.

FIG. 28B illustrates an SMS based comment interface 2851 and an App based comment interface 2861. As shown, CSS may populate either or both an SMS based comment interface 2851 and/or a CSS App based comment interface 2861 with one or more of the broadcast notifications 2852, 2862 and/or user responses 2853, 2863, in accordance with one or more embodiments of the present disclosure.

Figure 29A:
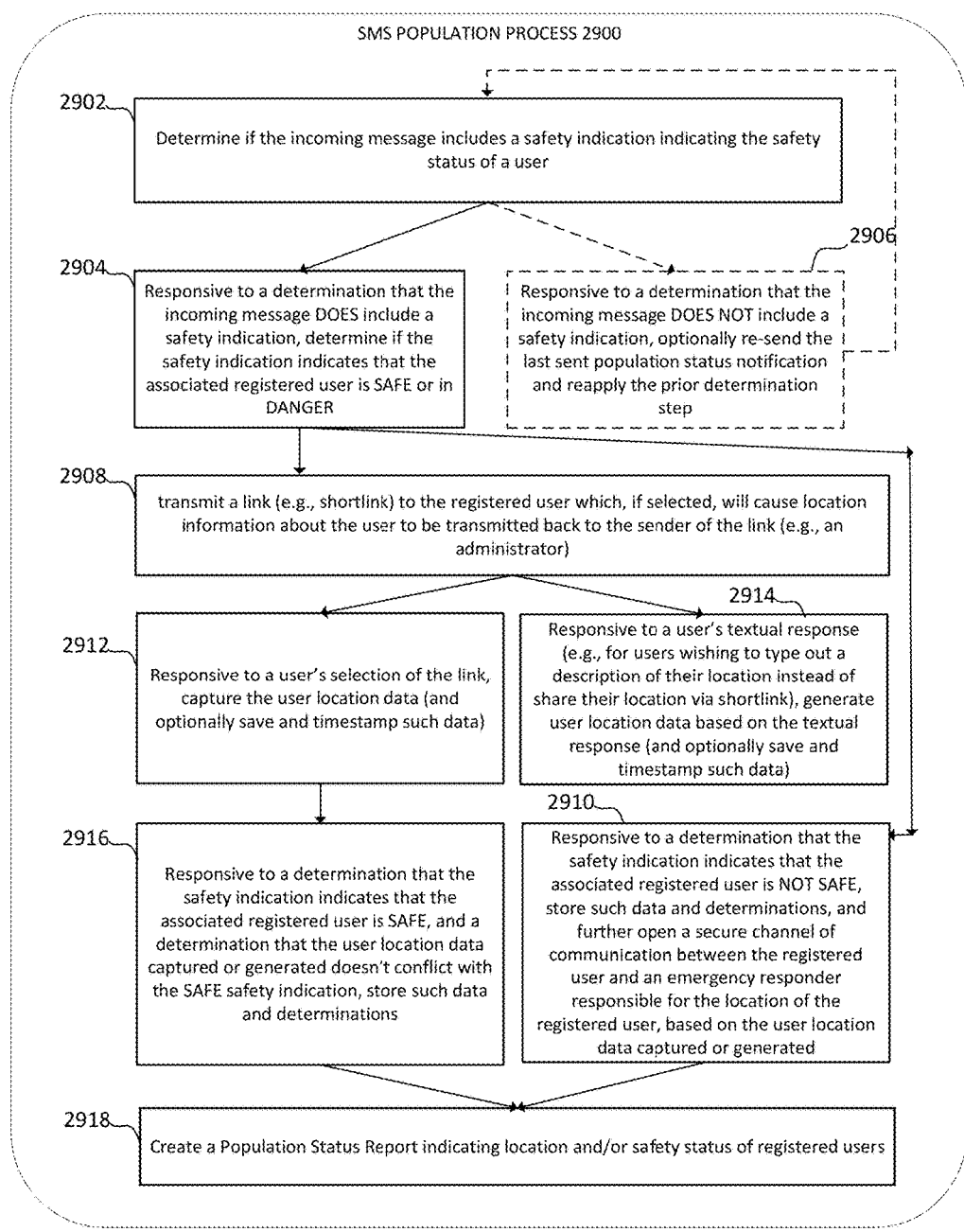
FIG. 29A illustrates an example method that may be implemented in connection with the SMS integrated environment shown in FIG. 25, in accordance with one or more embodiments of the present disclosure.

FIG. 29A illustrates methods that may be implemented in accordance with one or more embodiments of the technology disclosed herein. As shown in FIG. 29, SMS Population Process 2900 may, at operation 2902, determine if the incoming message includes a safety indication indicating the safety status of a user. Responsive to a determination that the incoming message does include a safety indication, SMS Population Process 2900 may, at operation 2904, determine if the safety indication indicates that the associated registered user is safe or in danger. Responsive to a determination that the safety indication indicates that the associated registered user is in danger (or otherwise not safe), SMS Population Process 2900 may, at operation 2910 store such data and determinations, and further open a secure channel of communication between the registered user and an emergency responder responsible for the location of the registered user, based on user location data captured, generated, or estimated. As shown, regardless of whether the safety indication indicates that the associated user is safe or in danger, SMS Population Process 2900 may, at operation 2908, transmit a link (e.g., short link) to the registered user which, if selected, will cause location information about the user to be transmitted back to a computing device that transmitted the link, or caused the link to be transmitted, e.g., an administrator. Thereafter, responsive to a user's selection of the link, SMS Population Process 2900 may, at operation 2912, receive/capture the user location information (and optionally save and timestamp such data). Alternatively, in response to a user's text-based response (e.g., for users limited to or wishing to type out a description of their location instead of share their location via short link), SMS Population Process 2900 may, at operation 2914, generate or estimate user location data based on the textual response (and optionally save and timestamp such data). Also, responsive to a determination that the safety indication indicates that the associated registered user is safe, and/or a determination that the user location data captured, generated, or estimated doesn't conflict with the 'safe' safety indication, SMS Population Process 2900 may, at operation 2916, store such data and determinations. As further shown, SMS Population Process 2900 may, at operation 2918 create a population status report indicating location and/or safety status of registered users, to the extent it has been determined (e.g., of a plurality of registered users for whom location data has been obtained, and/or for whom location/safety status has been requested but not obtained).

In some embodiments, the method described above does not await a message including a safety indication, but instead an NME server automatically sends a short link to the recipient as soon as the recipient responds with any SMS reply at all, or after a predetermined time period has passed with no recipient response. In some embodiments, once the recipient inputs or sends a response, via SMS reply, a server at NME will automatically send a short link to that recipient, prompting them to tap a short link to share their location. Location sharing may be limited to an instantaneous share, or it may be continuously shared, either of which may be preset as desired when a user registers with the CSS, or may be based on the user's response in a given situation.

Figure 29B:
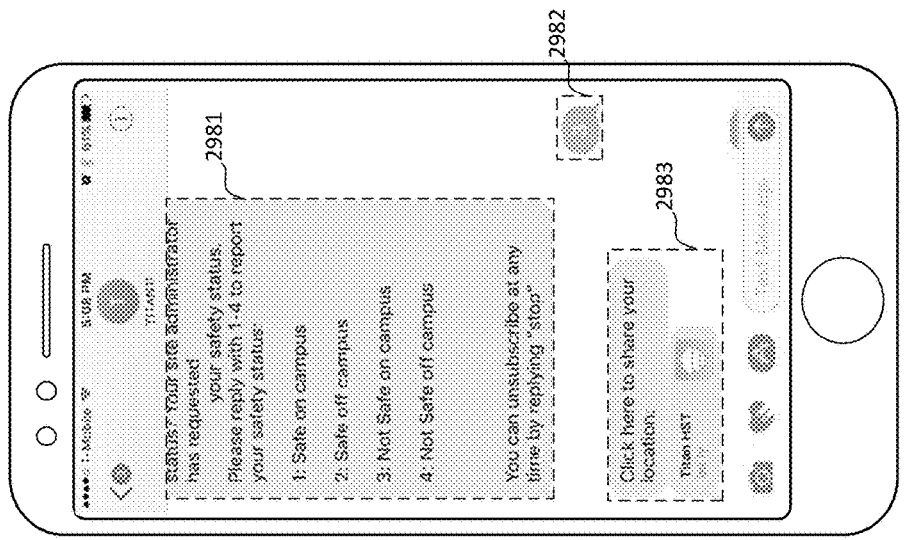
FIG. 29B illustrates an example SMS messaging interface depicting a population status notification/request (from common short code operator—associated with "Titan1!" as shown in the Figure), a constituent's SMS based response to such notification, and a location sharing short link generated and transmitted from the common short code operator (triggered responsive to the constituent recipient's reply to the notification), which may be achieved by implementing one or more methods and systems of the present disclosure.

FIG. 29B illustrates just one example of how one or more methods of the present disclosure may be implemented. As shown, FIG. 29B depicts an instance when a user replies to an SMS population status notification via a preprogrammed response—the SMS population status notification denoted by message 2981, the user's SMS reply denoted by message 2982 (including the preprogrammed response). As shown, a message 2983 is sent prompting the user to click a transmitted short link to acquire GPS location data from the user. Upon the user selecting the short link, the location data (provided by the GPS sensor in the user's mobile phone, for example) is then relayed into the CSS over the network, and back into the application to provide administrators (and/or other users such as emergency responders) with robust location information about registered users. In some embodiments, when the user tap the short link (e.g., a bit.ly link) they are taken to a web browser through which their location may be shared with the server.

There are many cases in which this type of interaction may be beneficial to safety stewards, law enforcement, administrators, emergency responders, etc. For example, if an organization administrator needs to quickly locate their employees or students on a field trip or business trip, they can broadcast a notification with a population status request in order to net location and safety details from their constituents (e.g., registered users) via SMS. In another example, for instance, in the event of an earthquake, fire, or lockdown, for a business, government, or school, safety stewards can send an SMS population status notification to account for each constituent's location and safety status in order to identify those in need of medical assistance.

Figure 29C:
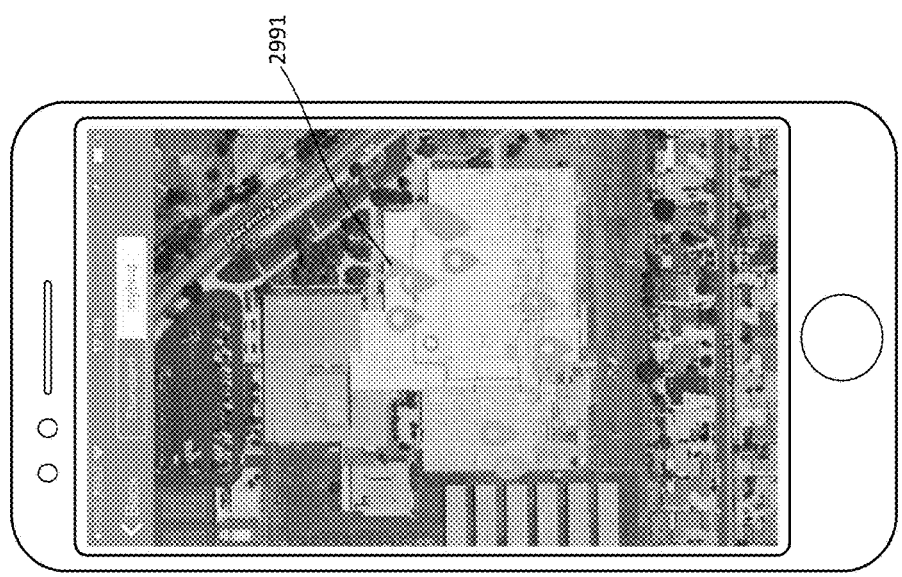
FIG. 29C illustrates an example visualization interface depicting user locations in accordance with one or more embodiments of the present disclosure.

In some embodiments, as location information is obtained from individual users, the CSS may populate a location visualization interface to depict such information, e.g., generate and project display objects onto a visual map to depict user's respective locations. One such example visualization interface is shown in FIG. 29C, display object 2991 representing the location of a registered user in the context of the map shown. Such maps and display objects may be provided via a CSS App, a Web application, or as part of an augmented reality map display (i.e., where the map is the real world scene captured by the user's computing device's camera), etc.

Figure 30:
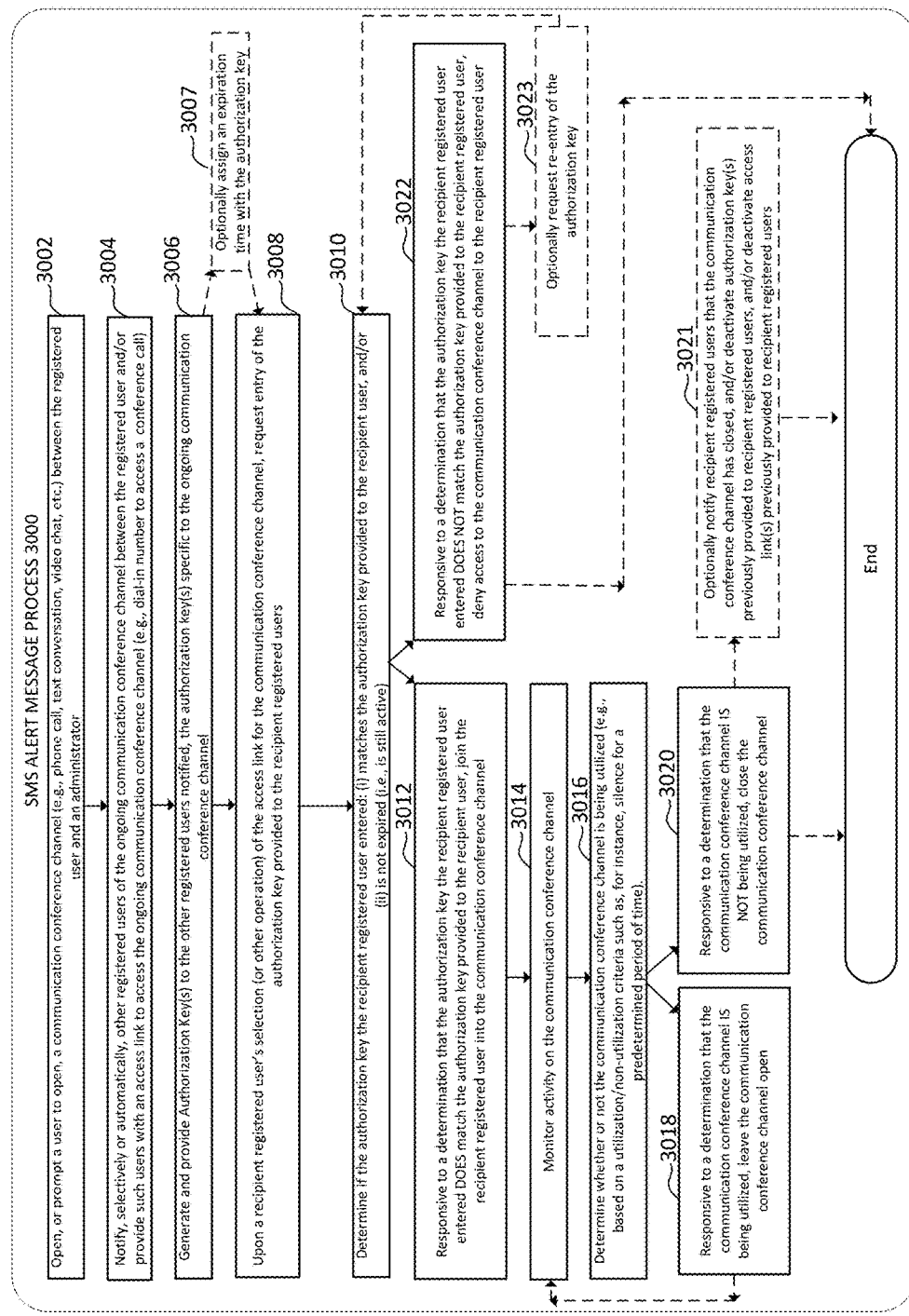
FIG. 30 illustrates an example method that may be implemented in connection with the SMS integrated environment shown in FIG. 25, in accordance with one or more embodiments of the present disclosure.

FIG. 30 illustrates methods that may be implemented in accordance with one or more embodiments of the technology disclosed herein. As shown in FIG. 30, SMS Alert Message Process 3000 may, at operation 3002 open, or prompt a user to open, a communication conference channel (e.g., phone call, text conversation, video chat, etc.) between the registered user and an administrator (or other support staff member or emergency responder). At operation 3004, SMS Alert Message Process 3000 may notify, selectively or automatically, other registered users of the ongoing communication conference channel between the registered user and/or provide such users with an access link to access the ongoing communication conference channel (e.g., dial-in number to access a conference call). At operation 3006, SMS Alert Message Process 3000 may generate and provide authorization key(s) to the other registered users notified, the authorization key(s) specific to the ongoing communication conference channel. At operation 3007, SMS Alert Message Process 3000 may optionally assign an expiration time with the authorization key. Upon a recipient registered user's selection (or other operation) of the access link for the communication conference channel, SMS Alert Message Process 3000 may, at operation 3008, request entry of the authorization key provided to the recipient registered users. At operation 3007, SMS Alert Message Process 3000 may determine if the authorization key the recipient registered user entered: (i) matches the authorization key provided to the recipient user, and/or (ii) is not expired (i.e., is still active).

Responsive to a determination that the authorization key the recipient registered user entered does match the authorization key provided to the recipient user, SMS Alert Message Process 3000 may, at operation 3012, join the recipient registered user into the communication conference channel. At operation 3014, SMS Alert Message Process 3000 may monitor activity on the communication conference channel (e.g., sense the presence or absence of audio signals being transmitted within a phone conference (i.e. listening in on the channel), determine if SMS messaging within a group text conference has ended (i.e., checking to see if communication has not occurred for a predetermined amount of time). At operation 3016, SMS Alert Message Process 3000 may determine whether or not the communication conference channel is being utilized. Responsive to a determination that the communication conference channel is being utilized, SMS Alert Message Process 3000 may, at operation 3018, leave the communication conference channel open. Responsive to a determination that the communication conference channel is not being utilized, SMS Alert Message Process 3000 may, at operation 3018, close the communication conference channel. Optionally, SMS Alert Message Process 3000 may, at operation 3021, notify recipient registered users that the communication conference channel has closed, and/or deactivate authorization key(s) previously provided to recipient registered users, and/or deactivate access link(s) previously provided to recipient registered users.

Alternatively, responsive to a determination that the authorization key the recipient registered user entered does not match the authorization key provided to the recipient registered user, SMS Alert Message Process 3000 may, at operation 3022, deny access to the communication conference channel to the recipient registered user. Optionally, SMS Alert Message Process 3000 may, at operation 3023 request re-entry of the authorization key from the recipient registered user, then loop to operation 3010 unless and/or until the recipient registered user enters the correct active authorization key.

Figure 31:
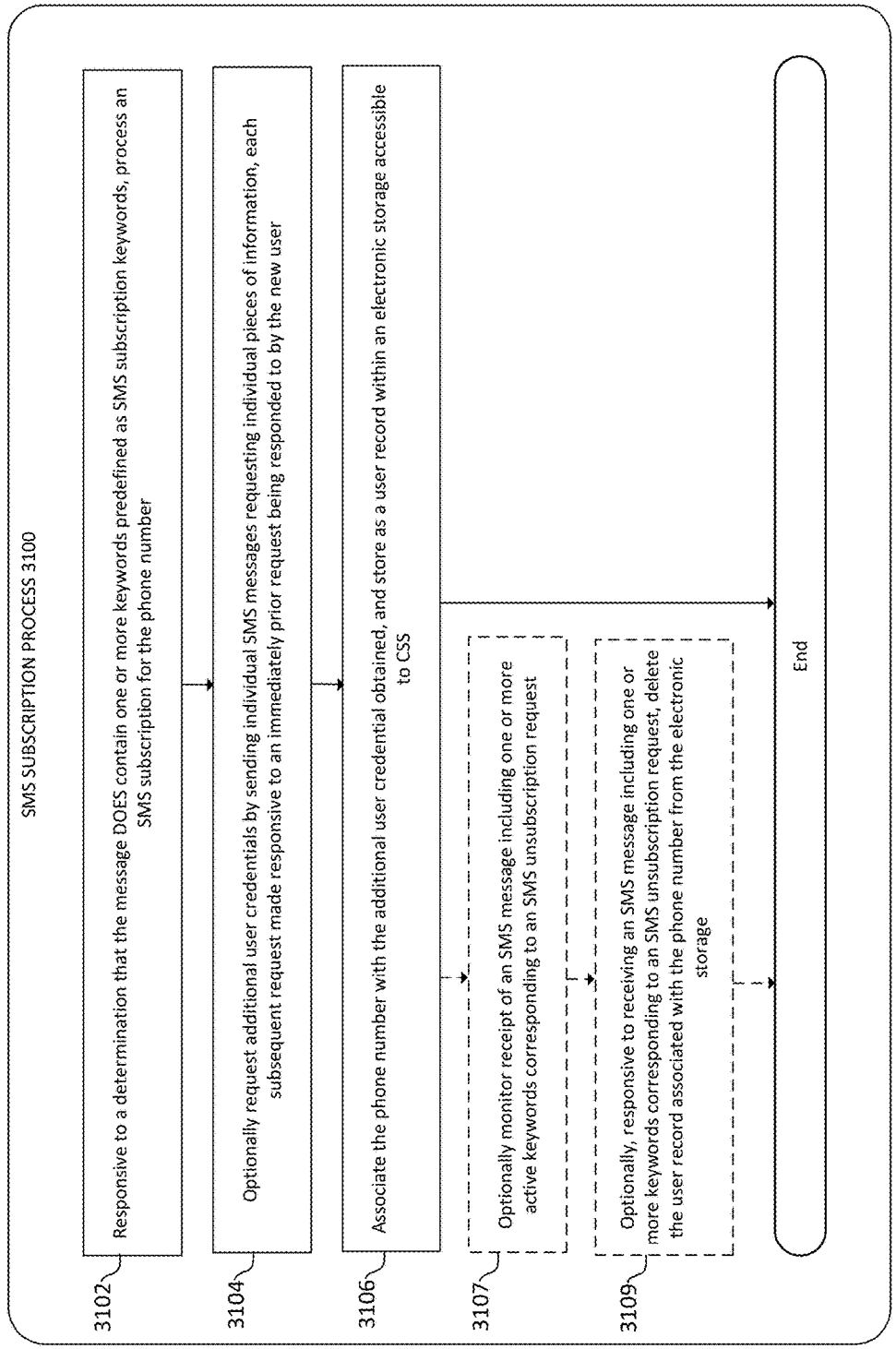
FIG. 31 illustrates an example method that may be implemented in connection with the SMS integrated environment shown in FIG. 25, in accordance with one or more embodiments of the present disclosure.

FIG. 31 illustrates methods that may be implemented in accordance with one or more embodiments of the technology disclosed herein. As shown in FIG. 31, responsive to a determination that the message does contain one or more keywords predefined as SMS subscription keywords, SMS Subscription Process 3100 may, at operation 3102, process an SMS subscription for the phone number. Optionally, SMS Subscription Process 3100 may, at operation 3104, request additional user credentials by sending one or more individual SMS messages requesting one or more individual pieces of information, each subsequent request made responsive to an immediately prior request being responded to by the new user. At operation 3106, SMS Subscription Process 3100 may associate the phone number with the additional user credential obtained, and store as a user record within an electronic storage accessible to the CSS. Optionally, SMS Subscription Process 3100 may, at operation 3107, monitor receipt of an SMS message including one or more active keywords corresponding to an SMS unsubscription request. Responsive to receiving an SMS message including such one or more keywords corresponding to an SMS unsubscription request, SMS Subscription Process 3100 may, at operation 3109, delete the user record associated with the phone number from the electronic storage.

In accordance with one or more of the methods illustrated in FIGS. 25-31, SMS notifications may be sent from within a CSS via the CSS App or via an SMS program, triggering the propagation of a message to users—either via the CSS App, or via SMS message sent from a common short code, or via other communication platforms. By applying the presently disclosed technology, all users that receive the common short code based SMS notification have the ability to respond back to that SMS notification using their computing devices SMS capability, and the reply message may be populated back into the CSS App broadcast feed such that users of the App may net information from both CSS App users as well as SMS users. The technology disclosed herein enables SMS users to respond to a mass broadcast notification such that their message is posted back into a system and have that message provided back to a predefined subset of users. The utility of the present disclosure is substantial, and one of ordinary skill in the art will appreciate how such an improvement to community safety systems can be beneficial to society generally. For example, if a child goes missing, a safety steward can notify thousands of people instantly with an SMS message tied to a common short code affiliated with the entity, and subsequently the system can net relevant SMS responses back from such people. The broadcast messages and/or responses thereto can also contain a photo which can help identify faces, locations, etc. The system can feed such information into the CSS App environment such that SMS based users and mobile CSS App based users can engage in bidirectional communication with one another despite using different technical messaging platforms.

In another example, the methods of the present disclosure may also be used to account for many people rapidly. For example, a sender may prompt registered users to reply to a common short code SMS based broadcast for accountability purposes. For businesses, governments, and schools, instant accountability helps mitigate loss of life during critical incidents. People can reply to the broadcast message, enabling the sender (and/or other recipients) with a stream of comments that are netted from respective registered users.

As described herein, the communication methods described herein can be utilized for netting non-preprogrammed SMS responses in the event of a mass broadcast notification where the sender is looking for a specific set of answers from said registered users, as in the example of a missing child. Furthermore, many people can reply to that broadcast notification, thereby providing the sender with a stream of broadcast comments for any situation in which they are looking to net tactical information, quickly, and from a wide audience.

Similarly, in another application, law enforcement personnel, and safety stewards (e.g., emergency responders) can direct large populations of people to conduct certain actions by instructing them via SMS short code mass notifications, and netting non-preprogrammed responses back from said registered users to obtain the rich, real-time (or near real-time) information needed to most efficiently resolve the ongoing situation. Specifically for law enforcement, pictures can be sent via broadcast SMS notifications, enabling said registered users to receive details on an assailant, and again, prompting said registered users to reply back to the broadcast notification via SMS should they have any identifiable or tactical information on the assailants whereabouts or habits, for example As will be apparent upon a review of the instant disclosure, if said broadcast sender uses the CSS application to post the broadcast data, responsive SMS replies may populate the CSS App, enabling the sender to view responses to the broadcast in a real-time, or near real-time feed. This method enables the sender (or other operator) to view a comment stream in response to the broadcast, in an organized and seamless experience that is enriched with information from registered users regardless of whether they are using the CSS App itself, or simply using a SMS messaging platform. The recipients of the broadcast message may reply back with a free-form SMS message to the common short code, and their reply will be displayed in the administrator's CSS App (and/or other user's CSS App) as a broadcast comment and, optionally, will not be relayed to the senders SMS messages. That is, in some embodiments the system may net the SMS reply and populate it into the broadcast comment feed of the receiver's CSS App instead of the typical SMS messaging feed. In some embodiments, the SMS reply may be populated to both the broadcast comment feed of the receiver's CSS App as well as the typical SMS messaging feed. In some other instances, a sender may not be sending out the common short code SMS message from a mobile device, but instead from a web portal or other terminal, for example. In some such embodiments, if the sender does not have a mobile device, the sender may receive replies via an SMS messaging feature integrated with the web portal (or the computing device providing access to the web portal).

In some embodiments, the technology of the present disclosure may be extended even to individuals who are not part of a predefined organization known to the NME. That is, the CSS may be integrated to/with third party systems to extend the features of the presently disclosed CSS to users that were previously unknown to the CSS. Such integration may be provided to mitigate situations where intended recipients cannot interact with the CSS (e.g., receive broadcast notifications, participate in alert notification/call functionality, or receive and respond to population status request notifications (e.g., via common short code, or a CSS App, or otherwise)) and thus either cannot give or receive important information pertinent to an emergency situation. With the technology of the present disclosure, the CSS may be integrated with one or more third party entities (e.g., EMS entities such as a 911 Public Safety Answering Point (PSAP) for example, such that it can still be used to net a user's location via common short code communication), even if the user is not part of any predefined organization known to the CSS.

Figure 32A:
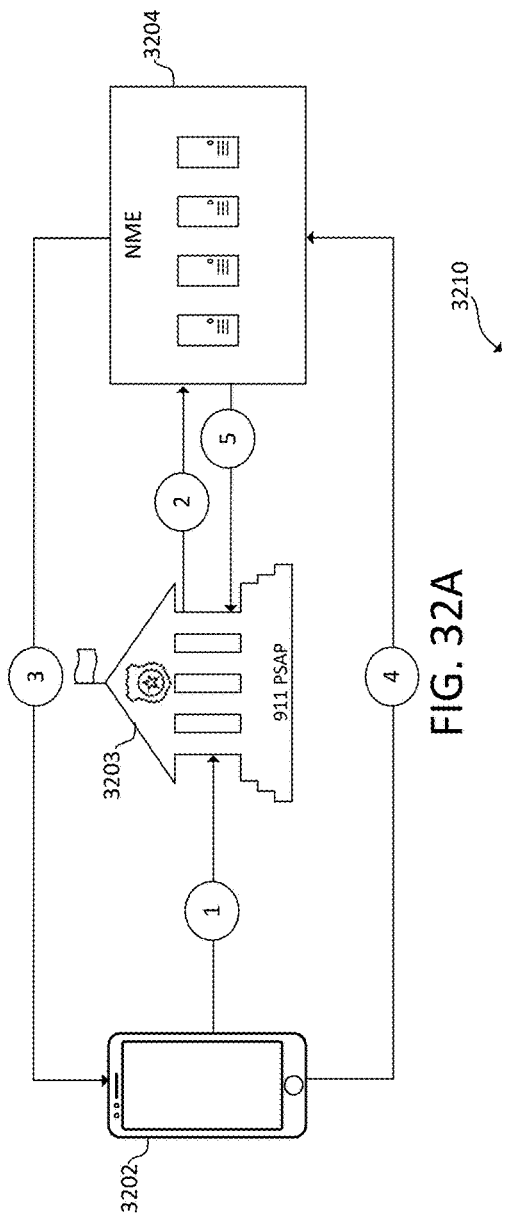
FIG. 32A illustrates an example environment depicting how a third party entity (e.g., a 911 PSAP entity) may be communicatively integrated with systems and methods of the presently disclosed technology, in accordance with one or more embodiments of the present disclosure.

For example, as illustrated in FIG. 32A, an NME 3204 (or other CSS element of the systems disclosed herein) may be in operative communication with a 911 PSAP entity 3203 who may receive an SMS notification via 911 SMS message from a sender 3202 who is not otherwise part of a predefined organization known to NME 3204 (denoted by operation 1). If the 911 PSAP entity 3203 wishes to net the sender's location, it may provide the sender's phone number to NME 3204 with a request to net the sender's location (denoted by operation 1), e.g., by inputting the senders SMS number into the CSS App of the present disclosure, for example, or by configuring the incoming SMS messages to be automatically bounced to the NME, in another example. The NME servers may generate and send a location sharing short link to the sender's number (denoted by operation 3) and, upon the sender's selection of the short link, capture the sender's location (denoted by operation 1) and transmit it to the 911 PSAP entity (denoted by operation 1), e.g., via a web browser, CSS App interface, or the like. In some embodiments the short link may authorize a periodic, or even continuous share of the sender's location. For example, The location may be polled every 15 seconds as long as the web browser is still running, or fed continuously to the NME until the user selects an option to terminate location sharing, etc.

Figure 32B:
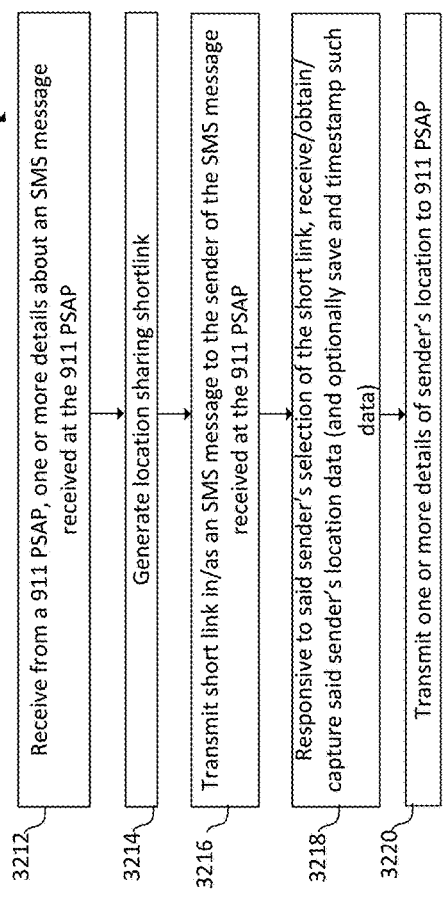
FIG. 32B illustrates an example method that may be implemented in connection with the SMS integrated environment shown in FIG. 32A, in accordance with one or more embodiments of the present disclosure.

FIG. 32B illustrates a method 3210 that may be implemented in accordance with one or more embodiments of the present disclosure, in connection with the illustration provided at FIG. 32A. As shown, at operation 3212, method 3210 may include receiving from a 911 PSAP (or other third party entity), one or more details about an SMS message received at the 911 PSAP (or other third party entity). At operation 3214, method 3210 may include generating a location sharing short link. At operation 3216, method 3210 may include transmitting the short link in/as an SMS message to the sender of the SMS message received at the 911 PSAP (or other third party entity). Responsive to said sender's selection of the short link, at operation 3218 method 3210 may include receiving/obtaining/capturing said sender's location data (and optionally saving and time-stamping such data). At operation 3220, method 3210 may include transmit one or more details of sender's location to 911 PSAP (or other third party entity).

Although not illustrated in FIGS. 1-32, it should further be recognized the NME of the present disclosure may be configured to translate the language used in a sender's message (whether SMS based, email based, push notification based, App based messaging or otherwise) to a preferred language of a given recipient that is known to the system. This way, the language barrier among individuals in communication with CSS can be minimized on-the-fly to further enable more efficient resolution of emergency situations. The NME of CSS may even be configured to propagate messages of a certain language only to other users who the system understands to be proficient in the certain language. In some embodiments, the NME of CSS may propagate a message as-written in a certain language to recipients who the NME recognizes is proficient in such certain language, and may translate the message into the preferred languages of the other recipients who are not proficient in such certain language.

Although often discussed in view of an example implementation by a school, the technology of the present disclosure is not limited only to the school environment. The technology may be implemented in many different types of institutions, such as hospitals, shopping malls, fairs and carnivals, conferences centers and convention halls, theme parks, sports venues, and other institutions where many people congregate. The technology may also be implemented by less publicly accessible institutions, such as factories, government buildings, or office buildings. After reading the description herein, it will become apparent to one of ordinary skill in the art that the disclosed technology can be implemented on any number of different campuses and by any number of different institutions. Nothing in this disclosure should be interpreted as limiting the scope of the technology disclosed herein to the discussed embodiments.

Figure 17:
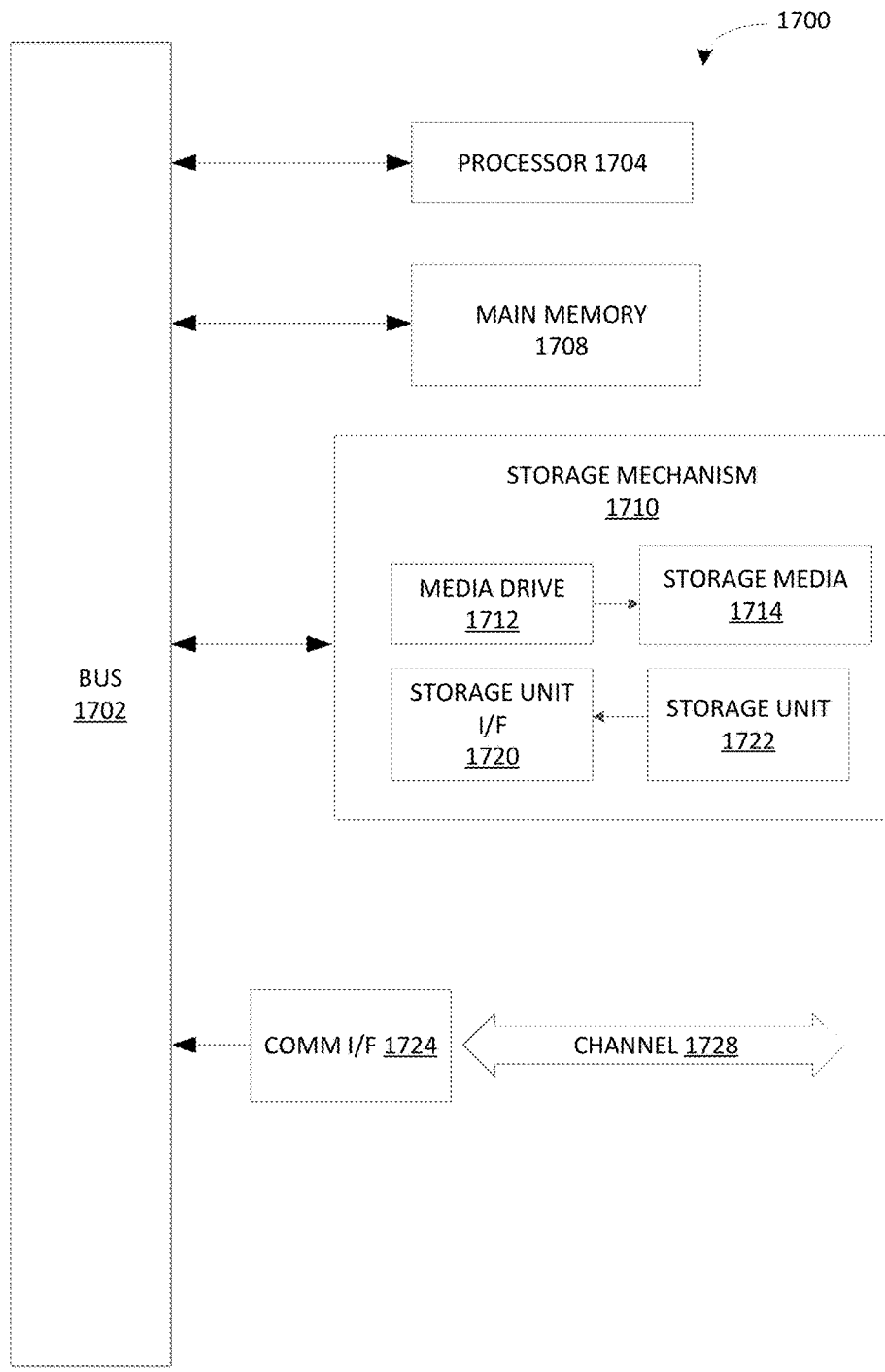
FIG. 17 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 17. Various embodiments are described in terms of this example-computing module 1700. After reading this description, it will become apparent to a person skilled in the relevant art how to implement the technology using other computing modules or architectures.

Referring now to FIG. 17, computing module 1700 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1700 might include, for example, one or more processors, controllers, control modules, or other processing devices, such as a processor 1704. Processor 1704 might be implemented using a general-purpose or special-purpose processing engine such as, for example, a microprocessor, controller, or other control logic. In the illustrated example, processor 1704 is connected to a bus 1702, although any communication medium can be used to facilitate interaction with other components of computing module 1700 or to communicate externally.

Computing module 1700 might also include one or more memory modules, simply referred to herein as main memory 1708. For example, preferably random access memory (RAM) or other dynamic memory, might be used for storing information and instructions to be executed by processor 1704. Main memory 1708 might also be used for storing temporary variables or other intermediate information during execution of instructions to be executed by processor 1704. Computing module 1700 might likewise include a read only memory ("ROM") or other static storage device coupled to bus 1702 for storing static information and instructions for processor 1704.

The computing module 1700 might also include one or more various forms of information storage mechanism 1710, which might include, for example, a media drive 1712 and a storage unit interface 1720. The media drive 1712 might include a drive or other mechanism to support fixed or removable storage media 1714. For example, a hard disk drive, a floppy disk drive, a magnetic tape drive, an optical disk drive, a CD or DVD drive (R or RW), or other removable or fixed media drive might be provided. Accordingly, storage media 1714 might include, for example, a hard disk, a floppy disk, magnetic tape, cartridge, optical disk, a CD or DVD, or other fixed or removable medium that is read by, written to or accessed by media drive 1712. As these examples illustrate, the storage media 1714 can include a computer usable storage medium having stored therein computer software or data.

In alternative embodiments, information storage mechanism 1710 might include other similar instrumentalities for allowing computer programs or other instructions or data to be loaded into computing module 1700. Such instrumentalities might include, for example, a fixed or removable storage unit 1722 and an interface 1720. Examples of such storage units 1722 and interfaces 1720 can include a program cartridge and cartridge interface, a removable memory (for example, a flash memory or other removable memory module) and memory slot, a PCMCIA slot and card, and other fixed or removable storage units 1722 and interfaces 1720 that allow software and data to be transferred from the storage unit 1722 to computing module 1700.

Computing module 1700 might also include a communications interface 1724. Communications interface 1724 might be used to allow software and data to be transferred between computing module 1700 and external devices. Examples of communications interface 1724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1724 might typically be carried on signals, which can be electronic, electromagnetic (which includes optical) or other signals capable of being exchanged by a given communications interface 1724. These signals might be provided to communications interface 1724 via a channel 1728. This channel 1728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1708, storage unit 1720, media 1714, and channel 1728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1700 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system comprising:
a non-transitory computer readable medium storing machine readable instructions which, when executed by a processor, cause the system to:
identify a phone number associated with a device from which an incoming free-form SMS message was sent;
determine if the phone number identified is associated with a registered user to whom a broadcast notification was caused to be sent, the broadcast notification caused to be sent by an administrator device running a mobile application, a source of the broadcast notification being associated with a common short code;
determine, responsive to a determination that the phone number identified is associated with a registered user to whom the broadcast notification was caused to be sent, an amount of time elapsed between times a last broadcast notification was sent and the incoming free-form SMS message was received;
determine, responsive to a determination that the amount of time elapsed was less than a predetermined threshold, an organization the registered user who sent the free-form SMS message is associated with, and contact addresses for one or more other registered users and administrators associated with the organization; and
relay the incoming free-form SMS message to the one or more other registered users and administrators associated with the organization;
wherein determining the organization the registered user is associated with comprises determining the registered user's location, and identifying an organization within whose security zone boundary the registered user's location falls.

2. A system comprising:
a notification management entity comprising one or more servers, the notification management entity communicatively coupled to one or more user devices and one or more administrator devices;
a plurality of registered user devices associated with a plurality of registered users, wherein each registered user of the plurality of registered users is associated with an organization, and a user category of a set of user categories associated with the organization;
the notification management entity maintaining a list of the plurality of registered users, the registered user's associated organization, the registered user's user category, and a boundary of a security zone associated the registered user's organization, each security zone comprising a continuous geographic area, one or more buildings or other structures, one or more non-continuous geographic areas, or a combination thereof;
an SMS messaging application operating on at least one of the registered user devices; and
a mobile emergency application operating on at least one of the one or more administrator devices and at least one of the registered user devices;
wherein the notification management entity, responsive to receiving an incoming free-form SMS message:
identifies a phone number associated with a device from which the incoming free-form SMS message was sent;
determines if the phone number identified is associated with a registered user to whom a broadcast notification has been sent, the broadcast notification caused to be sent by an administrator device running the mobile emergency application;
determines, responsive to a determination that the phone number identified is associated with a registered user to whom the broadcast notification has been sent, an amount of time elapsed between times a last notification was sent and the incoming free-form SMS message was received;
determines, responsive to a determination that the amount of time elapsed was less than a predetermined threshold, if the incoming free-form SMS message includes a hotkey associated with a subset of users;
fetches, responsive to a determination that the incoming free-form SMS message does include the hotkey associated with the subset of users, contact addresses for the subset of users associate with the hotkey; and
relays the incoming free-form SMS message to registered user devices associated with the contact addresses fetched.

3. The system of claim 2, wherein the notification management entity:
determines, responsive to a determination that the phone number identified is not associated with a registered user to whom the broadcast notification has been sent, whether the registered user associated with the phone number has authorization to initiate freeform SMS broadcast notifications; and
relays, responsive to a determination that the registered user associated with the phone number has authorization to initiate free-form SMS broadcast notifications, the incoming free-form SMS message to the at least one of the one or more administrator devices.

4. The system of claim 3, wherein the notification management entity:
monitors communication activity occurring over the secure communication conference channel; and
closes the secure communication conference channel responsive to a determination that the communication activity occurring over the secure communication conference channel meets a first non-utilization criteria.

5. The system of claim 4, wherein the first non-utilization criteria is met if no communication has taken place over the secure communication conference channel for a predefined period of time.

6. The system of claim 4, wherein the notification management entity:
notifies one or more additional administrators and one or more additional registered users of an ongoing secure communication conference channel; and
provides the additional administrators and the additional registered users with an access link and an authentication key to access the ongoing secure communication conference channel;
prompts, upon a recipient administrator's or a recipient registered user's selection of the access link for the ongoing secure communication conference channel, the selecting recipient administrator or the selecting recipient registered user to enter the authorization key; and joins, responsive to a determination that the selecting recipient administrator or the selecting recipient registered user has entered the authorization key, such selecting recipient administrator or selecting recipient registered user into the ongoing secure communication conference channel.

7. The system of claim 6, wherein the notification management entity:

monitors communication activity occurring over the ongoing secure communication conference channel;

closes the ongoing secure communication conference channel responsive to a determination that the communication activity occurring over the ongoing secure communication conference channel meets a second non-utilization criteria.

8. The system of claim 6, wherein the second non-utilization criteria is met if no communication has taken place over the ongoing secure communication conference channel for a predefined period of time.

9. The system of claim 3, wherein the notification management entity:

discards, responsive to a determination that the registered user associated with the phone number does not have authorization to initiate free-form SMS broadcast notifications, the incoming free-form SMS message and terminates further processing of the incoming free-form SMS message.

10. The system of claim 9, wherein discarding the incoming free-form SMS message comprises a deletion operation.

11. The system of claim 2, wherein the notification management entity:

opens a secure communication conference channel between the device of the registered user and at least one of the one or more administrator devices.

12. The system of claim 2, wherein the at least one of the one or more administrator devices is associated with an emergency medical services department.

13. The system of claim 2, wherein the at least one of the one or more administrator devices is outside the boundary of the security zone associated the registered user's organization.

14. The system of claim 2 wherein relaying the incoming free-form SMS message to the registered user devices associated with the contact addresses fetched comprises populating a messaging interface of a community safety system application running on one or more of said devices with text of the incoming free-form SMS message.

15. A system comprising:

a notification management entity comprising one or more servers, the notification management entity communicatively coupled to one or more user devices and one or more administrator devices;

a plurality of registered users, wherein each registered user of the plurality of registered users is associated with an organization, and a user category of a set of user categories associated with the organization;

the notification management entity maintaining a list of the plurality of registered users, the registered user's associated organization, the registered user's user category, and a boundary of a security zone associated the registered user's organization, each security zone comprising a continuous geographic area, one or more buildings or other structures, one or more non-continuous geographic areas, or a combination thereof;

a mobile emergency application operating on at least one of the one or more administrator devices and at least one of the registered user devices;

an SMS messaging application operating on at least one of the registered user devices;

wherein the notification management entity, responsive to receiving an incoming free-form SMS message:

identifies a phone number associated with a device from which the incoming free-form SMS message was sent;

determines if the phone number identified is associated with a registered user to whom a broadcast notification has been sent, the broadcast notification caused to be sent by an administrator device running the mobile emergency application;

determines, responsive to a determination that the phone number identified is associated with a registered user to whom the broadcast notification has been sent, an amount of time elapsed between times a last notification was sent and the incoming free-form SMS message was received;

determines, responsive to a determination that the amount of time elapsed was less than a predetermined threshold, an organization the registered user who sent the free-form SMS message is associated with, and contact addresses for one or more other users and administrators associated with the organization; and relays the incoming free-form SMS message to one or more of the other registered users and administrators associated with the organization.

16. The system of claim 15, wherein the notification management entity:

determines, responsive to a determination that the phone number identified is not associated with a registered user to whom the broadcast notification has been sent, whether the registered user associated with the phone number has authorization to initiate free-form SMS broadcast notifications; and relays, responsive to a determination that the registered user associated with the phone number has authorization to initiate free-form SMS broadcast notifications, the incoming free-form SMS message to the at least one of the one or more administrator devices.

17. The system of claim 16, wherein the notification management entity:

discards, responsive to a determination that the registered user associated with the phone number does not have authorization to initiate free-form SMS broadcast notifications, the incoming free-form SMS message and terminates further processing of the incoming free-form message.

18. The system of claim 17, wherein discarding the incoming free-form SMS message comprises a deletion operation.

19. The system of claim 15, wherein the notification management entity:

opens a secure communication conference channel between the device of the registered user and at least one of the one or more administrator devices.

20. The system of claim 19, wherein the notification management entity:

monitors communication activity occurring over the secure communication conference channel; and closes the secure communication conference channel responsive to a determination that the communication activity occurring over the secure communication conference channel satisfies a first non-utilization criteria.

21. The system of claim 20, wherein the first non-utilization criteria is met if no communication has taken place over the secure communication conference channel for a predefined period of time.

22. The system of claim 20, wherein the notification management entity:
   notifies one or more additional administrators and one or more additional registered users of an ongoing secure communication conference channel; and
   provides the additional administrators and the additional registered users with an access link and an authentication key to access the ongoing secure communication conference channel;
   prompts, upon a recipient administrator's or a recipient registered user's selection of the access link for the ongoing secure communication conference channel, the selecting recipient administrator or the selecting recipient registered user to enter the authorization key; and
   joins, responsive to a determination that the selecting recipient administrator or the selecting recipient registered user has entered the authorization key, such selecting recipient administrator or selecting recipient registered user into the ongoing secure communication conference channel.

23. The system of claim 22, wherein the notification management entity:
   monitors communication activity occurring over the ongoing secure communication conference channel;
   closes the ongoing secure communication conference channel responsive to a determination that the communication activity occurring over the ongoing secure communication conference channel meets a second non-utilization criteria.

24. The system of claim 23, wherein the second non-utilization criteria is met if no communication has taken place over the ongoing secure communication conference channel for a predefined period of time.

25. The system of claim 15, the at least one of the one or more administrator devices is associated with an emergency medical services department.

26. The system of claim 15 wherein the at least one of the one or more administrator devices is outside the boundary of the security zone associated the registered user's organization.

27. The system of claim 15 wherein determining the organization the registered user who sent the free-form SMS message is associated with comprises:
   determining the registered user's location; and
   identifying an organization within whose security zone boundary the registered user's location falls.

28. The system of claim 15 wherein determining the organization the registered user who sent the free-form SMS message is associated with comprises:
   searching a lookup table stored at the notification management entity that includes associated organization information about registered users.

29. A method comprising:
   identifying a phone number associated with a device from which an incoming free-form SMS message was sent;
   determining if the phone number identified is associated with a registered user to whom a broadcast notification was caused to be sent, the broadcast notification caused to be sent by an administrator device running a mobile emergency application, a source of the broadcast notification being associated with a common short code;
   determining, responsive to a determination that the phone number identified is associated with a registered user to whom the broadcast notification was caused to be sent, an amount of time elapsed between times a last broadcast notification was sent and the incoming free-form SMS message was received;
   determining, responsive to a determination that the amount of time elapsed was less than a predetermined threshold, an organization the registered user who sent the free-form SMS message is associated with, and contact addresses for one or more other registered users and administrators associated with the organization; and
   relaying the incoming free-form SMS message to the one or more other registered users and administrators associated with the organization;
   wherein determining the organization the registered user is associated with comprises determining the registered user's location, and identifying an organization within whose security zone boundary the registered user's location falls.

* * * * *